US 12,356,146 B2

(12) United States Patent
Radisavljevic et al.

(10) Patent No.: US 12,356,146 B2
(45) Date of Patent: Jul. 8, 2025

(54) SYSTEM FOR DYNAMICALLY DETERMINING THE LOCATION OF AND CALIBRATION OF SPATIALLY PLACED TRANSDUCERS FOR THE PURPOSE OF FORMING A SINGLE PHYSICAL MICROPHONE ARRAY

(71) Applicant: NUREVA, INC., Calgary (CA)

(72) Inventors: Aleksander Radisavljevic, Victoria (CA); David Eric Holmgren, Calgary (CA); Kael Blais, Calgary (CA); Zhengyin Wang, Calgary (CA)

(73) Assignee: NUREVA, INC., Calgary (CA)

( * ) Notice: Subject to any disclaimer, the term of this patent is extended or adjusted under 35 U.S.C. 154(b) by 314 days.

(21) Appl. No.: 18/116,632

(22) Filed: Mar. 2, 2023

(65) Prior Publication Data
US 2023/0283949 A1    Sep. 7, 2023

Related U.S. Application Data

(60) Provisional application No. 63/316,296, filed on Mar. 3, 2022.

(51) Int. Cl.
*H04R 1/40*      (2006.01)
*H04S 7/00*      (2006.01)

(52) U.S. Cl.
CPC ............ *H04R 1/406* (2013.01); *H04S 7/302* (2013.01); *H04R 2201/401* (2013.01); *H04R 2430/20* (2013.01); *H04S 2400/15* (2013.01)

(58) Field of Classification Search
CPC ............. H04R 1/406; H04R 2201/401; H04R 2201/405; H04R 2430/20; H04S 7/302; H04S 2400/15
(Continued)

(56) References Cited

U.S. PATENT DOCUMENTS 4,499,578 A    2/1985  Marouf et al.
4,536,887 A    8/1985  Kaneda et al.
(Continued)

FOREIGN PATENT DOCUMENTS

EP    0903055 B1    10/2007
EP    2975609 A1    1/2016
(Continued)

OTHER PUBLICATIONS

Communication pursuant to Article 94(3) EPC dated Oct. 14, 2024, from European Patent Application No. 20749339.6-1207, 10 sheets.
(Continued)

*Primary Examiner* — William A Jerez Lora
(74) *Attorney, Agent, or Firm* — KATTEN MUCHIN ROSENMAN LLP

(57) ABSTRACT

An audio conference system for automatically forming a single combined physical microphone array aperture across associated and/or disassociated ad-hoc microphone elements in a shared 3D space is provided. The audio conference system includes a plurality of microphone/speaker units, each including at least one microphone and/or at least one speaker and a system processor communicating with the microphone/speaker units. The system processor instructs the microphone/speaker units to transmit unique calibration signals sequentially or simultaneously and to calculate time difference of arrival (TDOA) between the microphone/speaker units. A physical array structure of the microphone/speaker units is obtained based on TDOA between the microphone/speaker units, and a consolidated target coverage zone common to the microphone/speaker units is generated based on the physical array structure.

22 Claims, 46 Drawing Sheets

(58) Field of Classification Search
USPC .......................................... 381/56, 92, 122
See application file for complete search history.

(56) References Cited

U.S. PATENT DOCUMENTS

| | | | |
|---|---|---|---|
| 5,477,270 | A | 12/1995 | Park |
| 5,699,437 | A | 12/1997 | Finn |
| 6,469,732 | B1 | 10/2002 | Chang et al. |
| 6,593,956 | B1 | 7/2003 | Potts et al. |
| 6,912,178 | B2 | 6/2005 | Chu et al. |
| 6,912,718 | B1 | 6/2005 | Chang et al. |
| 7,130,705 | B2 | 10/2006 | Amir et al. |
| 7,254,241 | B2 | 8/2007 | Rui et al. |
| 7,489,788 | B2 | 2/2009 | Leung et al. |
| 7,720,232 | B2 | 5/2010 | Oxford et al. |
| 7,848,531 | B1 | 12/2010 | Vickers et al. |
| 7,995,768 | B2 | 8/2011 | Miki et al. |
| 8,185,387 | B1 | 5/2012 | Lachapelle |
| 8,861,537 | B1 | 10/2014 | Braithwaite et al. |
| 8,953,819 | B2 | 2/2015 | Ko et al. |
| 9,706,292 | B2 | 7/2017 | Duraiswami et al. |
| 9,800,964 | B2 | 10/2017 | McIntosh et al. |
| 10,003,900 | B2 | 6/2018 | Cartwright et al. |
| 10,042,038 | B1 | 8/2018 | Lord et al. |
| 10,063,987 | B2 | 8/2018 | McGibney |
| 10,229,697 | B2 | 3/2019 | Bastyr et al. |
| 10,237,639 | B2 | 3/2019 | McIntosh et al. |
| 10,387,108 | B2 | 8/2019 | McGibney |
| 10,397,726 | B2 | 8/2019 | McGibney |
| 10,848,896 | B2 | 11/2020 | McGibney |
| 10,972,835 | B2 | 4/2021 | Rollow, IV |
| 11,127,415 | B2 | 9/2021 | Magnusson et al. |
| 11,190,871 | B2 | 11/2021 | Yorga et al. |
| 2005/0280701 | A1 | 12/2005 | Wardell |
| 2006/0034469 | A1 | 2/2006 | Tamiya et al. |
| 2006/0165242 | A1 | 7/2006 | Miki et al. |
| 2008/0085014 | A1 | 4/2008 | Chen et al. |
| 2008/0107277 | A1 | 5/2008 | Somasundaram et al. |
| 2008/0285771 | A1 | 11/2008 | Tanaka et al. |
| 2009/0129609 | A1 | 5/2009 | Oh et al. |
| 2010/0034397 | A1 | 2/2010 | Nakadai et al. |
| 2010/0135118 | A1 | 6/2010 | Van Leest et al. |
| 2011/0135125 | A1 | 6/2011 | Zhan et al. |
| 2012/0093344 | A1 | 4/2012 | Sun et al. |
| 2012/0245933 | A1 | 9/2012 | Flaks et al. |
| 2013/0083934 | A1 | 4/2013 | Ahgren |
| 2013/0101134 | A1 | 4/2013 | Betts-Lacroix |
| 2013/0142342 | A1 | 6/2013 | Del Galdo et al. |
| 2013/0258813 | A1 | 10/2013 | Herre et al. |
| 2014/0050328 | A1 | 2/2014 | Fischer |
| 2014/0098964 | A1 | 4/2014 | Rosca et al. |
| 2014/0119552 | A1 | 5/2014 | Beaucoup |
| 2014/0133666 | A1 | 5/2014 | Tanaka et al. |
| 2014/0185824 | A1 | 7/2014 | Burnett |
| 2014/0314251 | A1 | 10/2014 | Rosca et al. |
| 2014/0348342 | A1 | 11/2014 | Laaksonen et al. |
| 2015/0185312 | A1 | 7/2015 | Gaubitch et al. |
| 2015/0222996 | A1 | 8/2015 | Chu et al. |
| 2015/0230026 | A1 | 8/2015 | Eichfeld et al. |
| 2016/0071526 | A1 | 3/2016 | Wingate et al. |
| 2016/0112469 | A1 | 4/2016 | Liu |
| 2016/0173976 | A1 | 6/2016 | Podhradsky |
| 2017/0178628 | A1 | 6/2017 | Macours et al. |
| 2017/0347217 | A1 | 11/2017 | McGibney |
| 2017/0366896 | A1 | 12/2017 | Adsumilli et al. |
| 2017/0374454 | A1 | 12/2017 | Bernardini et al. |
| 2018/0074782 | A1 | 3/2018 | McGibney |
| 2018/0098174 | A1 | 4/2018 | Goodwin et al. |
| 2018/0249267 | A1* | 8/2018 | Klingler ............... H04R 29/005 |
| 2019/0349471 | A1 | 11/2019 | Ferguson et al. |
| 2021/0035563 | A1 | 2/2021 | Cartwright et al. |
| 2021/0112362 | A1* | 4/2021 | Weissman ............... H04S 7/303 |
| 2022/0004355 | A1 | 1/2022 | McGibney |
| 2024/0397262 | A1* | 11/2024 | Zheng ..................... H04R 5/04 |
| 2024/0422503 | A1* | 12/2024 | Kawczinski ............ H04S 7/302 |
| 2025/0008262 | A1* | 1/2025 | Bruni ...................... H04R 1/26 |

FOREIGN PATENT DOCUMENTS

| | | |
|---|---|---|
| JP | 3154468 B2 | 4/2001 |
| JP | 2018026701 A | 2/2018 |
| WO | 03010995 A2 | 2/2003 |
| WO | 2022/118072 A1 | 6/2022 |

OTHER PUBLICATIONS

Final Office Action dated Dec. 5, 2024, from U.S. Appl. No. 17/739,926, 29 sheets.

International Search Report and Written Opinion mailed Aug. 9, 2024, for International Patent Application No. PCT/CA2024/050615, 9 sheets.

Notice of Allowance dated Feb. 7, 2024, from U.S. Appl. No. 17/516,480, 10 sheets.

Communication pursuant to Article 94(3) EPC dated Feb. 29, 2024, from European Patent Application No. 21204322.8, 9 sheets.

Communication pursuant to Article 94(3) EPC dated Mar. 12, 2024, from European Patent Application No. 19808293.5, 6 sheets.

Theodoropoulos D et al.: "A reconfigurable beamformer for audio applications", 7th Symposium on Application Specific Processors, 2009. SASP '09. IEEE,, Jul. 27, 2009, pp. 80-87, XP031522047, ISBN: 978-1-4244-4939-2.

International Search Report and Written Opinion mailed Sep. 15, 2017, from International Application No. PCT/CA2017/050642, 12 sheets.

Joseph Hector Dibiase, Thesis entitled, "A High-Accuracy, Low-Latency Technique for Talker Localization in Reverberant Environments Using Microphone Arrays", Brown University, May 2000.

Notice of Allowance dated Apr. 30, 2018, from U.S. Appl. No. 15/597,646, 18 sheets.

International Search Report and Written Opinion mailed Jun. 7, 2023, from International Application No. PCT/CA2023/50412, 11 sheets.

Extended European Search Report mailed May 7, 2019, from European Patent Application No. 17805437.5, 23 sheets.

Notice of Allowance dated May 24, 2019, from U.S. Appl. No. 16/110,393, 6 sheets.

Non-Final Rejection dated Sep. 17, 2018, from U.S. Appl. No. 16/110,393, 14 sheets.

International Search Report and Written Opinion mailed Oct. 12, 2017, from International Application No. PCT/CA2017/050676, 8 sheets.

Notice of Allowance dated Apr. 2, 2019, from U.S. Appl. No. 15/603,986, 42 sheets.

Final Rejection dated May 25, 2018, from U.S. Appl. No. 15/603,986, 13 sheets.

Non-Final Rejection dated Jan. 24, 2018, from U.S. Appl. No. 15/603,986, 26 sheets.

Communication pursuant to Article 94(3) EPC dated Feb. 17, 2020, from European Patent Application No. 17805437.5, 6 sheets.

Notice of Allowance dated Jul. 16, 2020, from U.S. Appl. No. 16/518,013, 19 sheets.

Non-Final Rejection dated Feb. 28, 2020, from U.S. Appl. No. 16/518,013, 21 sheets.

Notice of Allowance dated Apr. 11, 2019, from U.S. Appl. No. 16/110,393, 18 sheets.

Notice of Allowance dated Jan. 19, 2018, from U.S. Appl. No. 15/597,646, 22 sheets.

Notice of Allowance dated Aug. 16, 2021, from U.S. Appl. No. 17/097,560, 33 sheets.

Extended European search report from European Application No. 20194651.4 with a mailing date of Jan. 21, 2021, 11 sheets.

Extended European search report from European Application No. 17847841.8 with a mailing date of Jun. 28, 2019, 12 sheets.

Communication pursuant to Rules 70(2) and 70a(2) EPC from European Application No. 17847841.8 with a mailing date of Jul. 16, 2019, 1 sheet.

U.S. Appl. No. 62/343,512, filed May 31, 2016, 41 sheets.
U.S. Appl. No. 62/162,091, filed May 15, 2015, 52 sheets.
U.S. Appl. No. 62/345,208, filed Jun. 3, 2016, 44 sheets.

(56) References Cited

OTHER PUBLICATIONS

Non-Final Rejection dated Feb. 9, 2021, from U.S. Appl. No. 16/434,725, 72 sheets.
Notice of Allowance dated Jan. 25, 2023, from U.S. Appl. No. 17/374,585, 11 sheets.
Notice of Allowance dated Jan. 19, 2023, from U.S. Appl. No. 17/374,585, 41 sheets.
Non-Final Rejection dated Aug. 8, 2022, from U.S. Appl. No. 17/374,585, 57 sheets.
The extended European search report completed Feb. 2, 2022 (dated Feb. 10, 2022), from European Application No. 19808293.5, 8 sheets.
Emanuël A. P. Habets and Jacob Benesty, "A Two-Stage Beamforming Approach for Noise Reduction and Dereverberation", IEEE Transactions on Audio, Speeach, and Language Processing, vol. 21, No. 5, May 2013, pp. 945-958.
Gerhard Doblinger, "An Adaptive Microphone Array for Optimum Beamforming and Noise Reduction", 14th European Signal Processing Conference (EUSIPCO 2006), Florence, Italy, Sep. 4-8, 2006, 5 sheets.
Taylor B. Spalt, Christopher R. Fuller, Thomas F. Brooks, William M. Humphreys, Jr., "A Background Noise Reduction Technique using Adaptive Noise Cancellation for Microphone Arrays", p. 1-16, available at: https://ntrs.nasa.gov/search.jsp?R=20110012472 2018-05-16T17:29:07+00:00Z.
International Search Report and Written Opinion dated Oct. 3, 2019, from PCT/CA2019/050708, 9 sheets.
Notice of Allowance dated Feb. 10, 2023, from U.S. Appl. No. 16/421,908, 24 sheets.
Final Rejection dated Oct. 11, 2022, from U.S. Appl. No. 16/421,908, 26 sheets.
Non-Final Rejection dated Apr. 20, 2022, from U.S. Appl. No. 16/421,908, 38 sheets.
International Search Report and Written Opinion dated Jun. 15, 2023, from International Application No. PCT/CA2023/050371, 7 sheets.
International Search Report and Written Opinion dated May 30, 2023, from International Application No. PCT/CA2023/050277, 7 sheets.
The extended European search report dated Sep. 27, 2022, from European Patent Application No. 20749339.6, 15 sheets.
International Search Report and Written Opinion mailed May 22, 2020, from International Application No. PCT/CA2020/050100, 11 sheets.
Non-Final Rejection dated Dec. 10, 2020, from U.S. Appl. No. 16/774,258, 28 sheets.
Notice of Allowance dated Jul. 26, 2021, from U.S. Appl. No. 16/774,258, 21 sheets.
Lightspeed Technologies, "Audio Solutions for Classroom Reopening Challenges", Duplicom Presentation Systems, https://www.duplicom.com/products/lightspeed-audio-solutions/, Aug. 27, 2020, 7 sheets.
Luis Guerra, Troy Jensen, "How to Use The Shure MXA910 Ceiling Array Microphone for Voice Lift", Shure Incorporated, USA, Created Sep. 2016, upated Jul. 2018, Shure Incorporated, 11 sheets.
Alberta Infrastructure, "Sound-Field Systems Guide for Classrooms", published in May 2004, 19 sheets.
The extended European Search Report dated Feb. 11, 2022, from European Patent Application No. 21204322.8, 7 sheets.
International Search and Written Opinion dated Jul. 18, 2022, from PCT/CA2022/050731, 8 sheets.
Non-Final Office Action dated Oct. 11, 2023, from U.S. Appl. No. 17/516,480, 40 sheets.
Non-Final Office Action dated Apr. 25, 2024, from U.S. Appl. No. 17/739,926, 57 sheets.

\* cited by examiner

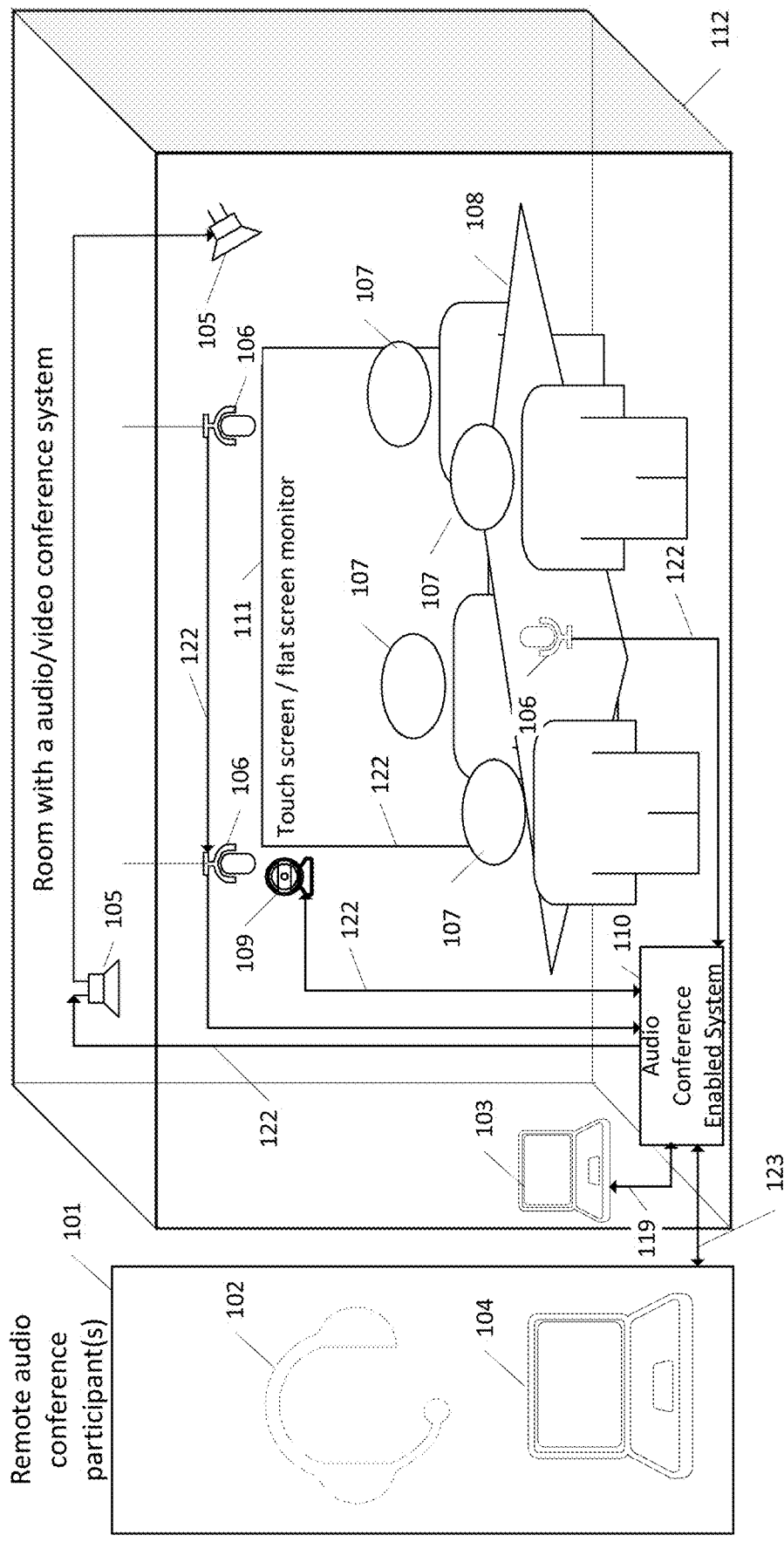
FIG. 1a Prior Art – Typical audio conference system variations

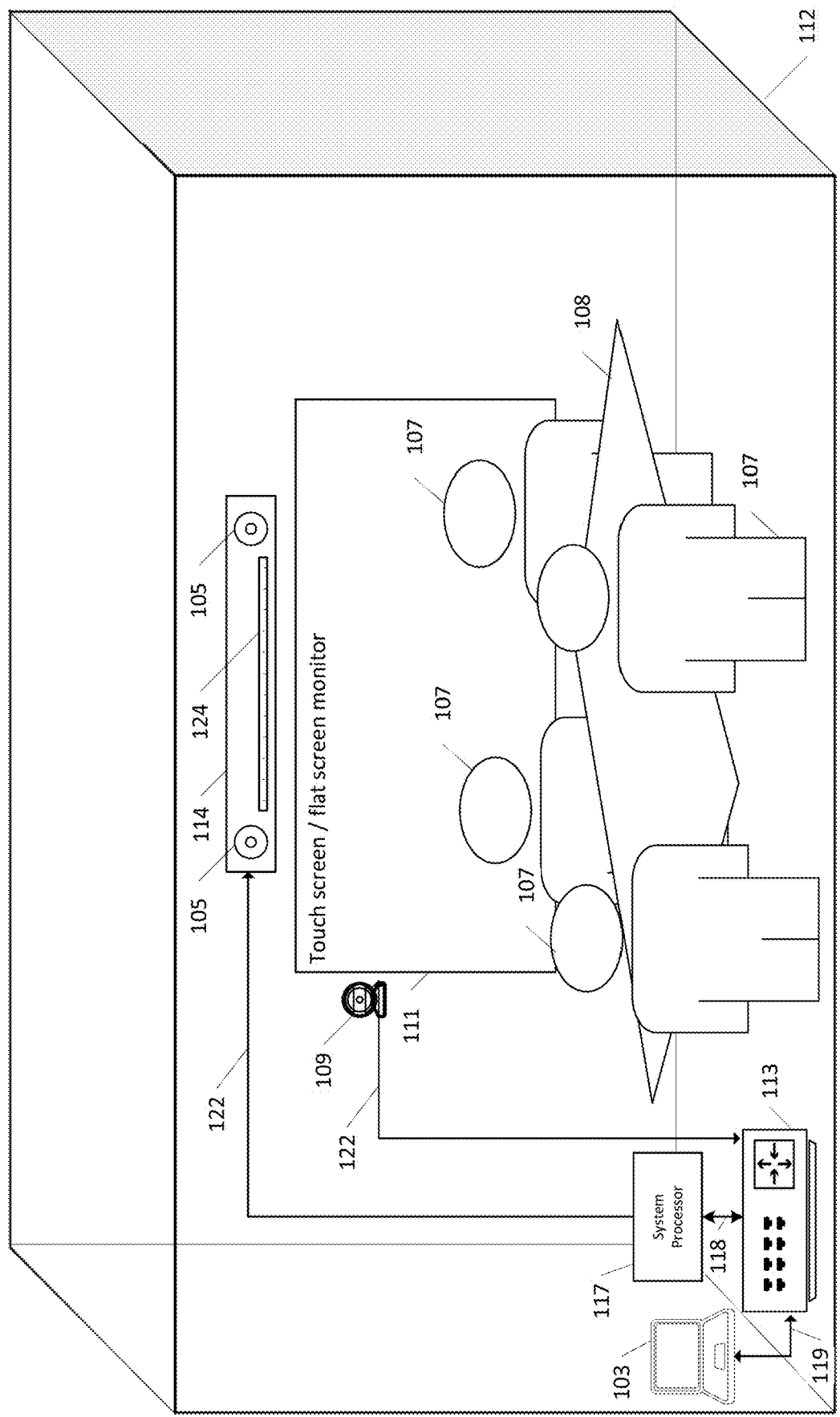
FIG. 1b Prior Art - Microphone Array and Speaker System

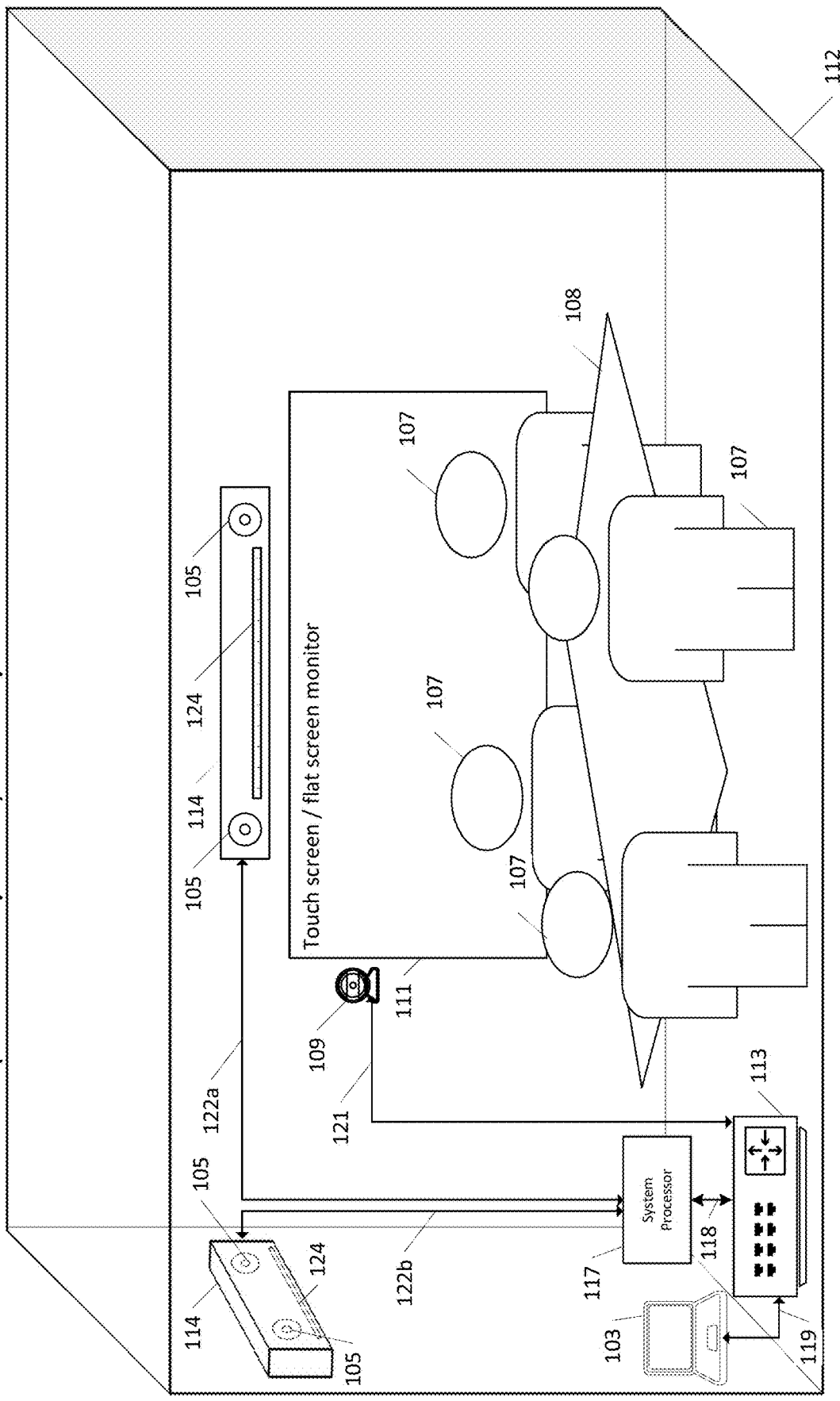
FIG. 1c Prior Art - Microphone Array and Speaker System

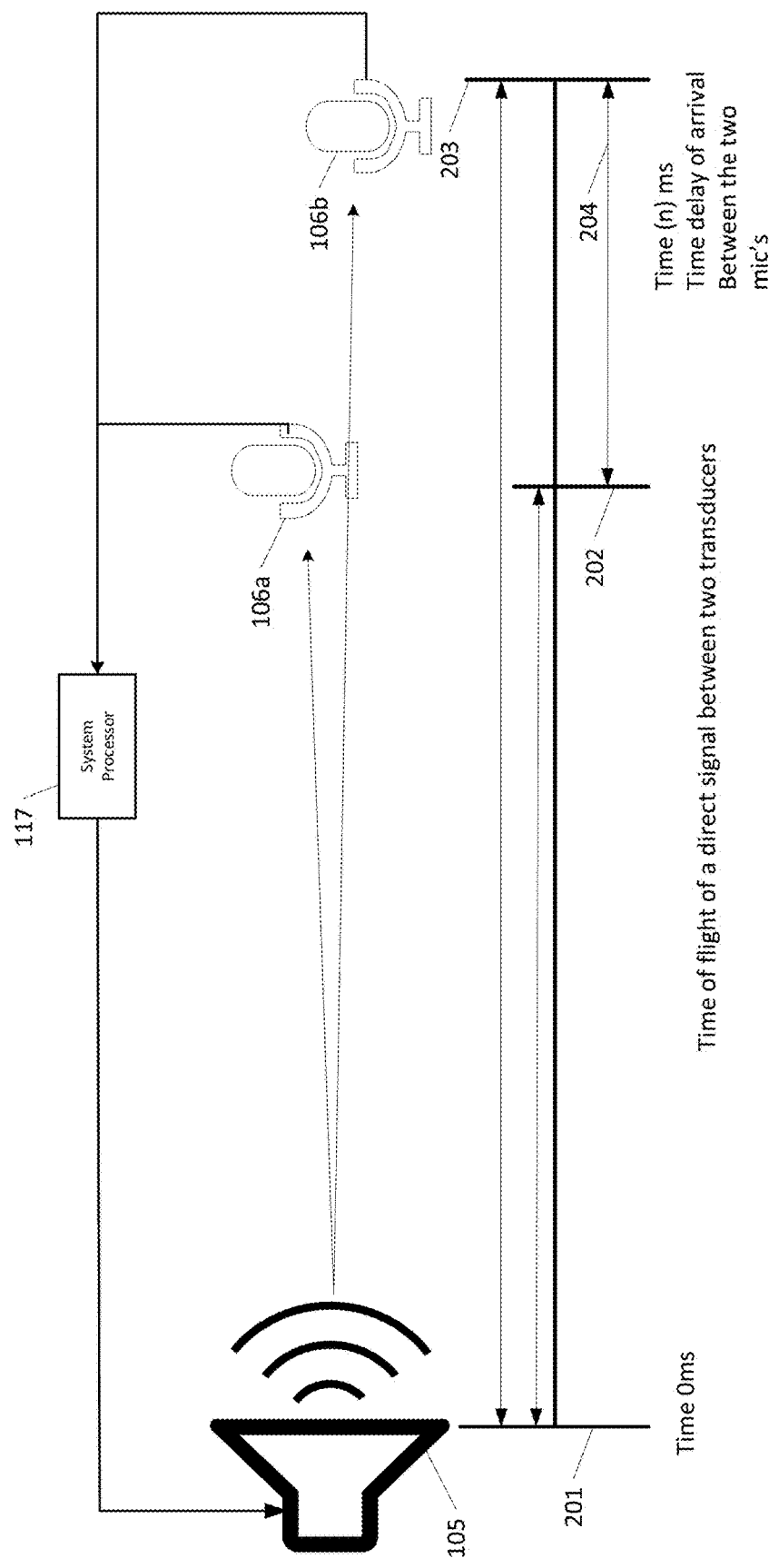
FIG. 2a TDOA - Basics

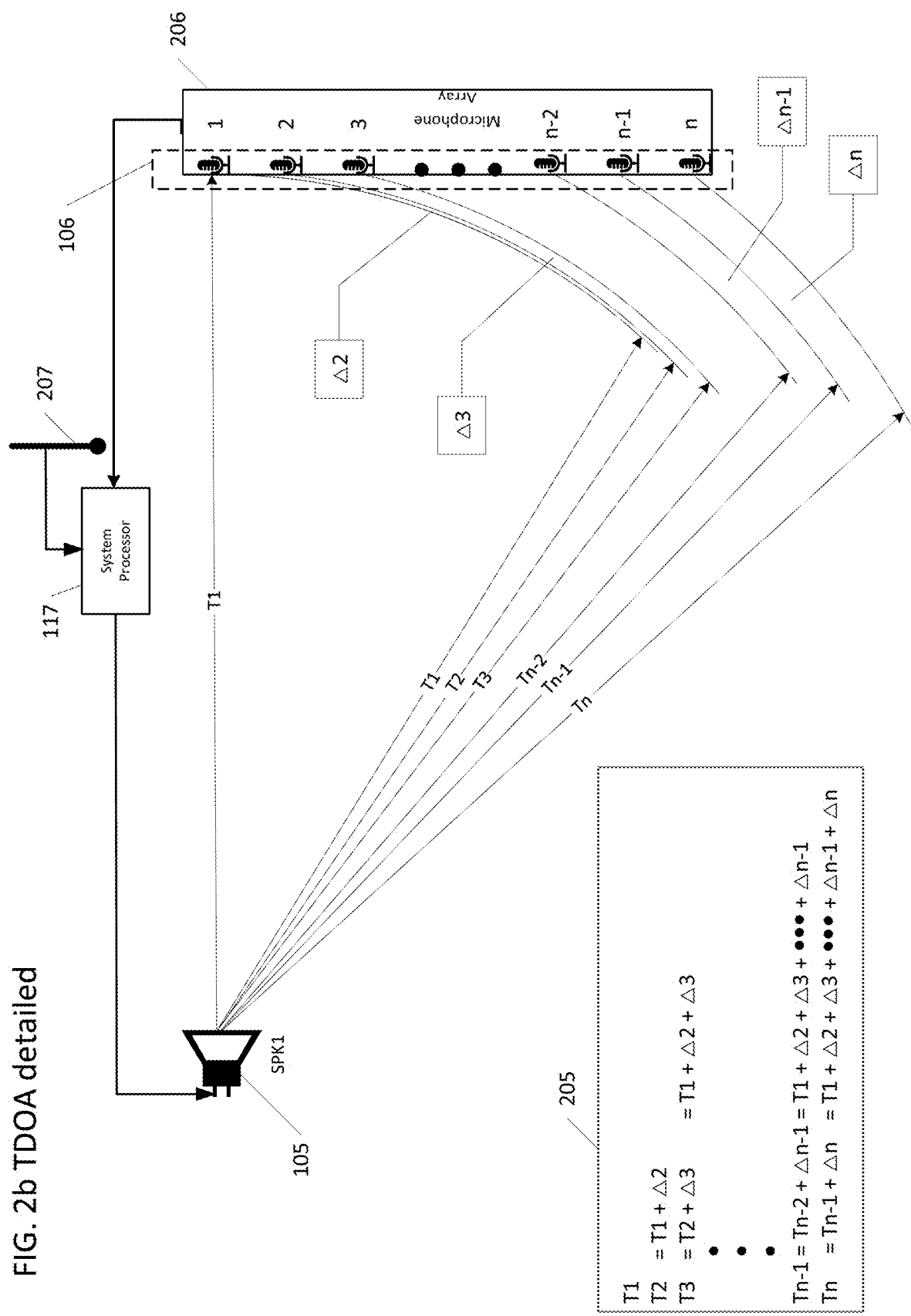
FIG. 2b TDOA detailed

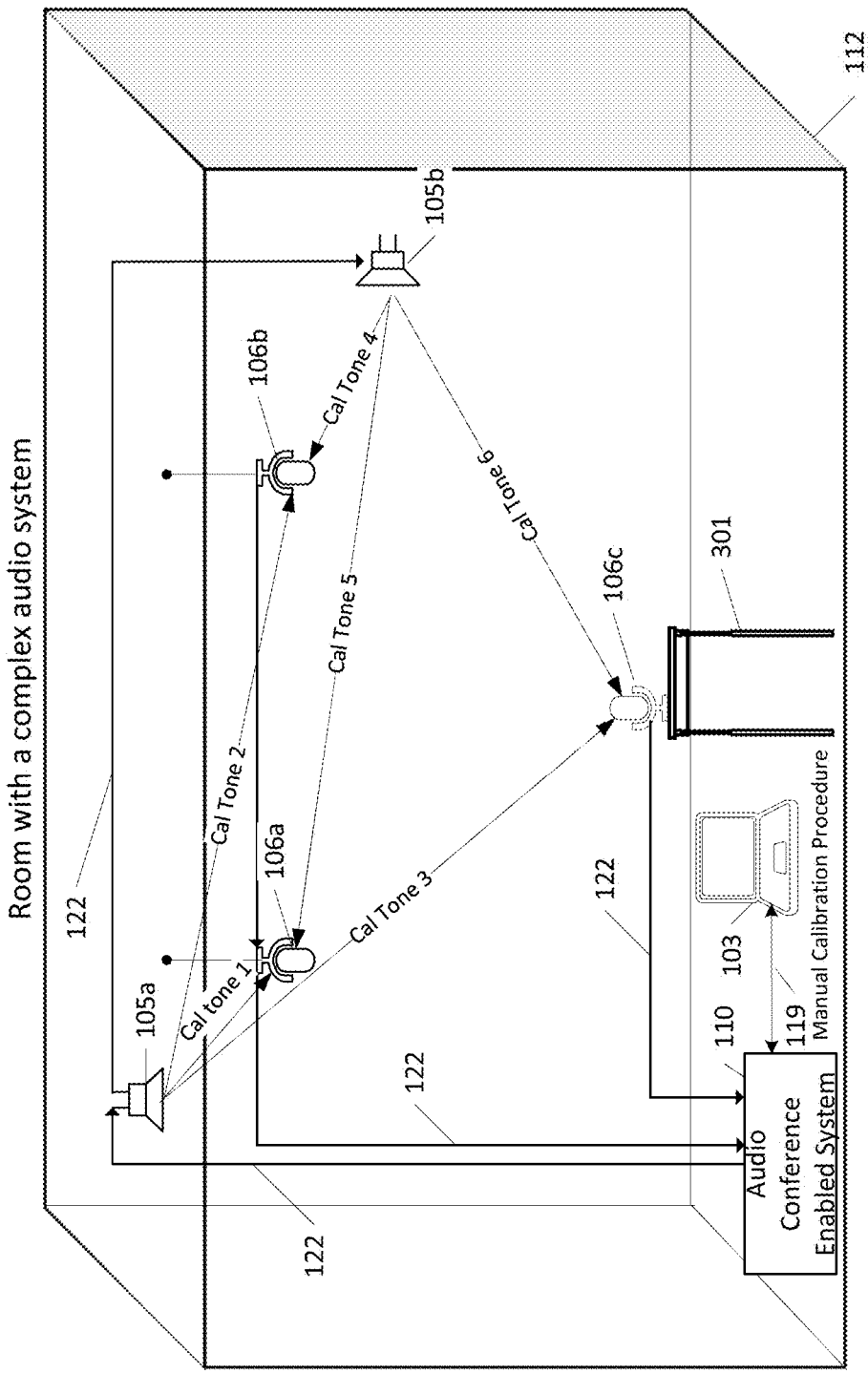
FIG. 3 Prior Art – Typical audio conference Calibration scenario

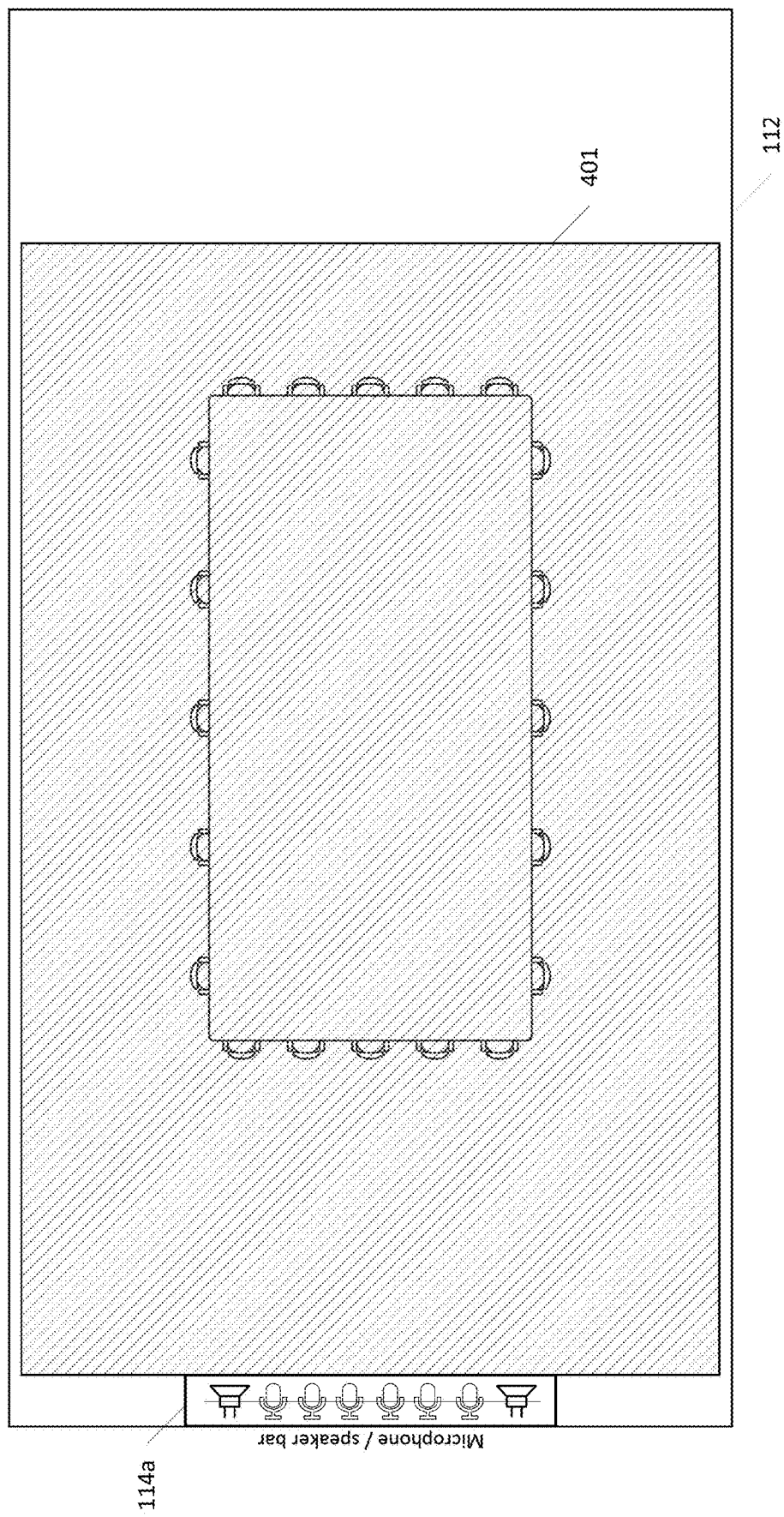
FIG. 4a Current Art – Array coverage patterns

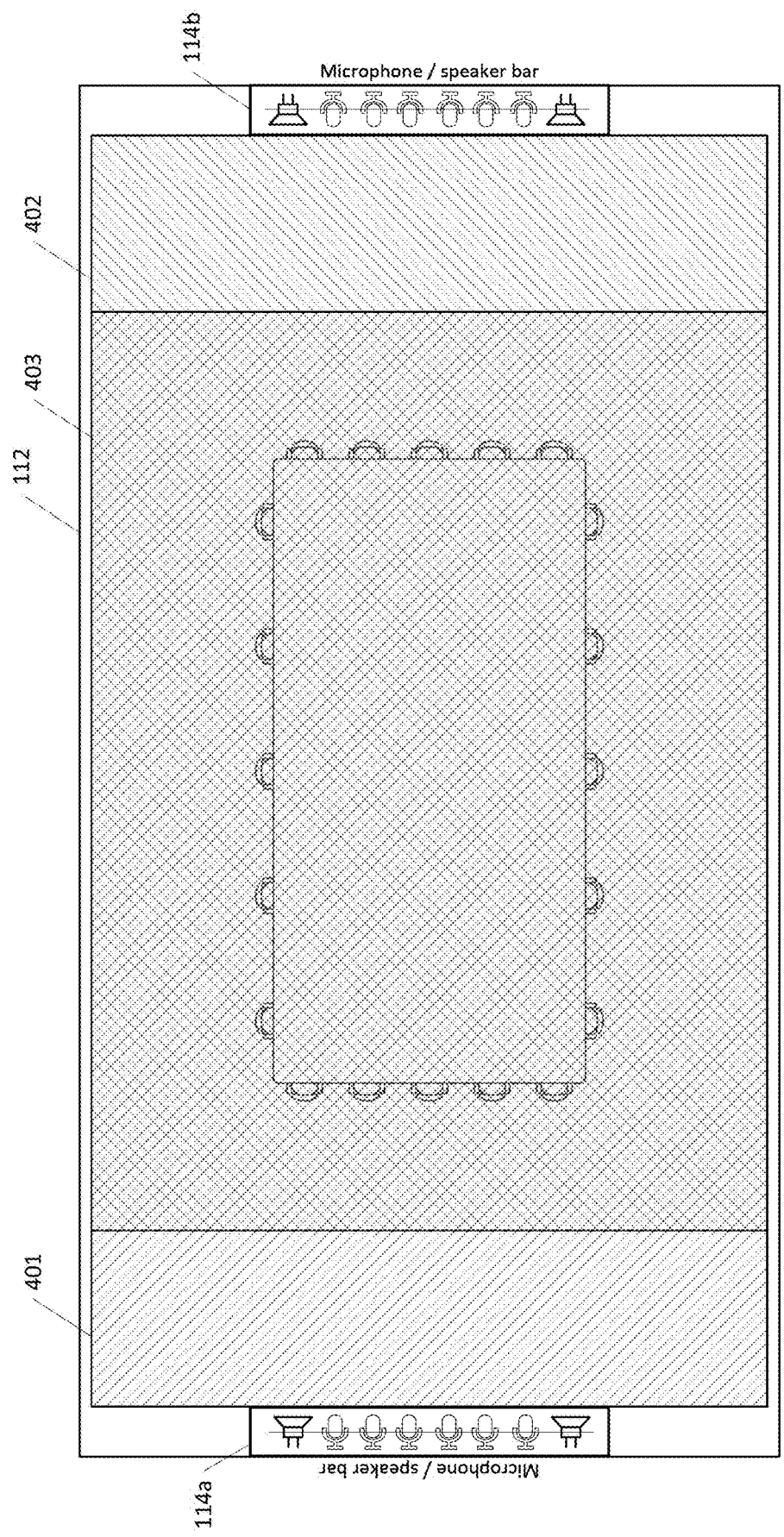
FIG. 4b Current Art – Array coverage patterns

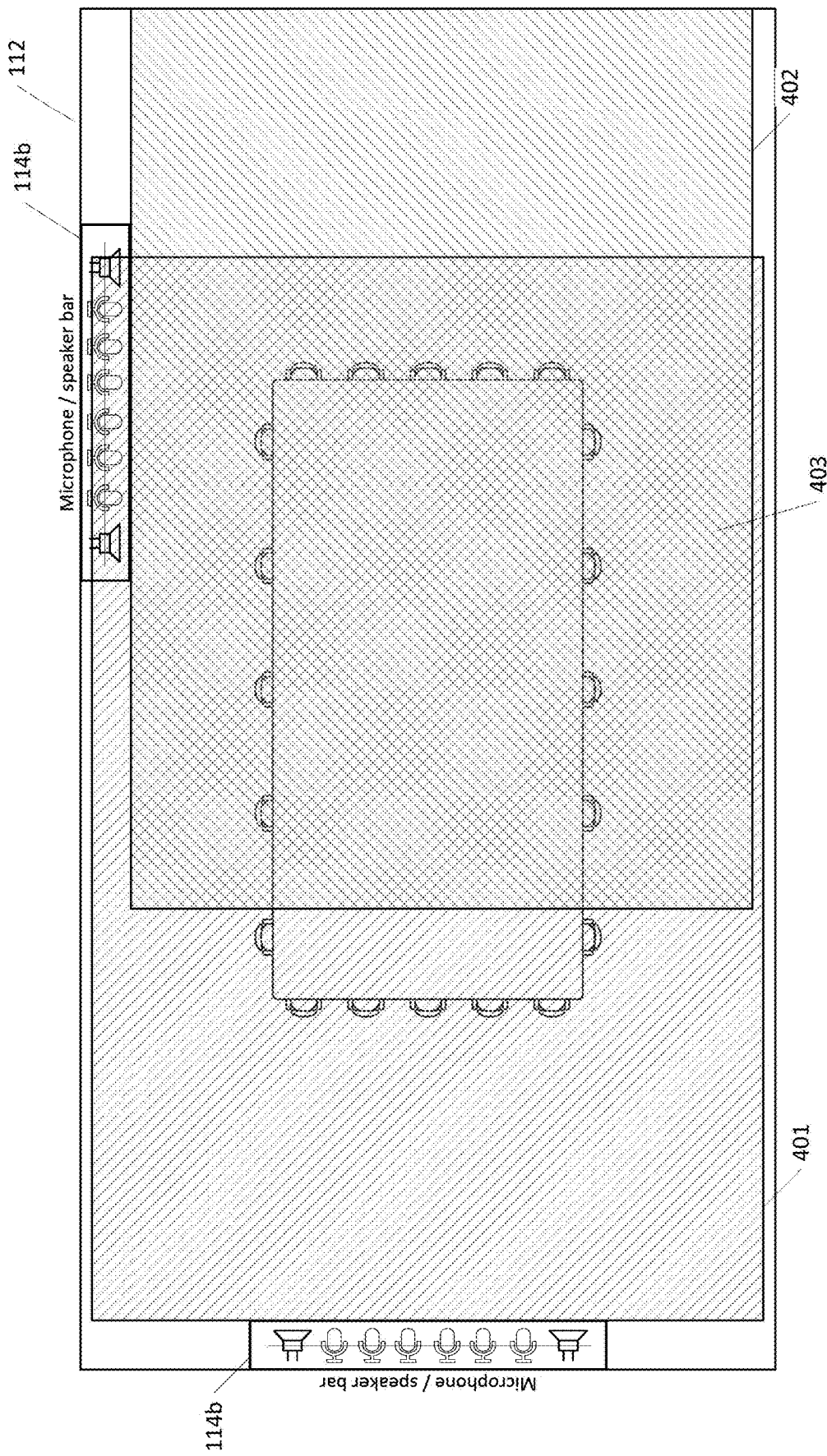
FIG. 4c Current Art – Array coverage patterns

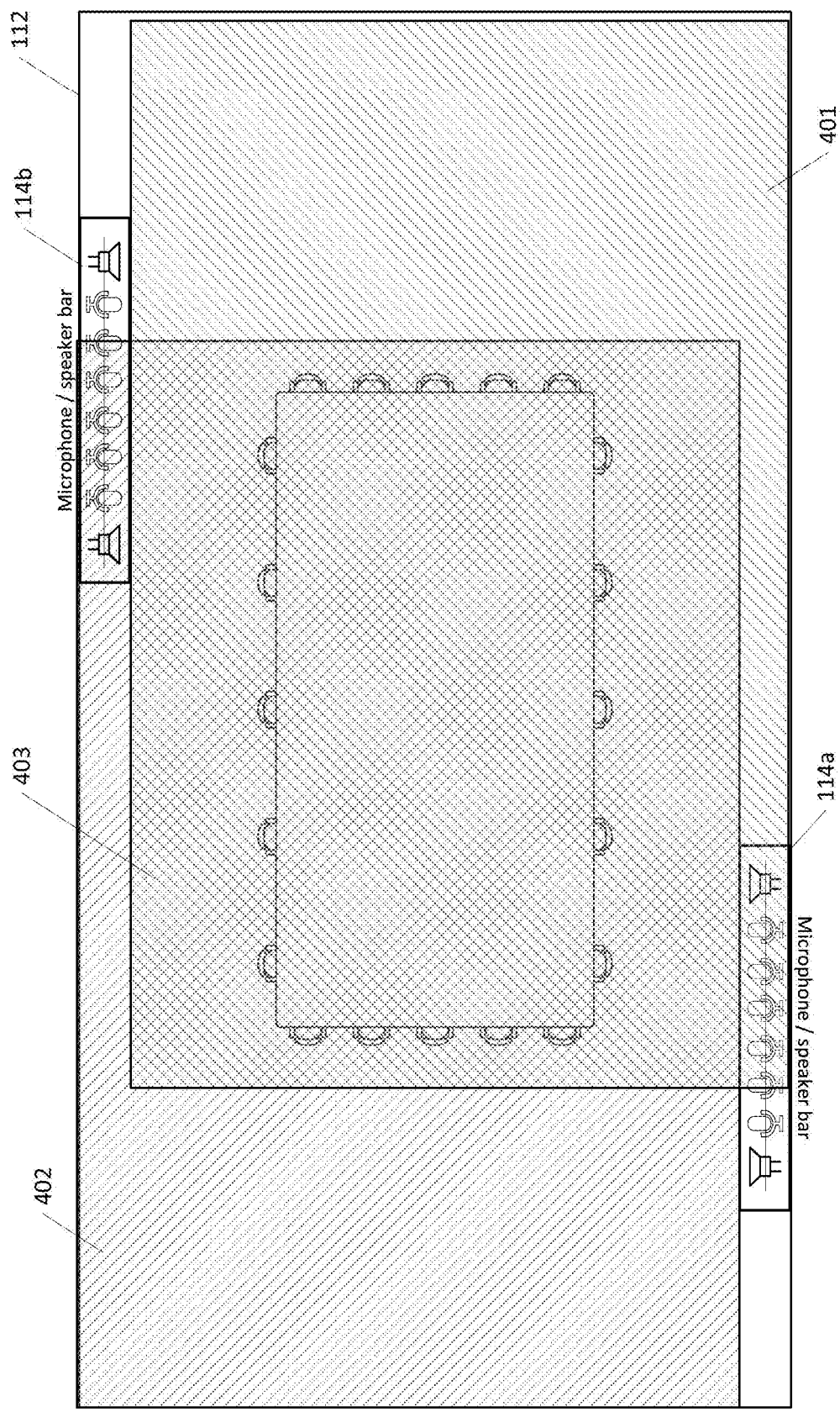
FIG. 4d Current Art – Array coverage patterns

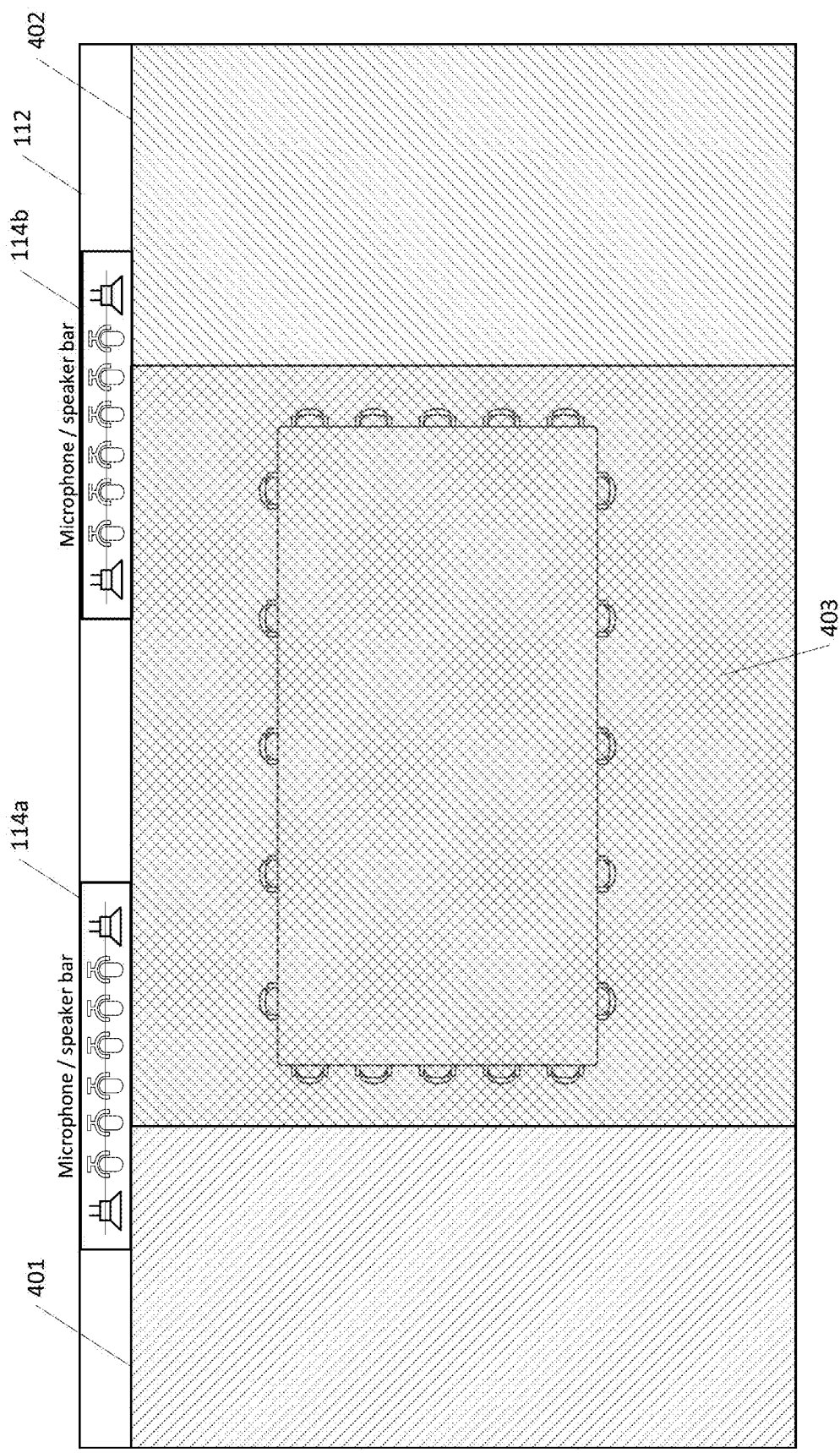
FIG. 4e Current Art – Array coverage patterns

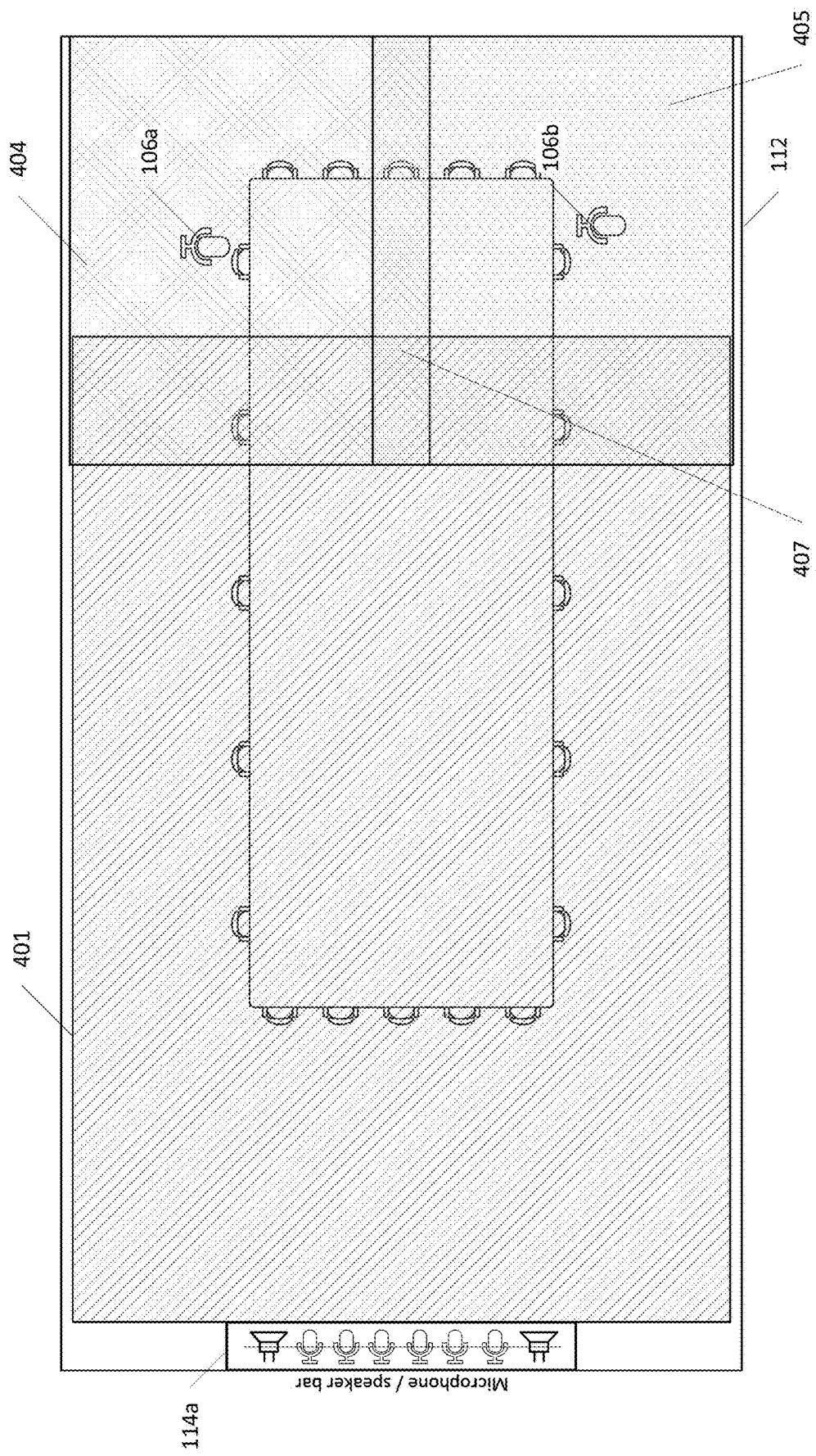
FIG. 4f Current Art – Array coverage patterns

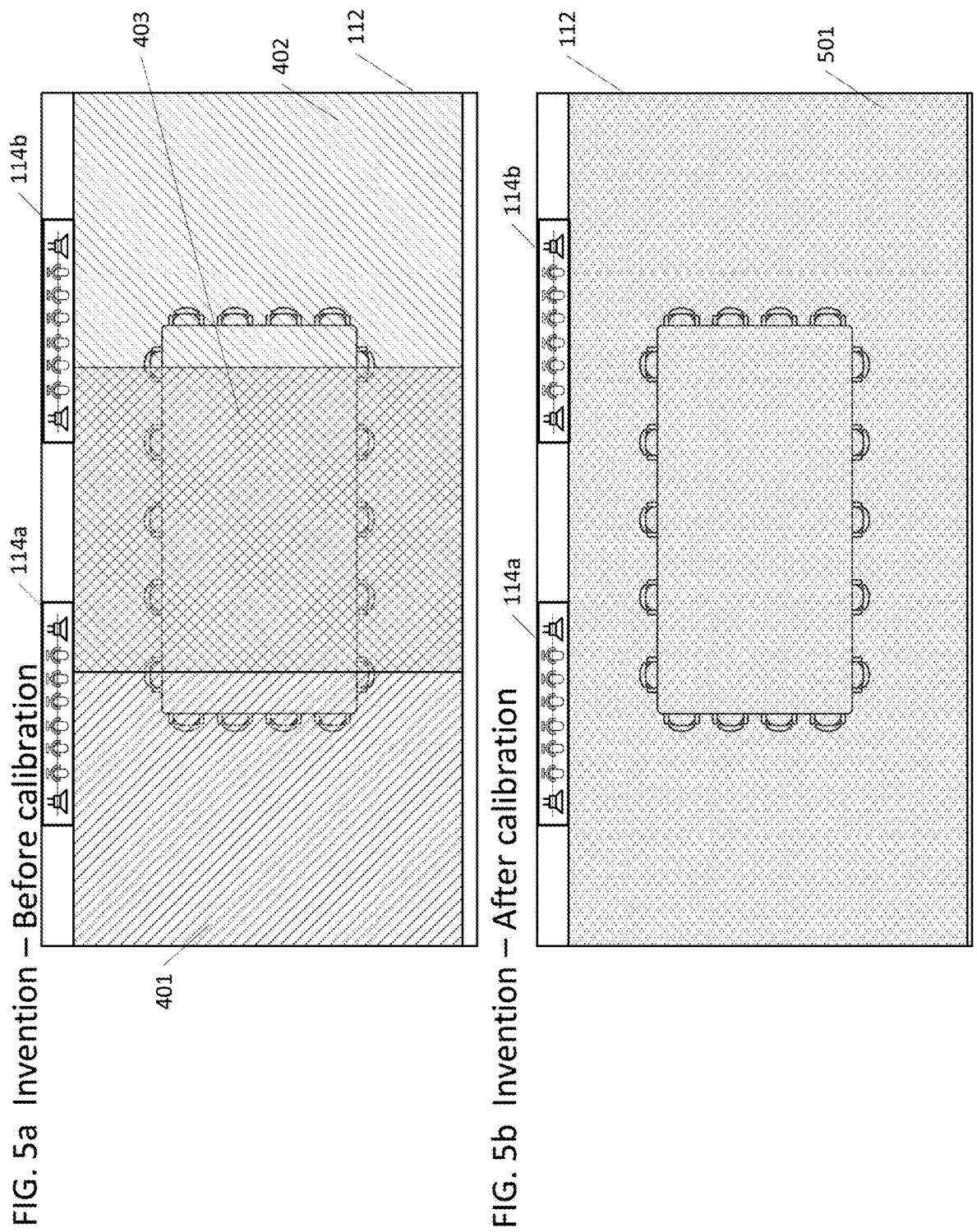
FIG. 5a Invention – Before calibration
FIG. 5b Invention – After calibration

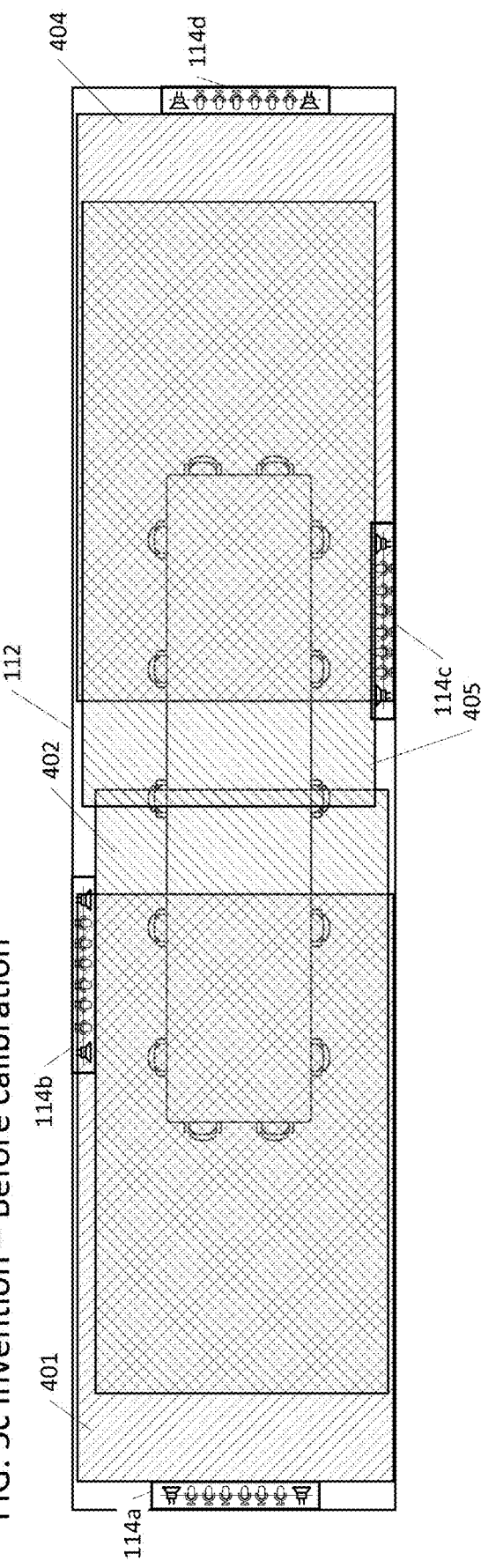
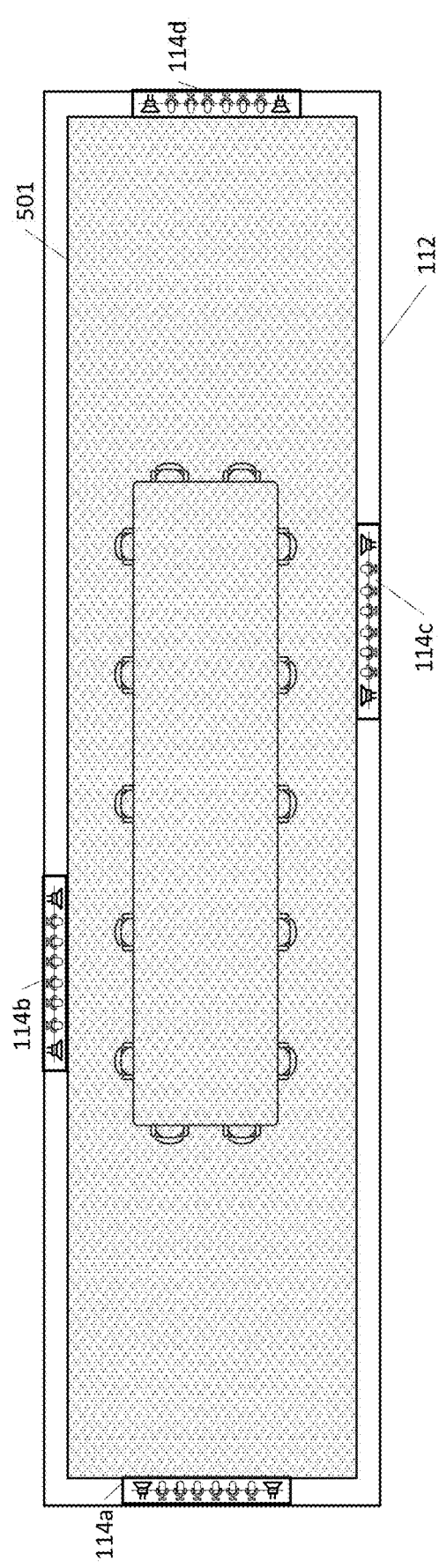
FIG. 5c Invention – Before calibration
FIG. 5d Invention – After calibration

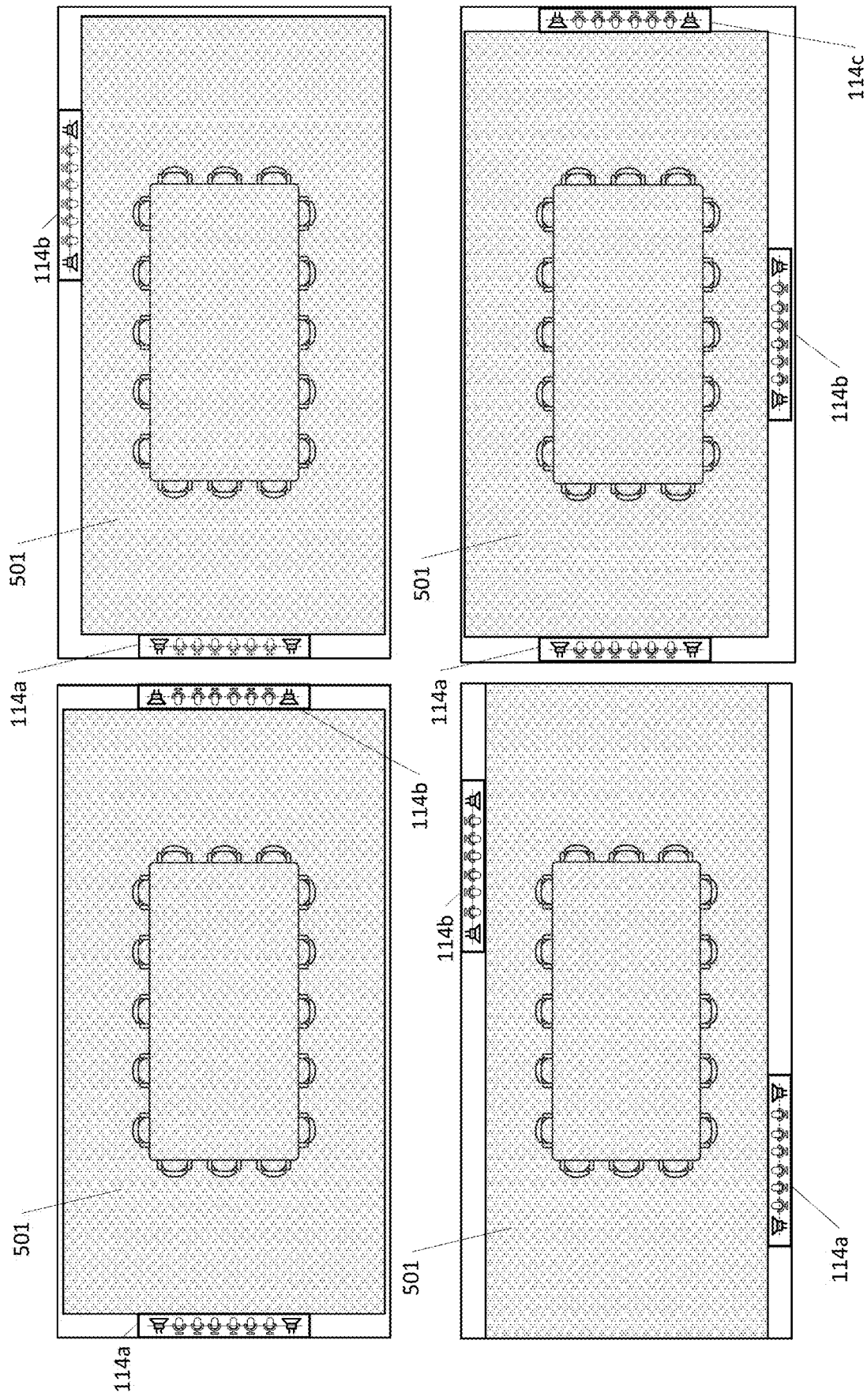
FIG. 5e – Invention - Build a single combined array

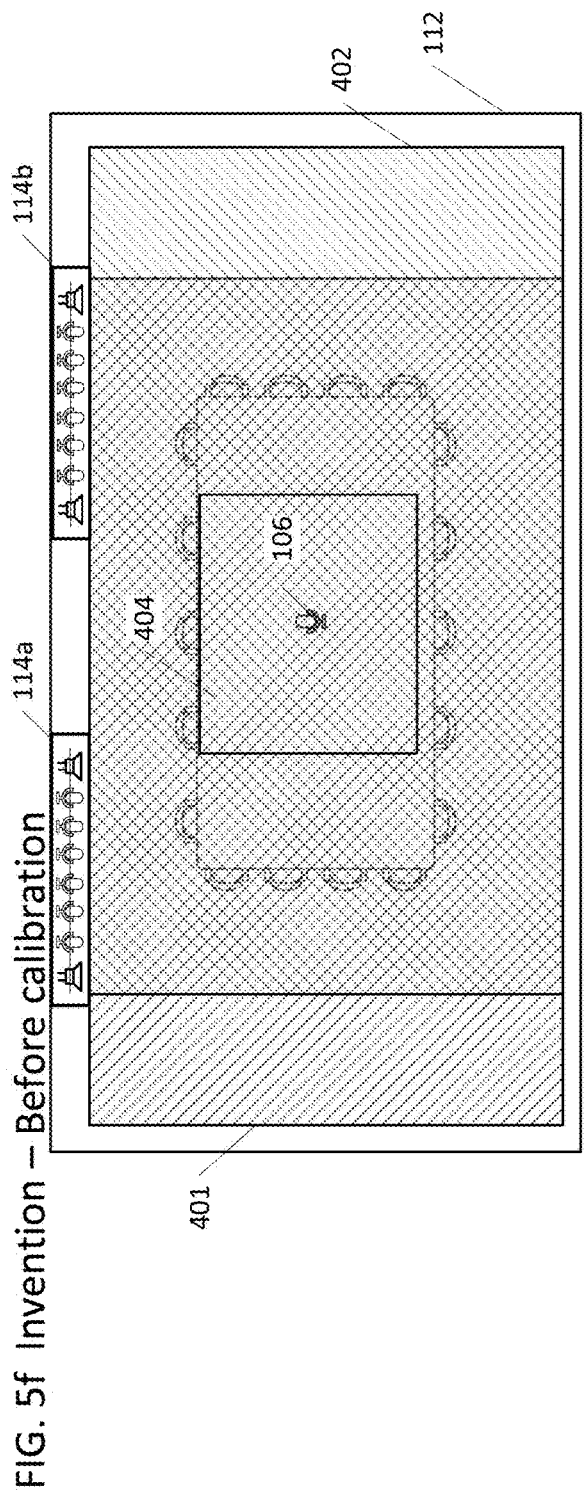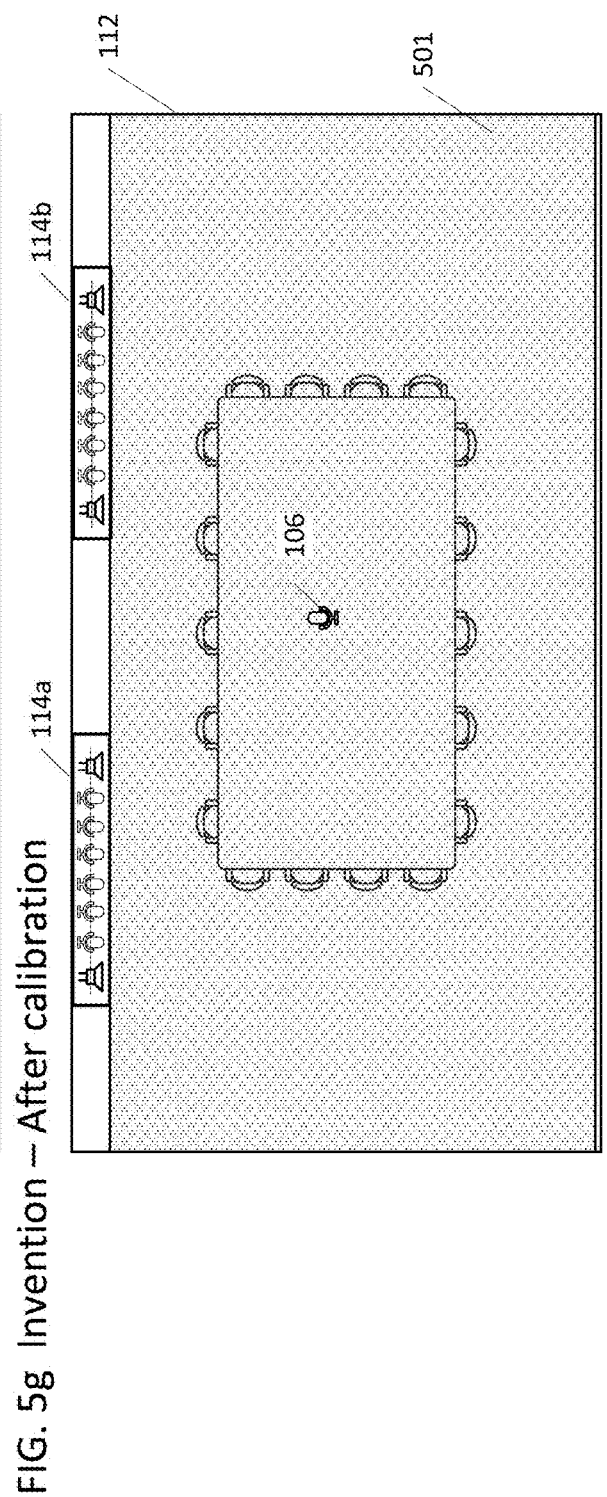

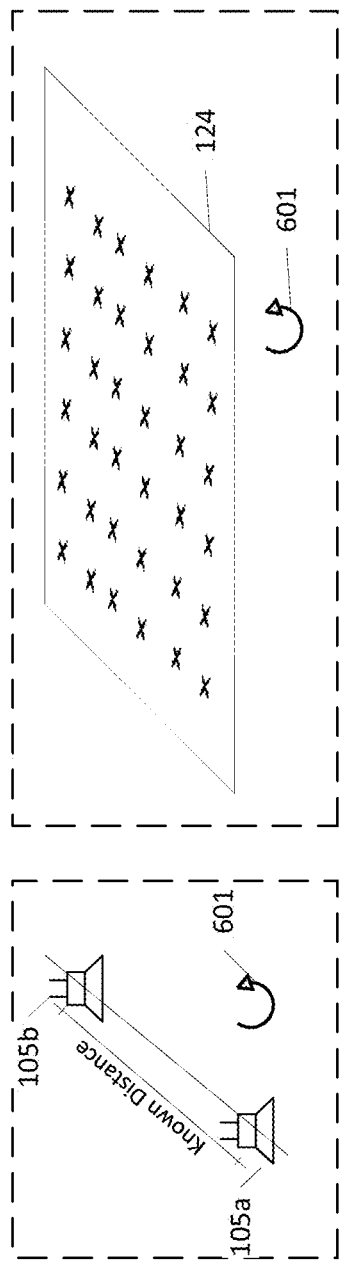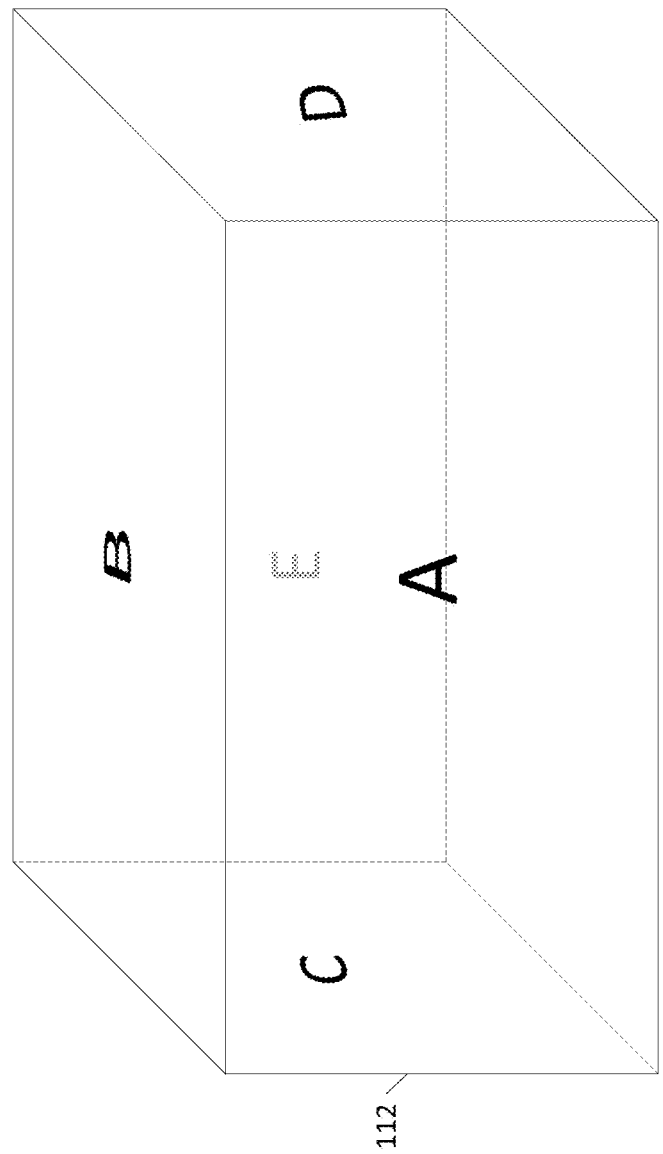
FIG. 6b

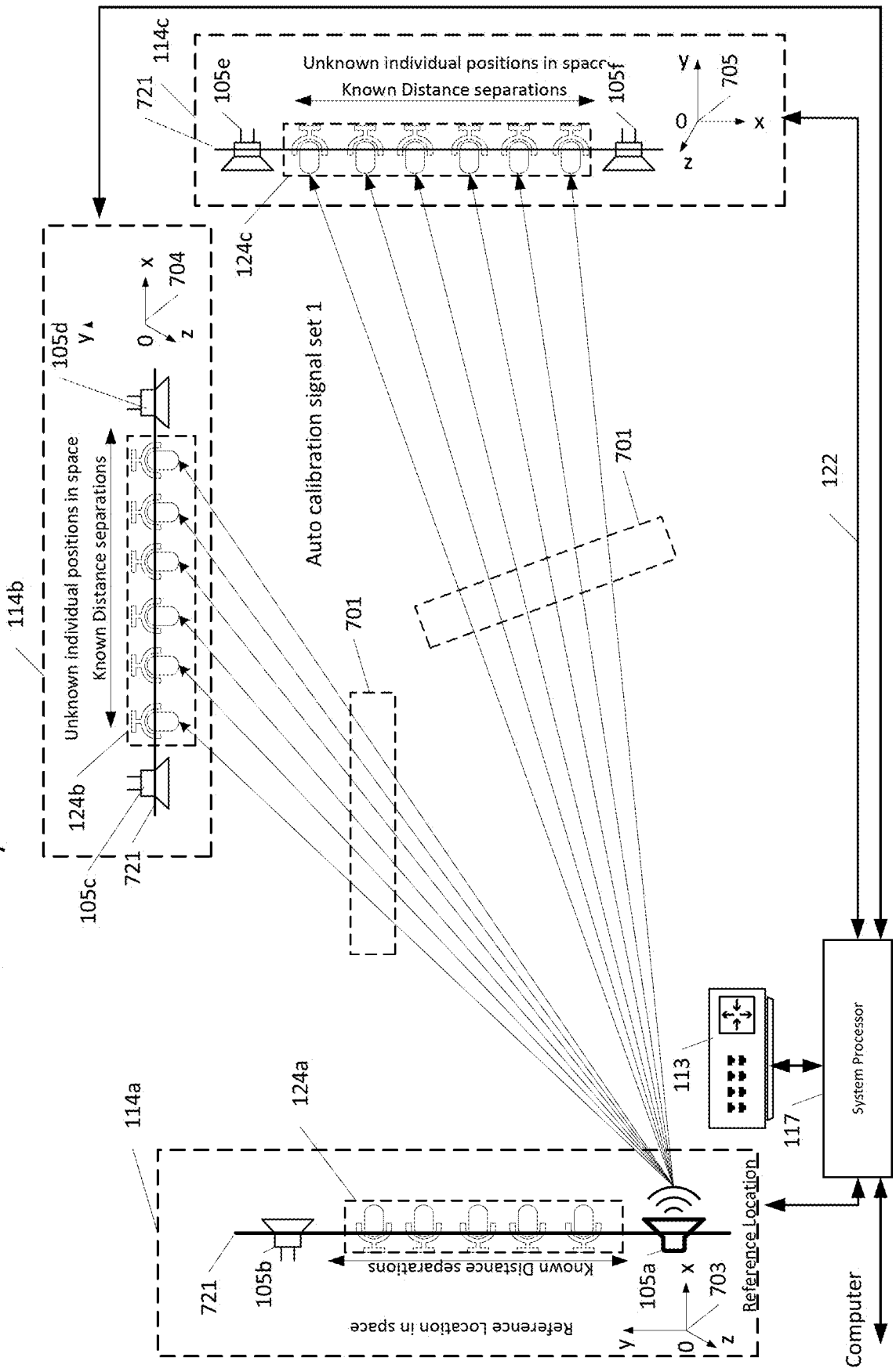

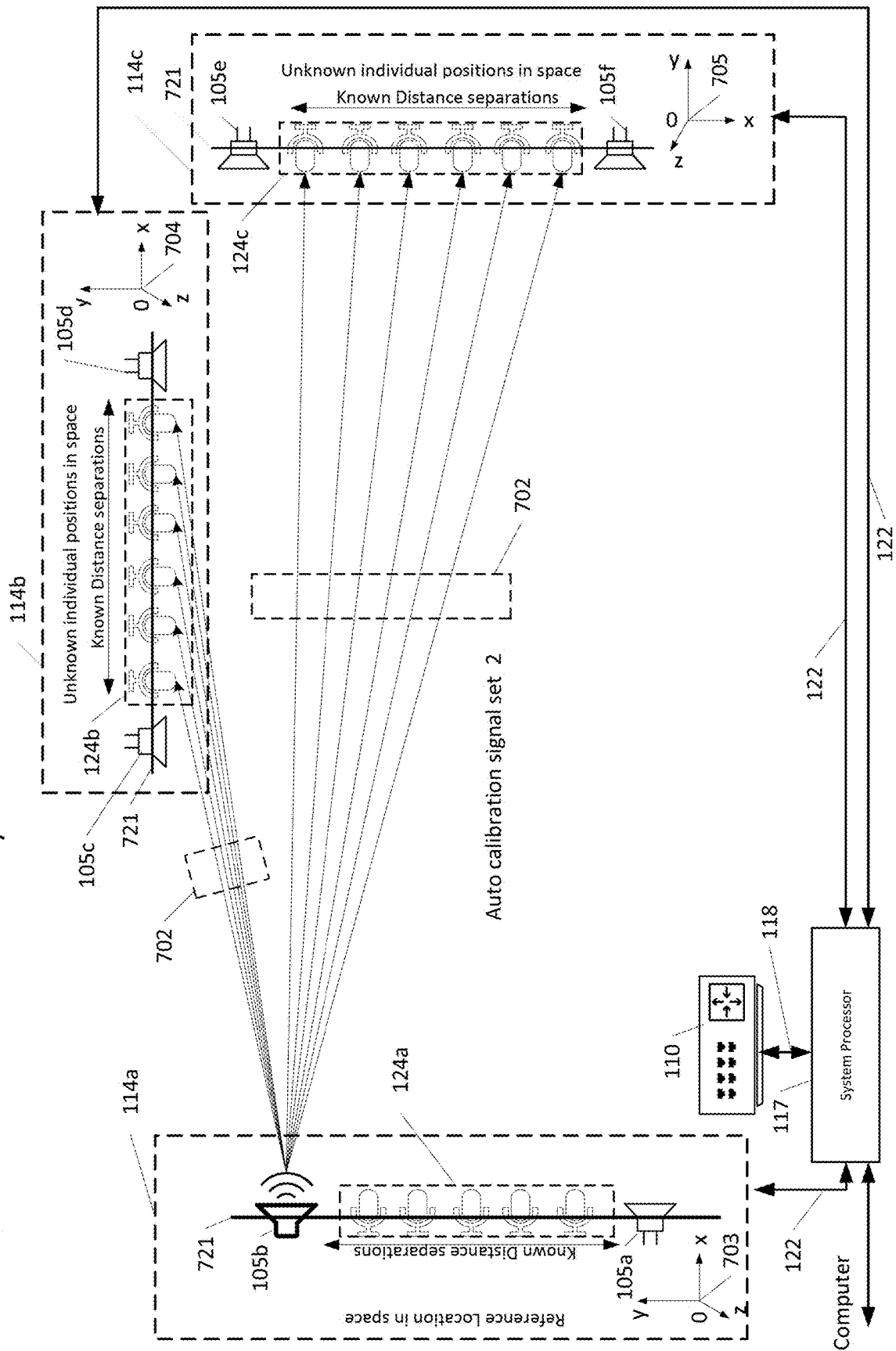
FIG. 7b – Invention build the array

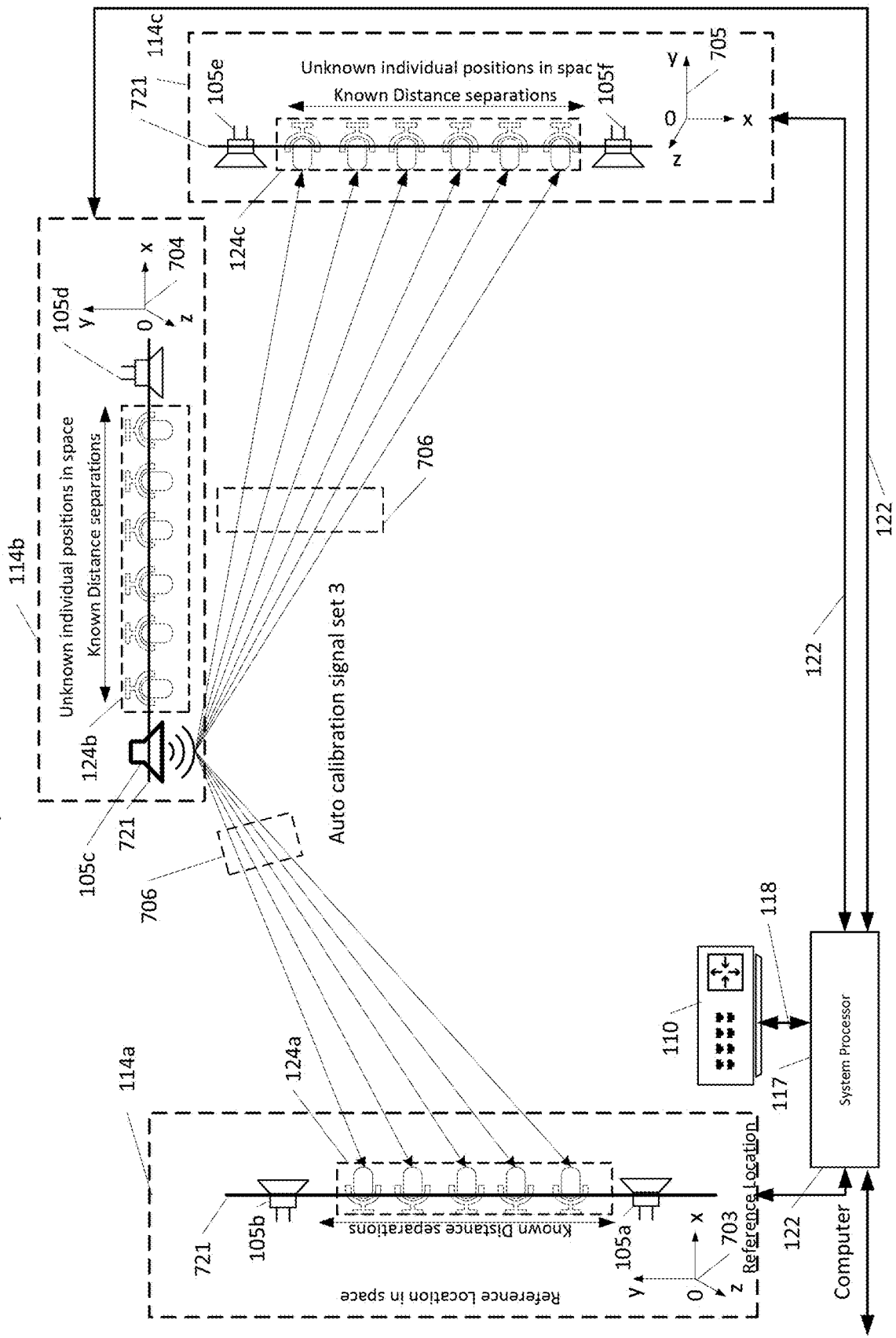

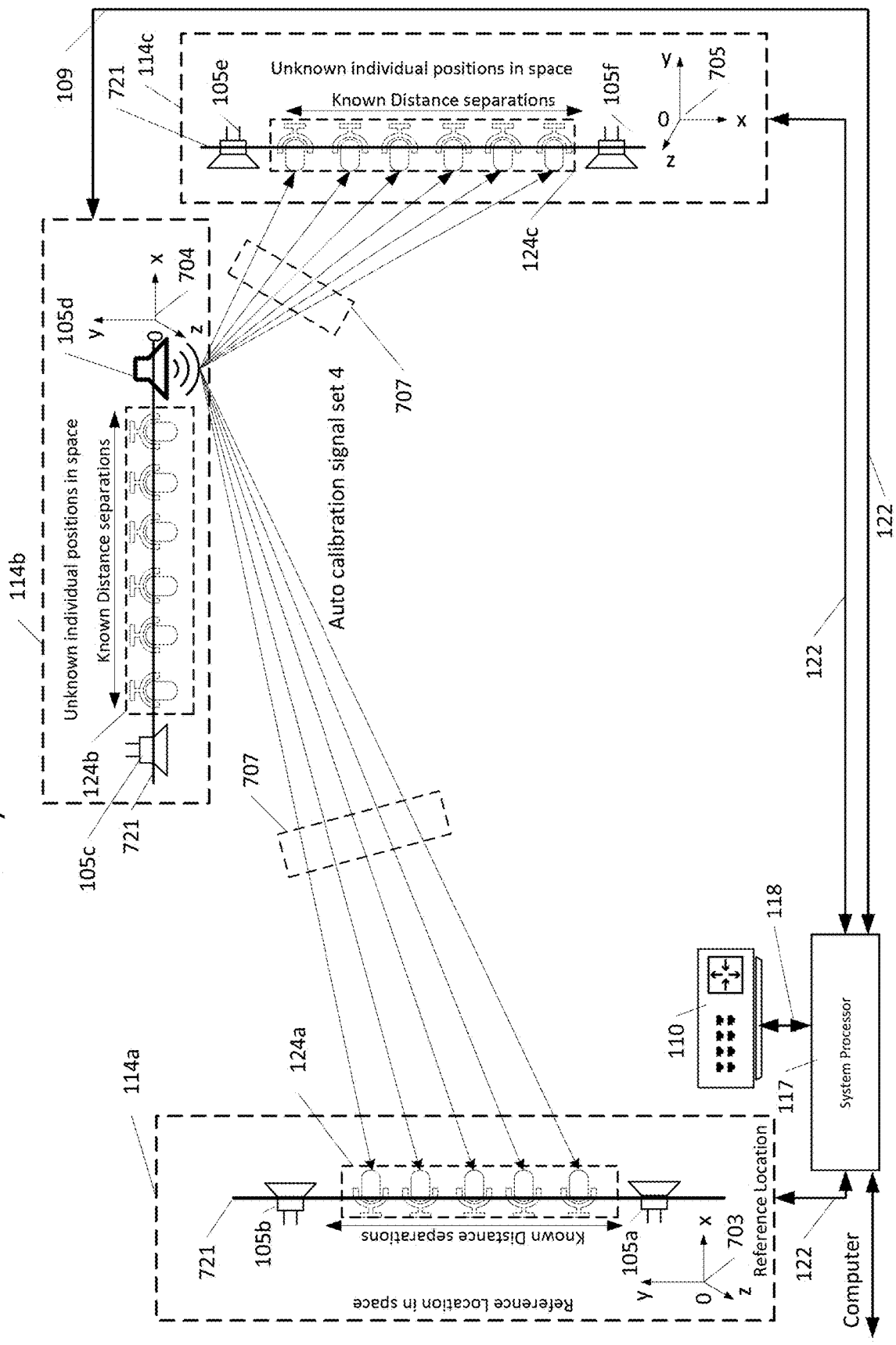
FIG. 7d – Invention build the array

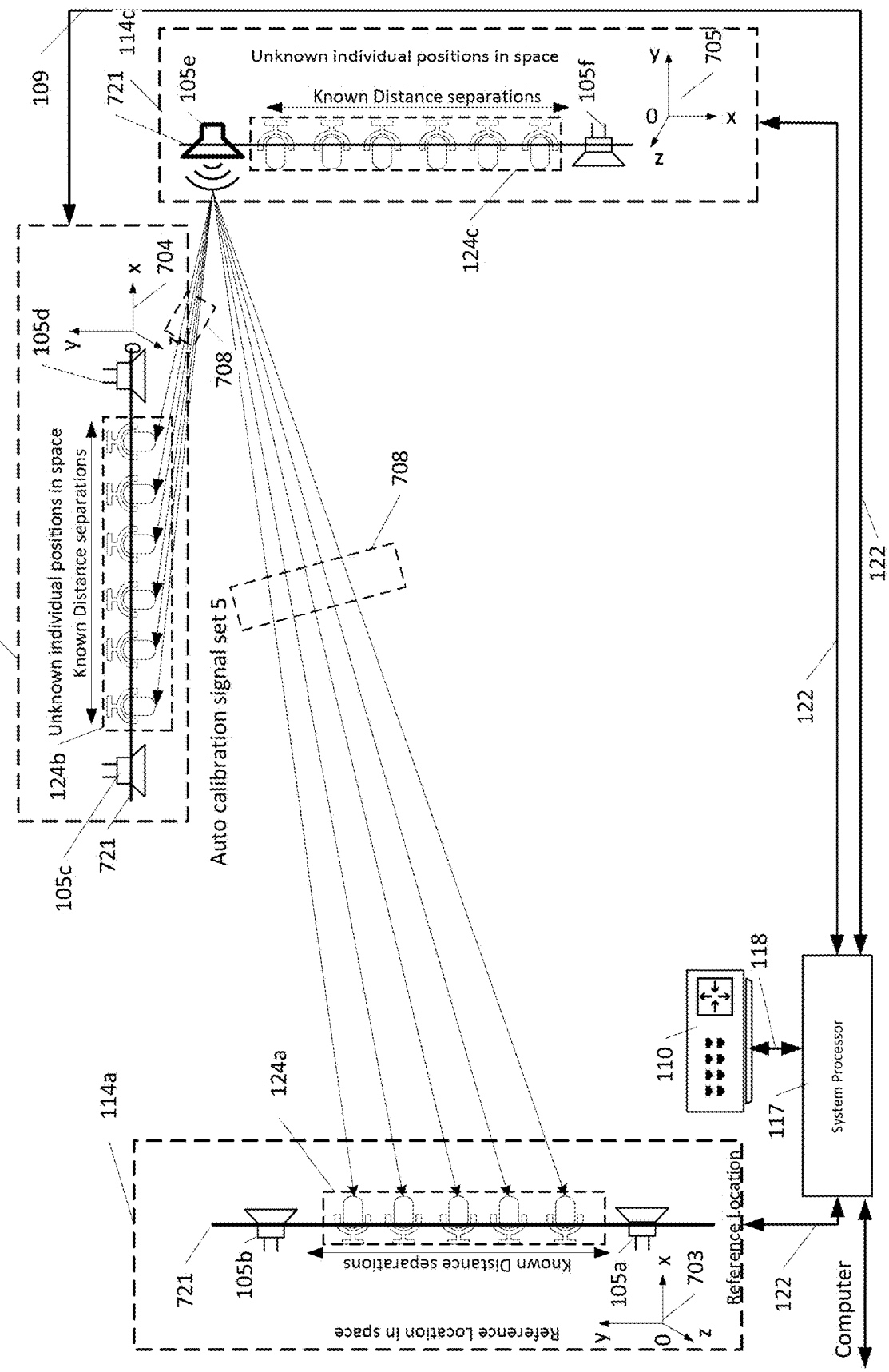

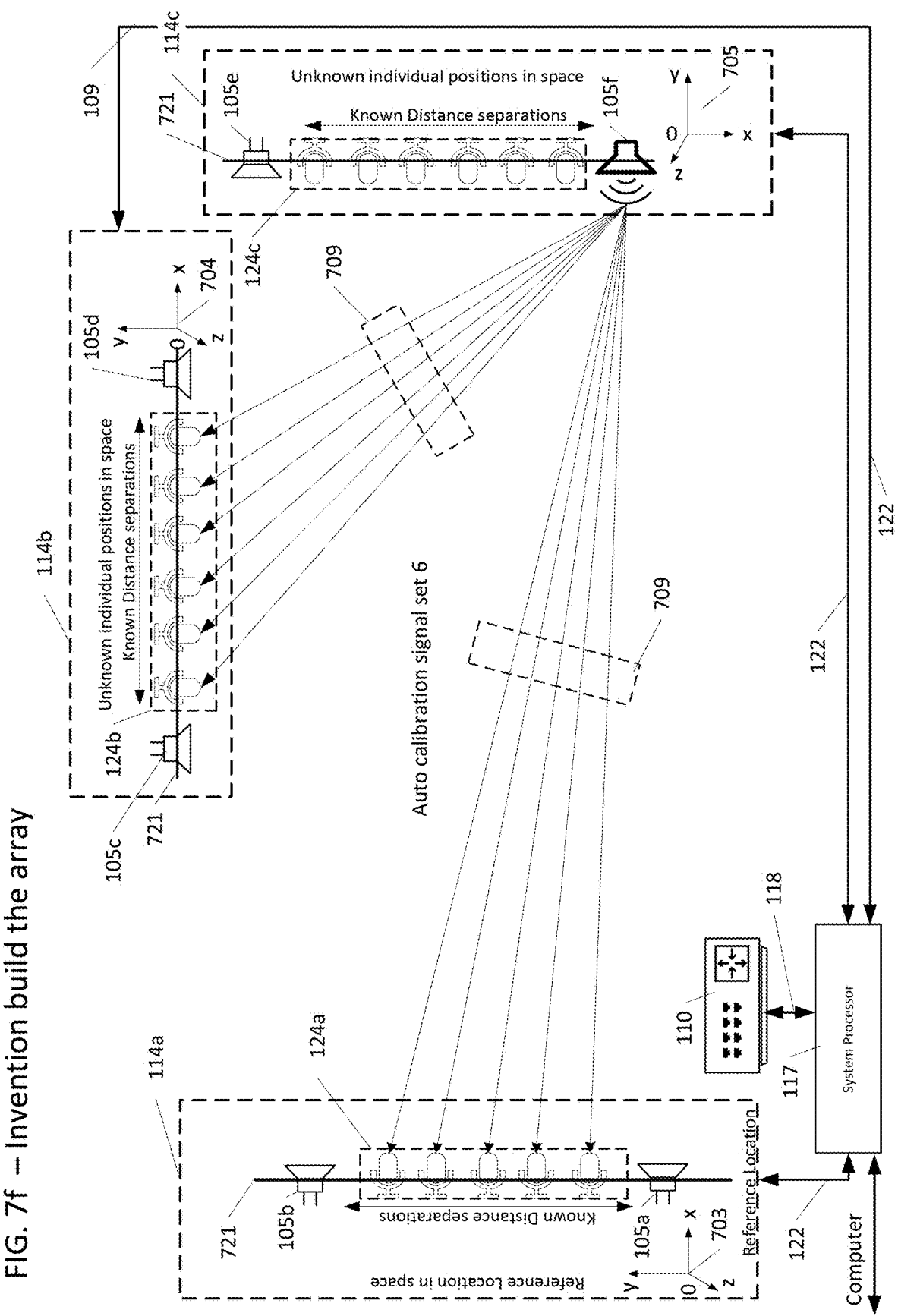

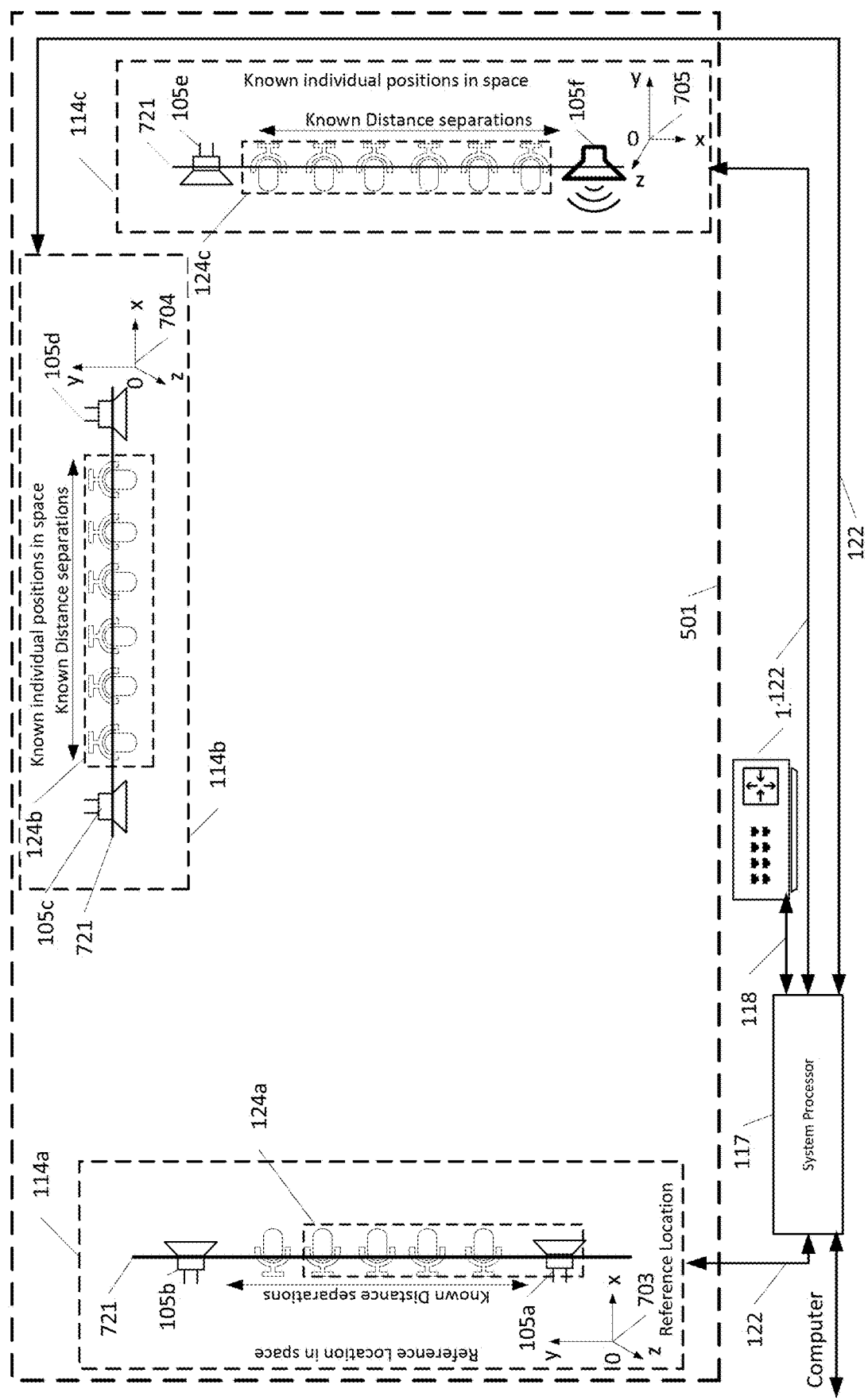
FIG. 7g – Invention array built

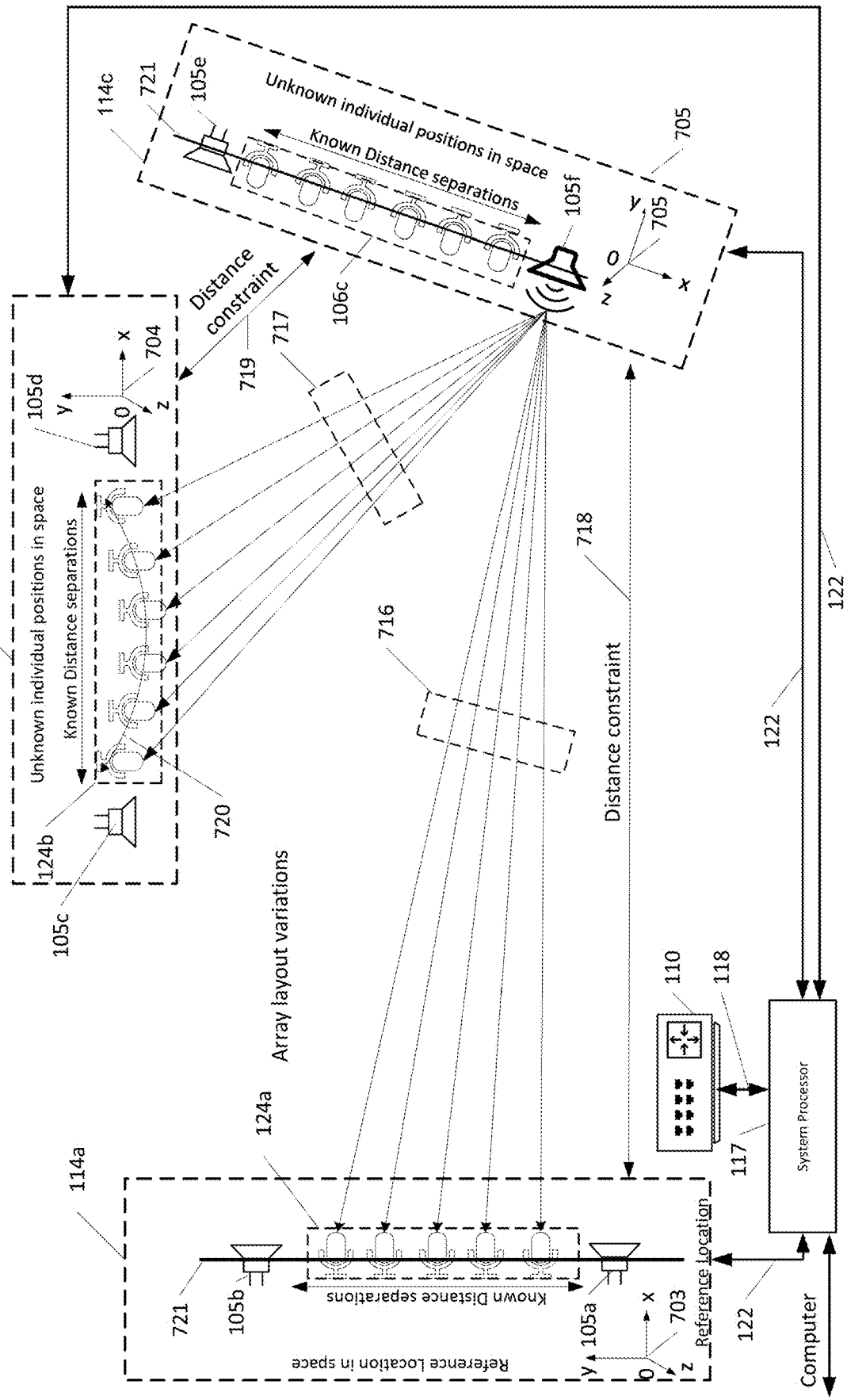
FIG. 7h – Alternate array layout examples

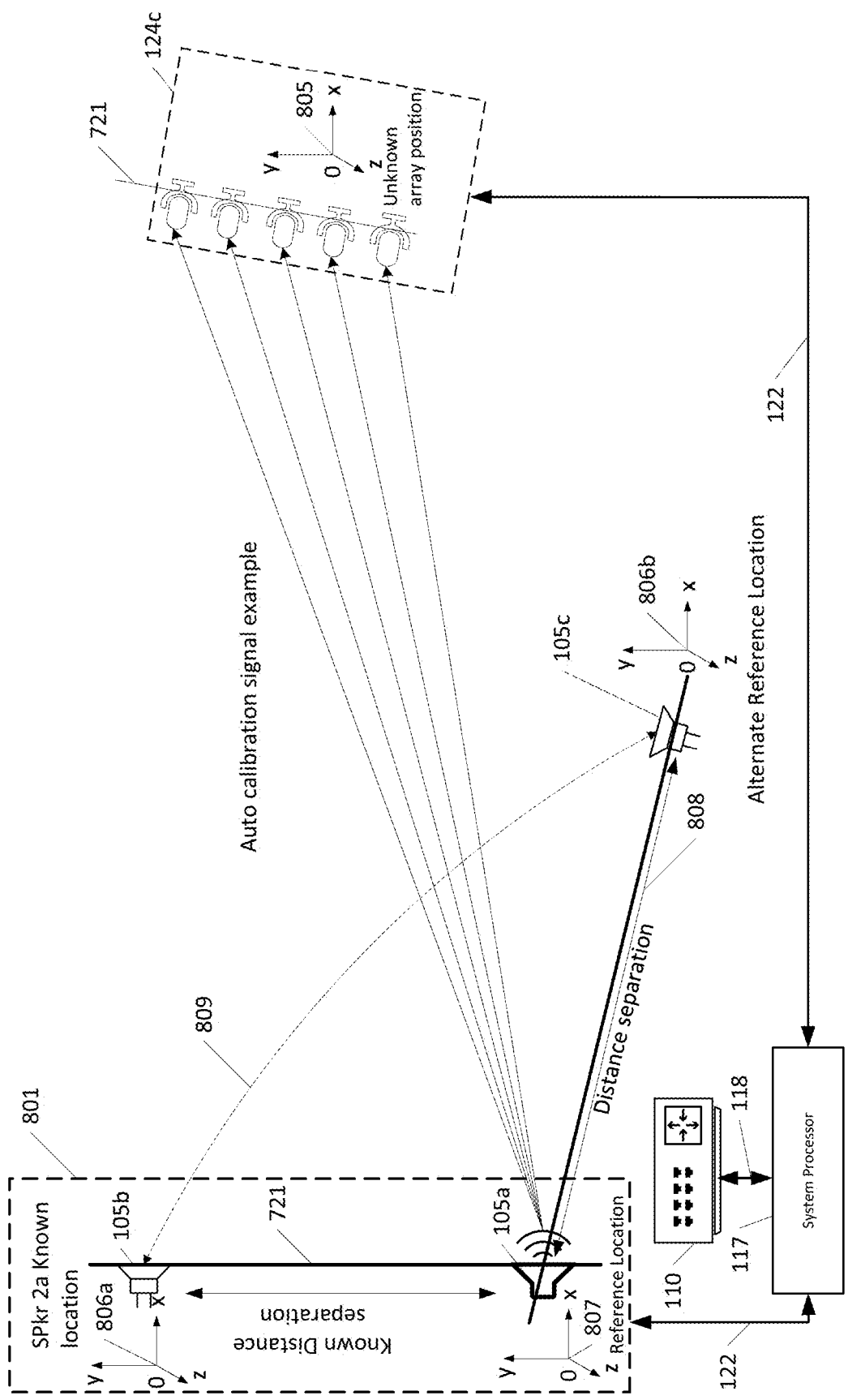
FIG. 8a – Build multi-form factor array

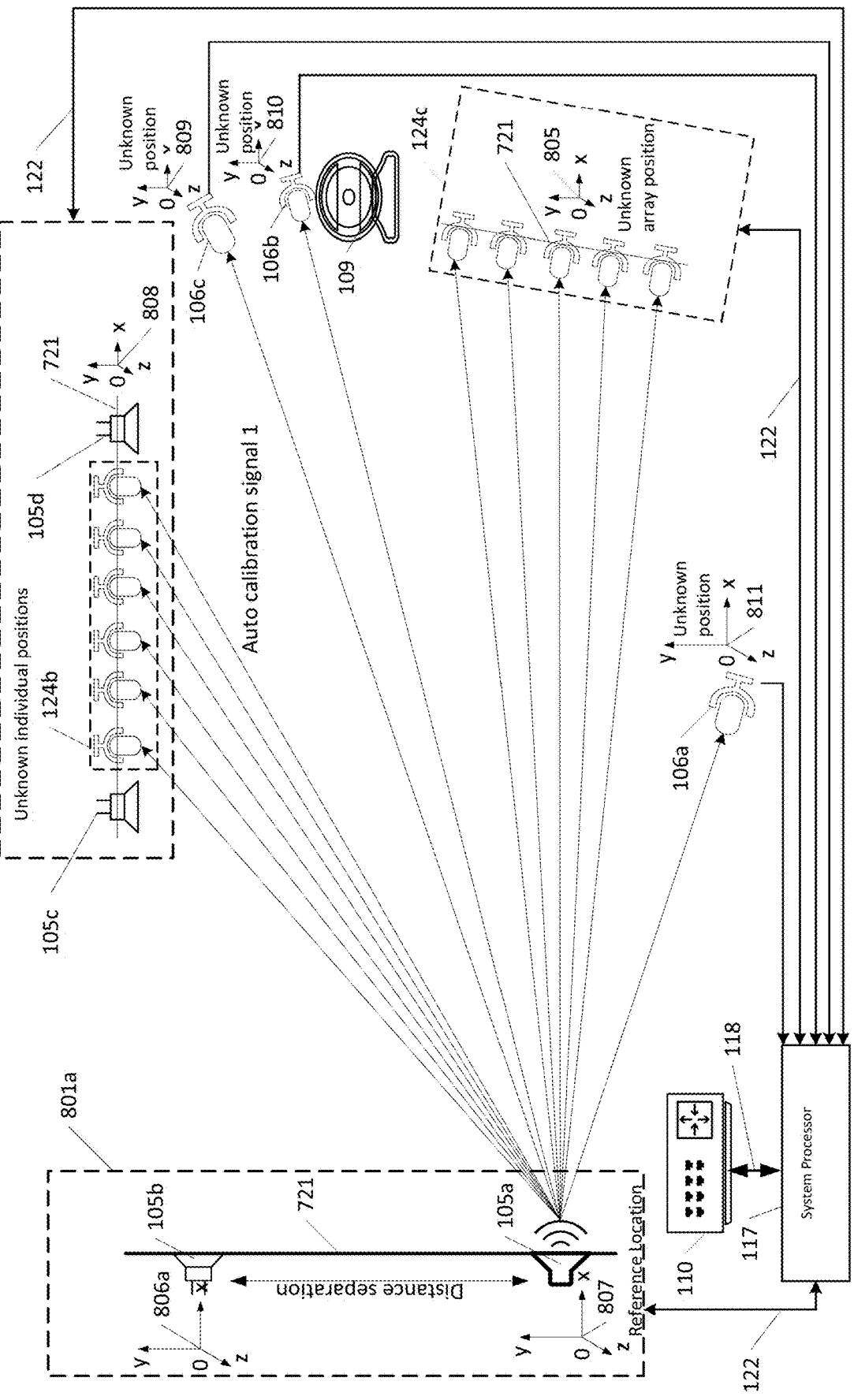
FIG. 8b Build muti-form factor array

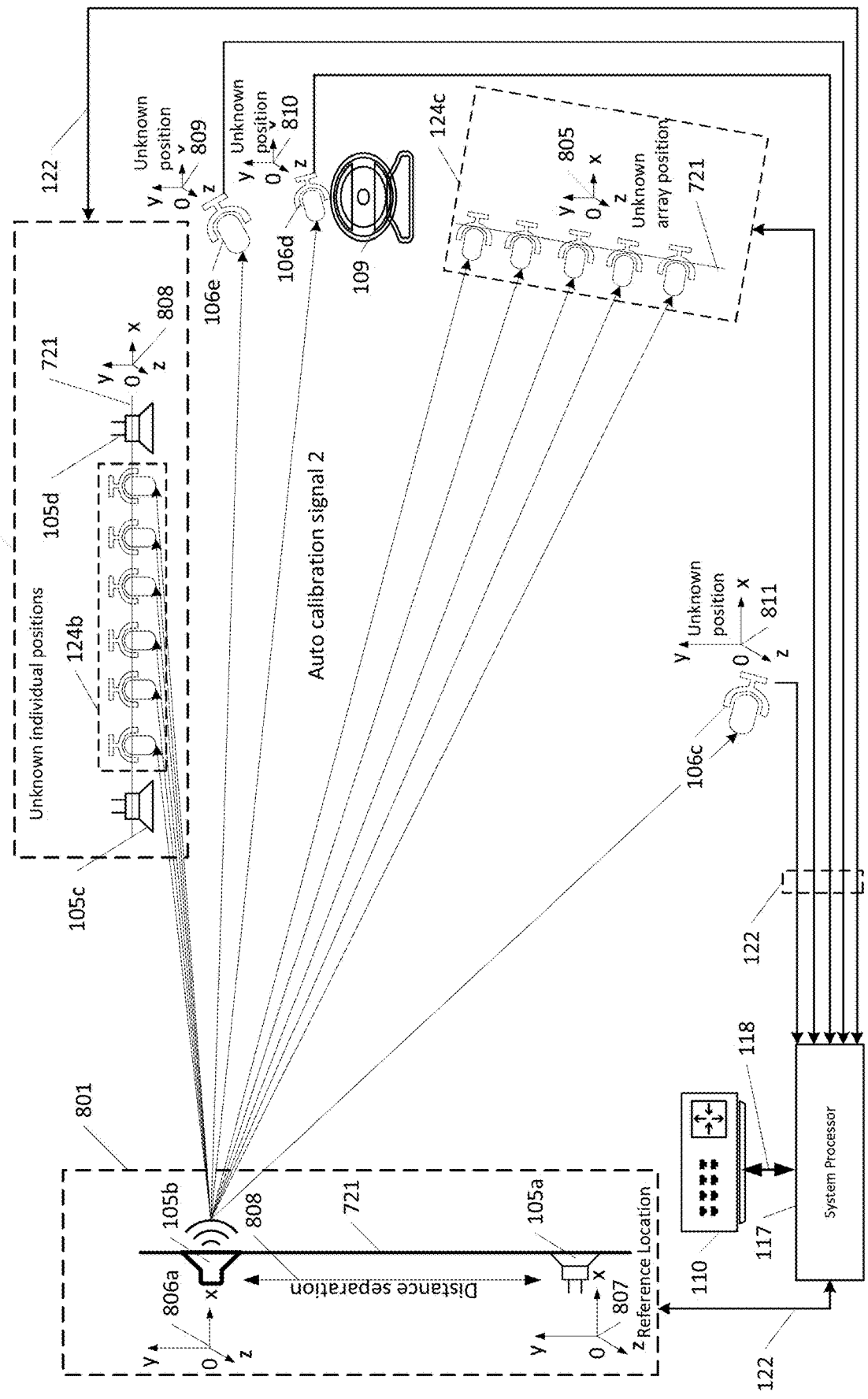

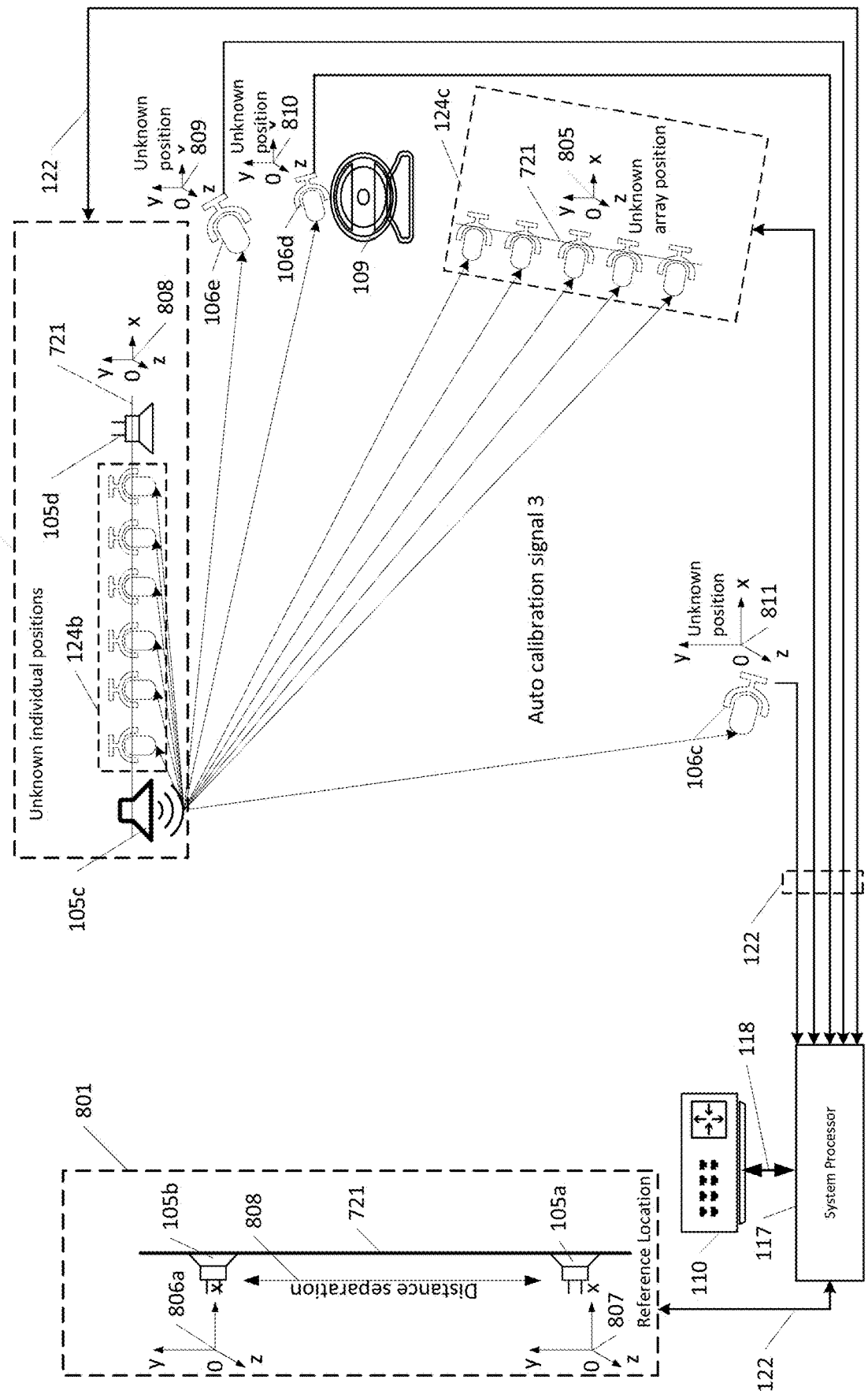
FIG. 8d - Build muti-form factor array

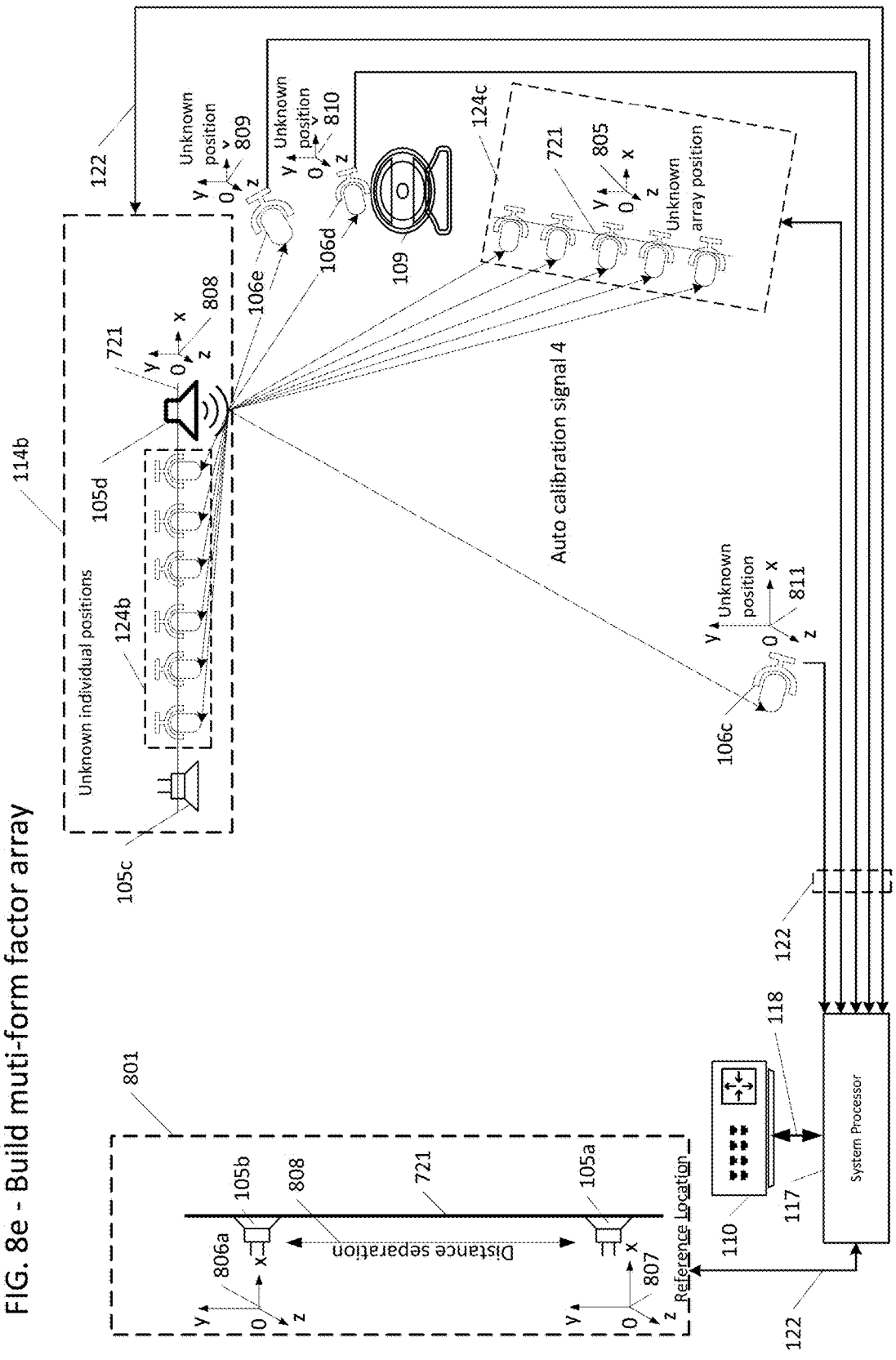

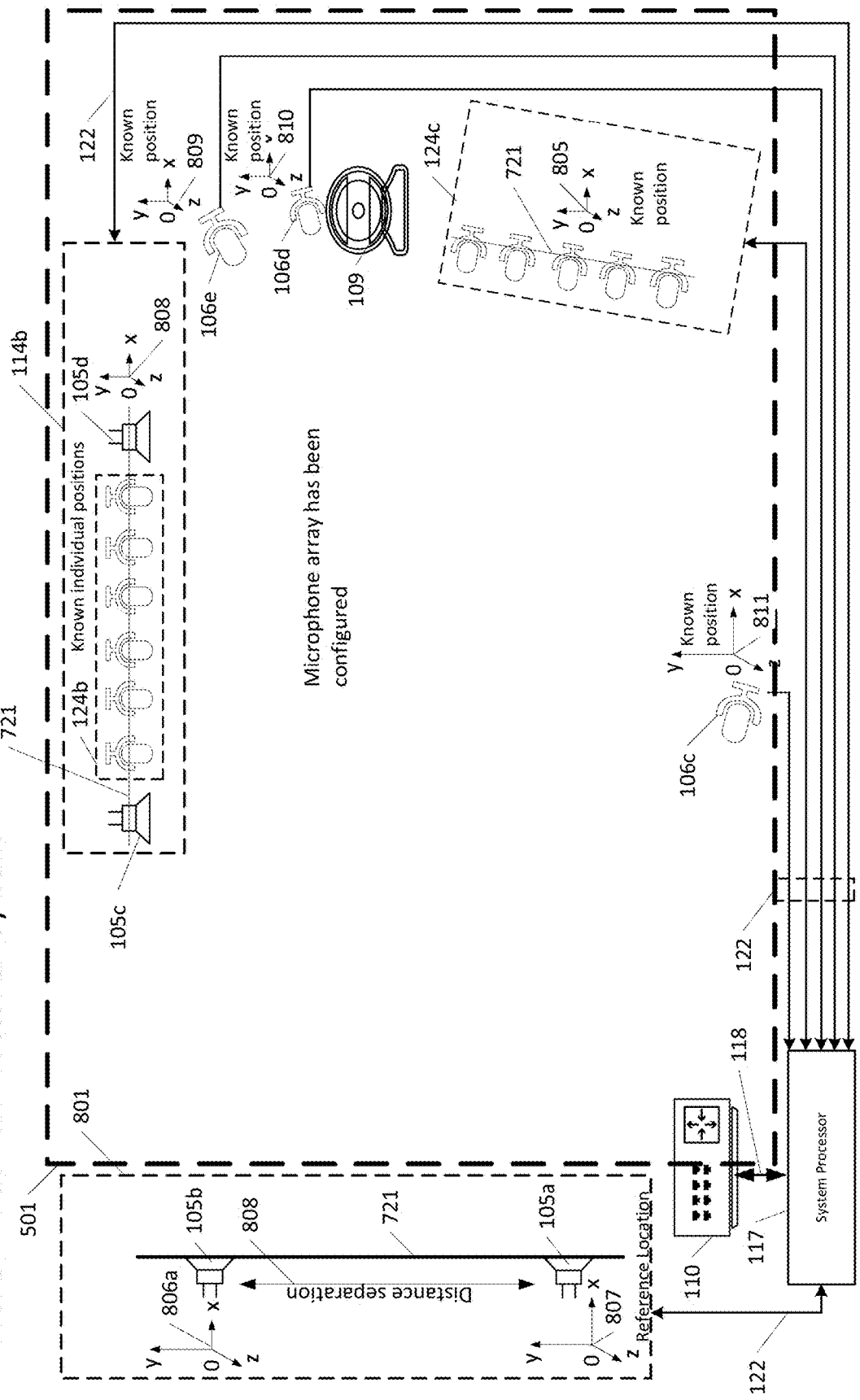
FIG. 8f - Muti-form factor array built

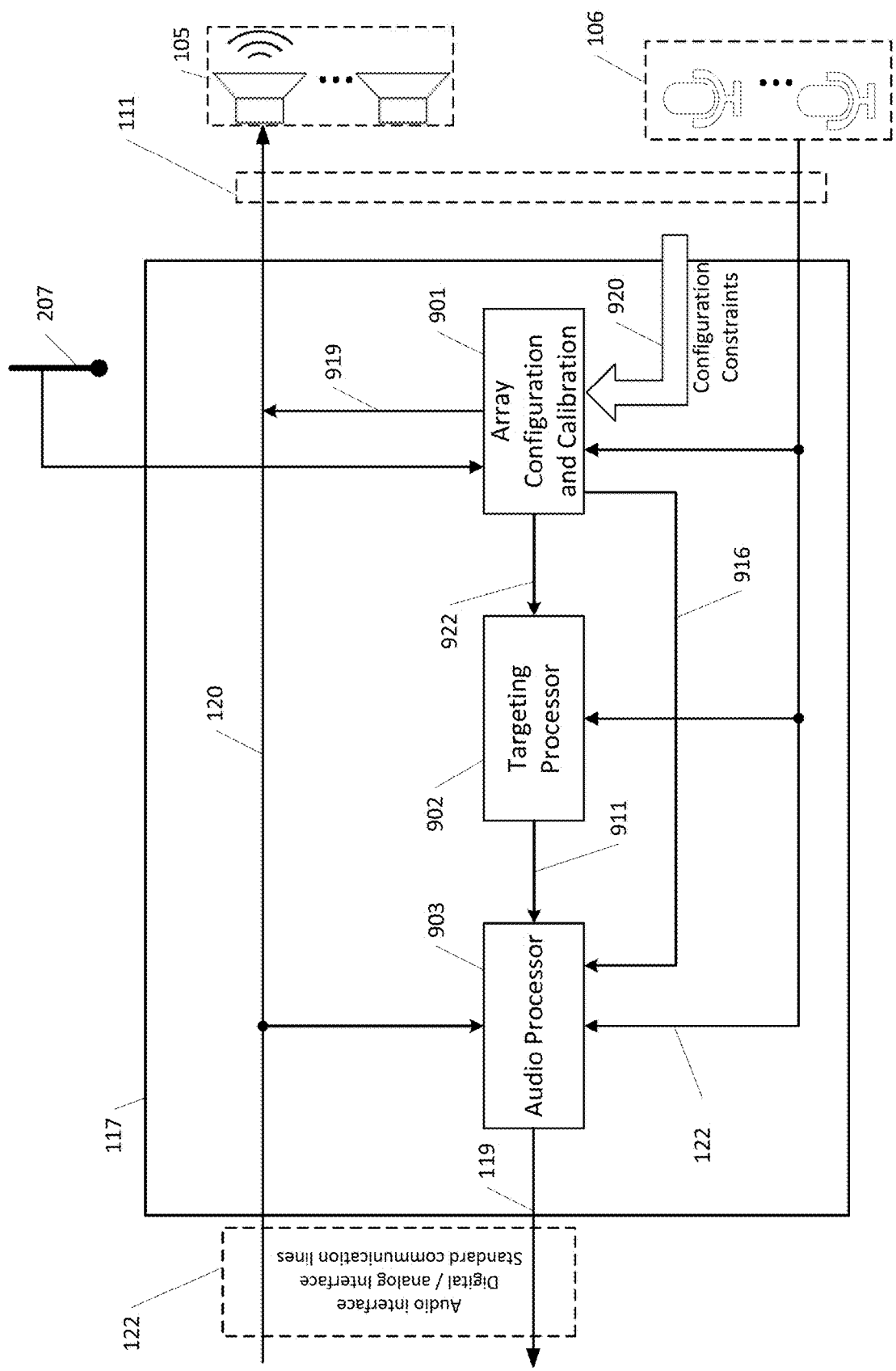
FIG. 9a Invention – Primary Processing Components – System Diagram

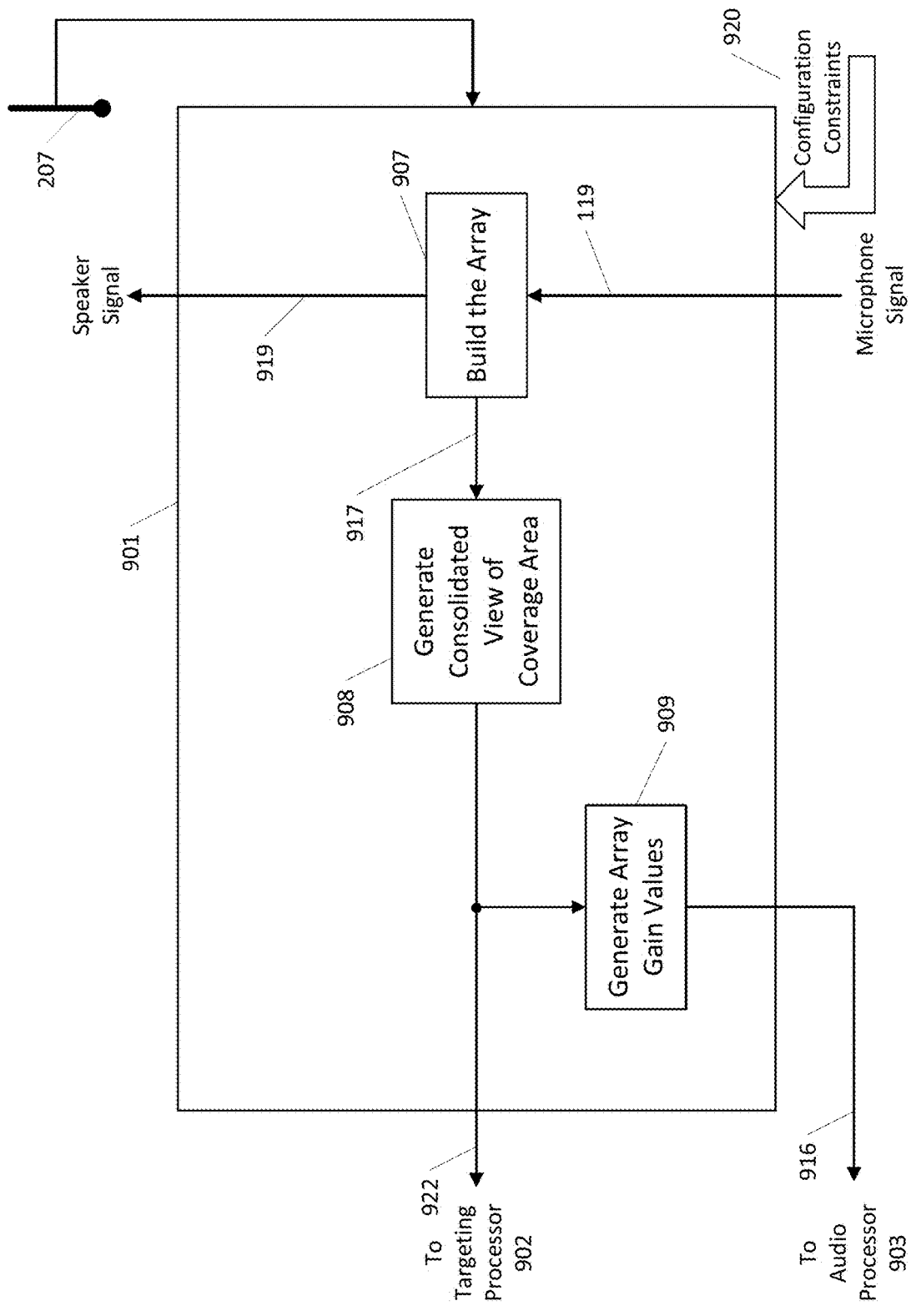
FIG. 9b (901) Invention – Array Configuration and Calibration

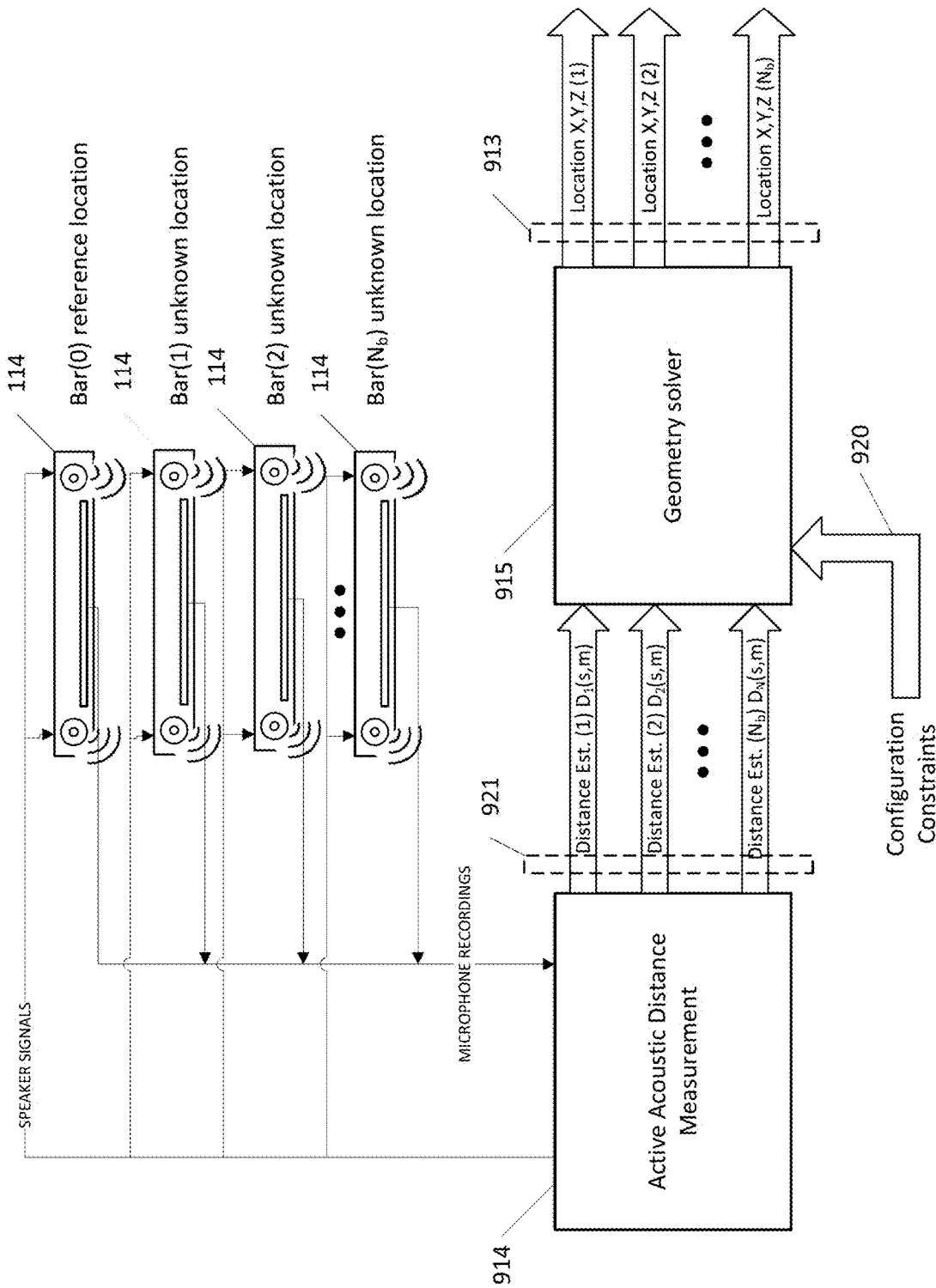
FIG. 9c (907) Invention – Building the Array

FIG. 10 (914) - Distance Measurement Flowchart
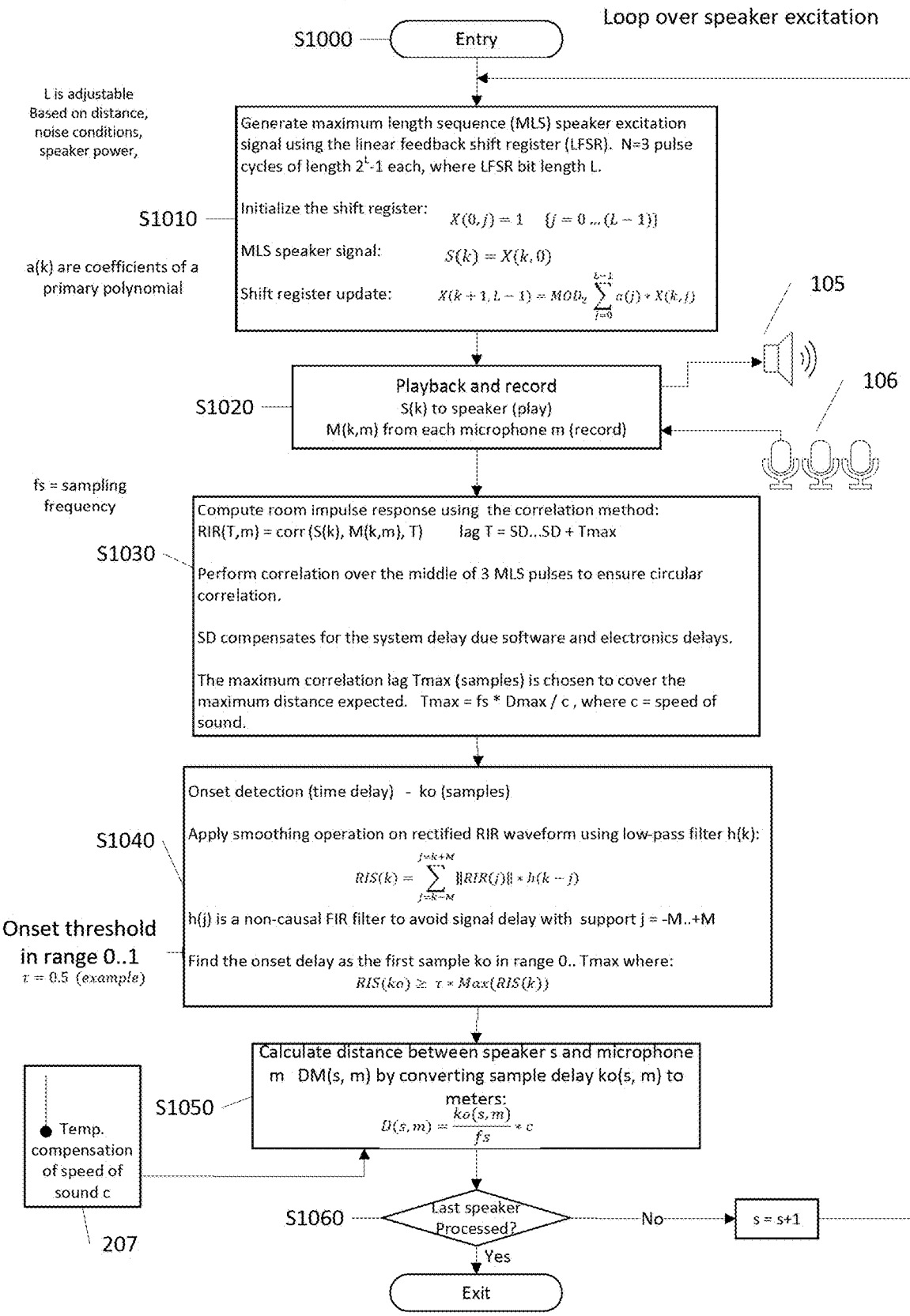

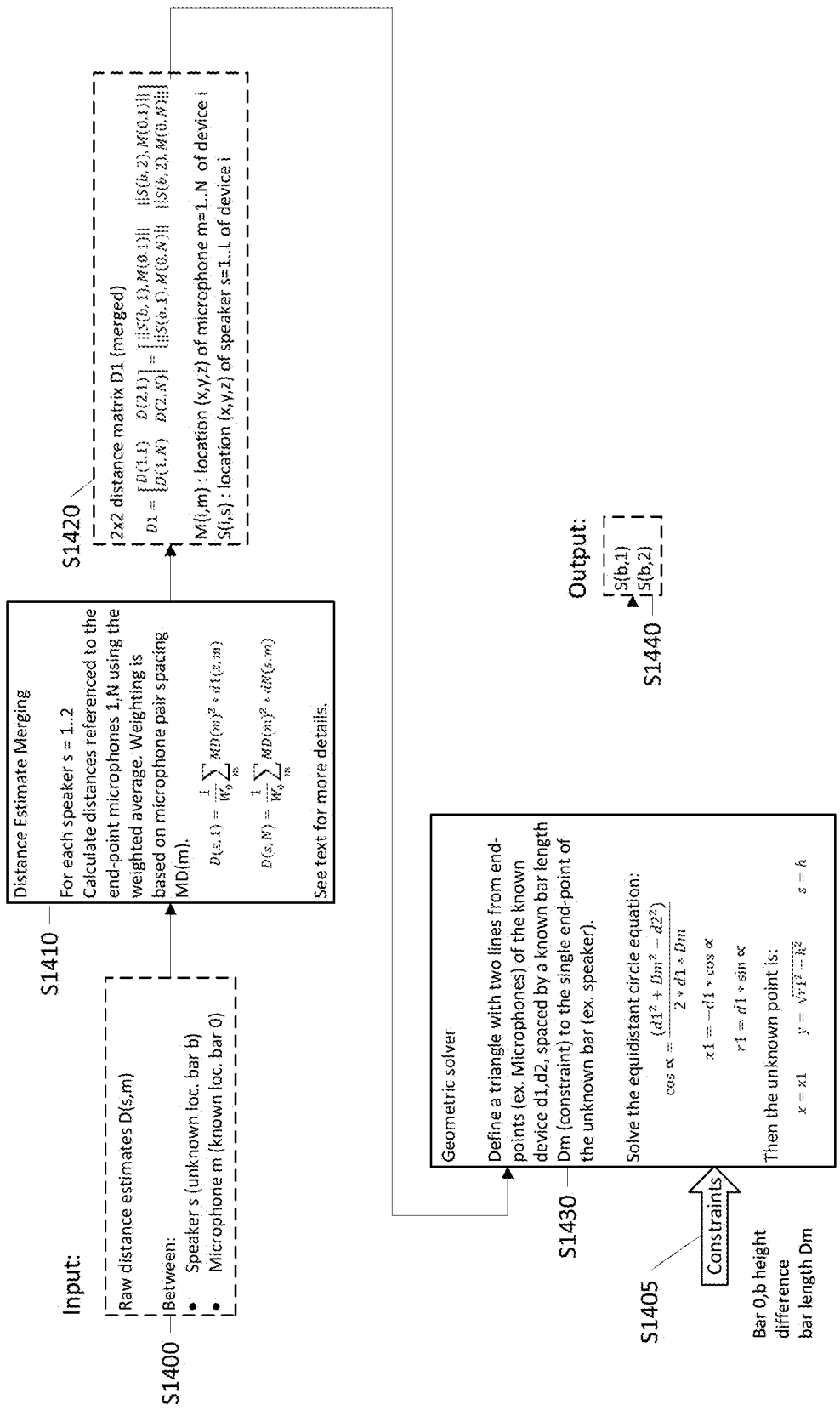

Location solver flowchart – using known location device microphones:

Location solver flowchart – using known location device speakers:

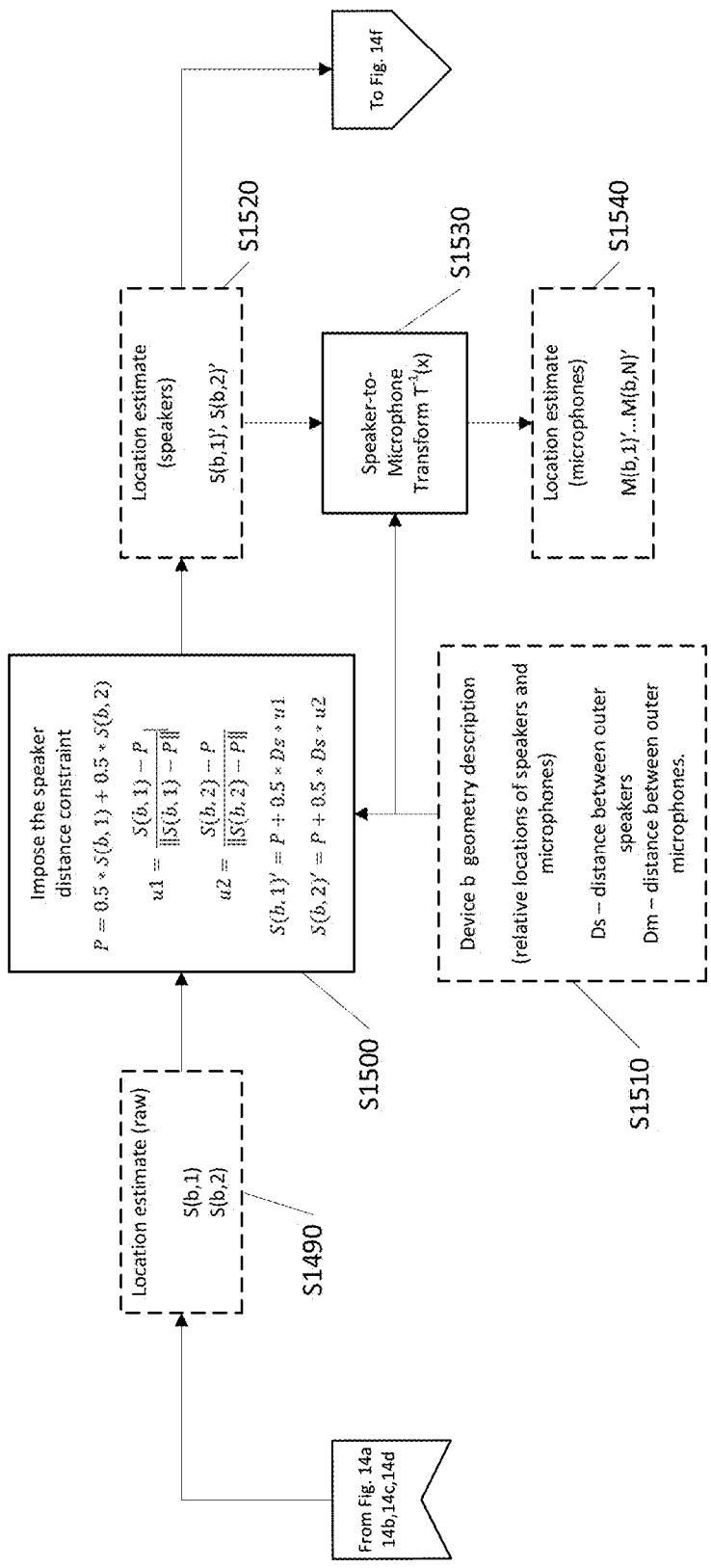
FIG. 14e – Applying device structure constraints

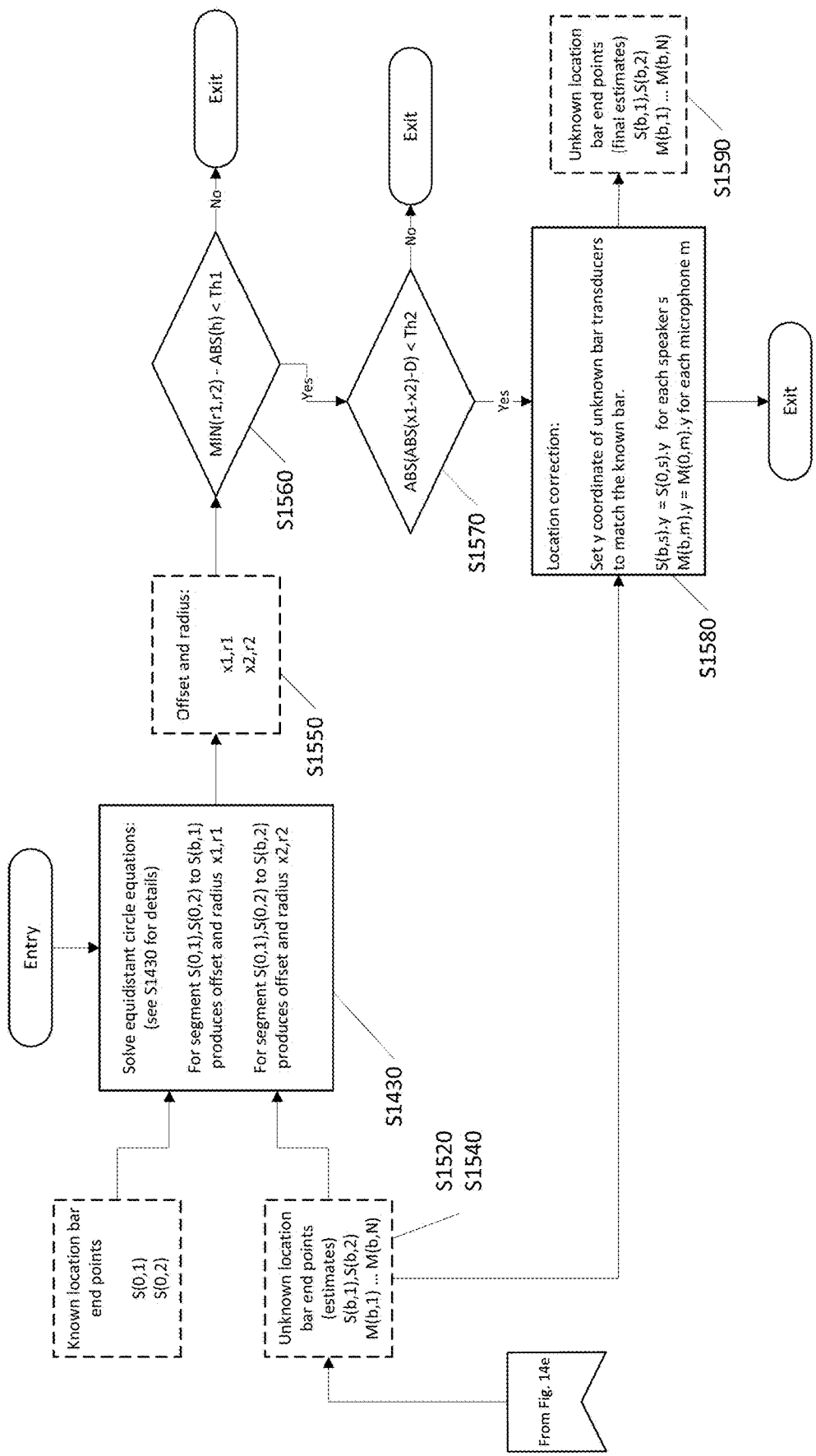
FIG. 14f - A-priori location correction for the same wall case

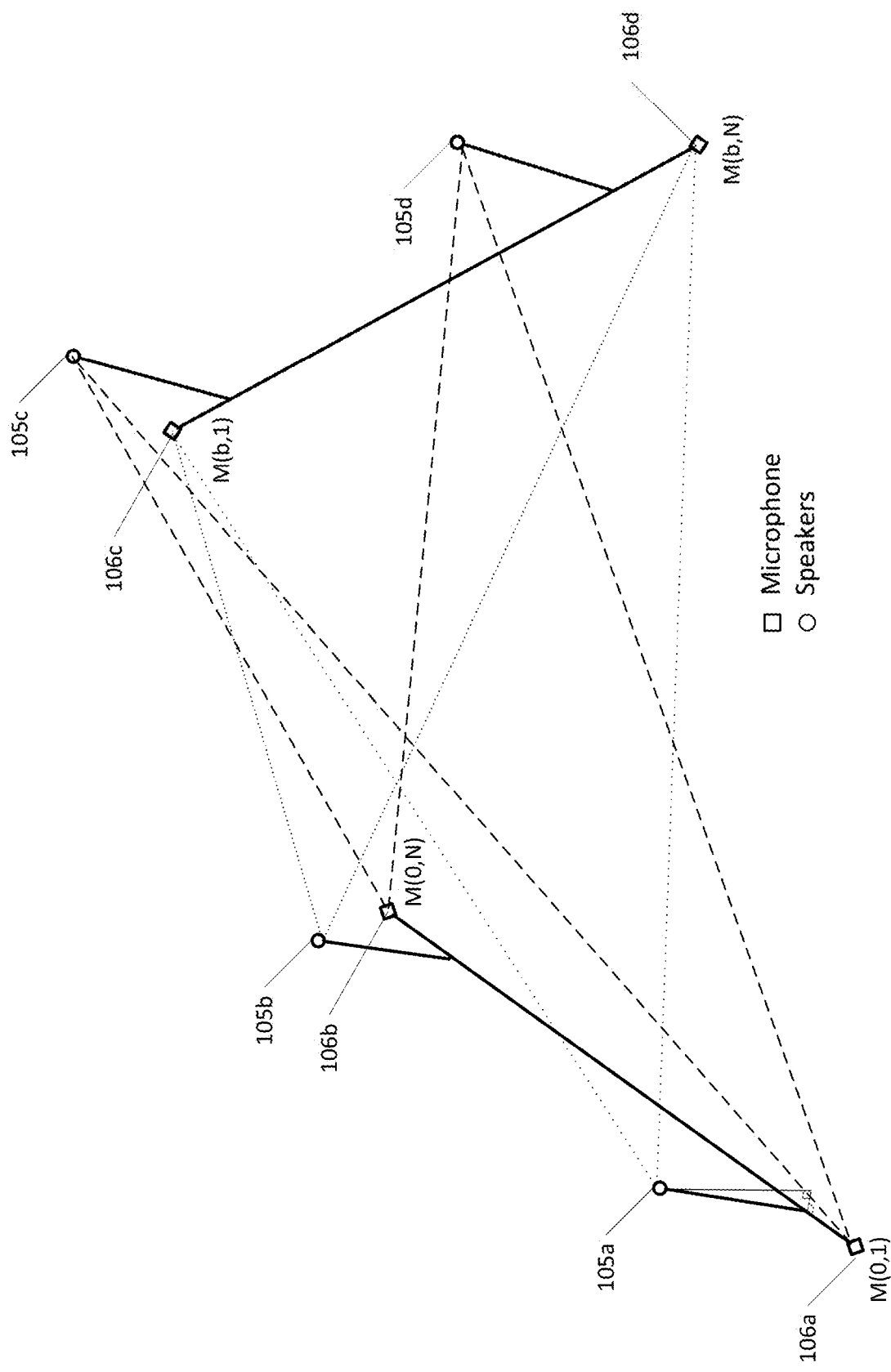
FIG. 15 Definition of distances between two microphone array units.

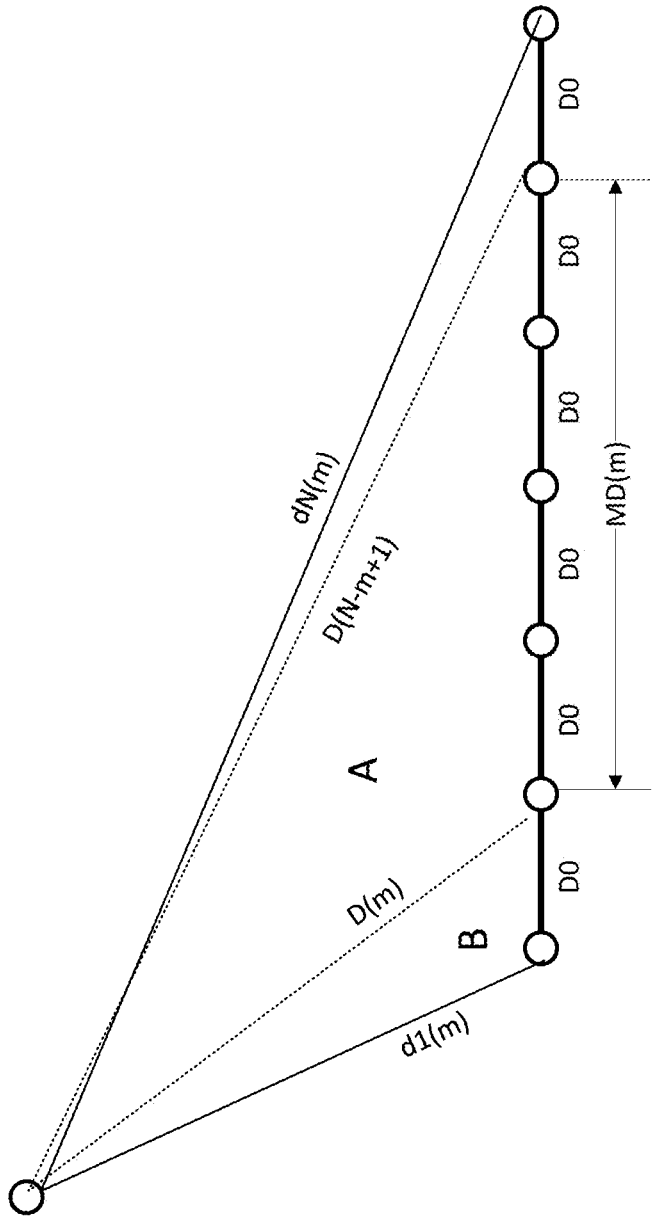
FIG. 16 - Based on known microphones spacing D0 the triangle B is fully defined by the triangle A.

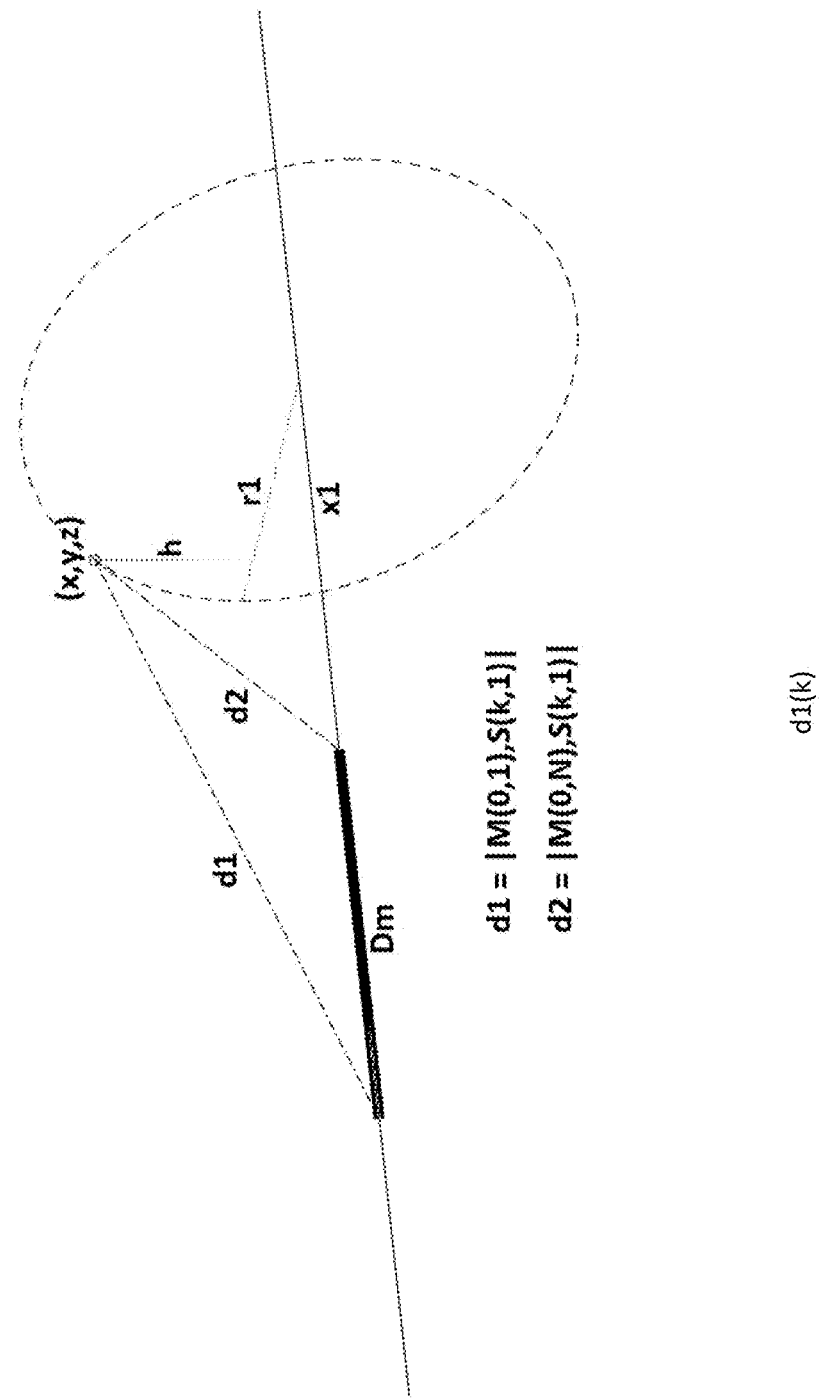
FIG. 17 - Geometric Location Solution

SYSTEM FOR DYNAMICALLY DETERMINING THE LOCATION OF AND CALIBRATION OF SPATIALLY PLACED TRANSDUCERS FOR THE PURPOSE OF FORMING A SINGLE PHYSICAL MICROPHONE ARRAY

CROSS REFERENCE TO RELATED APPLICATIONS

This application claims priority to U.S. Provisional Patent Application No. 63/316,296, filed Mar. 3, 2022, the entire contents of which are incorporated herein by reference.

BACKGROUND OF THE INVENTION

1. Field of the Invention

The present invention generally relates to audio conference systems, and more particularly, to automatically forming a combined or single physical microphone array aperture across two or more associated and/or disassociated ad-hoc microphone elements that can be located at any position in a three-dimensional (3D) space upon connection to the system processor by utilizing auto-calibration signals and methods in real-time for multi-user conference systems to optimize audio signal and noise level performance in the shared space.

2. Description of Related Art

Obtaining high quality audio at both ends of a conference call is difficult to manage due to, but not limited to, variable room dimensions, dynamic seating plans, roaming participants, unknown number of microphones and locations, unknown speaker system locations, known steady state and unknown dynamic noise, variable desired sound source levels, and unknown room reverberation characteristics. This may result in conference call audio having a combination of desired sound sources (participants) and undesired sound sources (return speaker echo signals, HVAC ingress, feedback issues and varied gain levels across all sound sources, etc.).

To provide an audio conference system that addresses dynamic room usage scenarios and the audio performance variables discussed above, microphone systems need to be thoughtfully designed, installed, configured, and calibrated to perform satisfactorily in the environment. The process starts by placing an audio conference system in the room utilizing one or more microphones. The placement of microphone(s) is critical for obtaining adequate room coverage which must then be balanced with proximity of the microphone(s) to the participants to maximize desired vocal audio pickup while reducing the pickup of speakers and undesired sound sources. In a small space where participants are collocated around a table, simple audio conference systems can be placed on the table to provide adequate performance. Larger spaces require multiple microphones of various form factors which may be mounted in any combination of, but not limited to, the ceiling, tables, walls, etc., making for increasingly complex and difficult installations. To optimize audio performance of the audio conference system, various compromises are typically required based on, but not limited to, limited available microphone mounting locations, inability to run connecting cables, room use changes requiring a different microphone layout, seated vs. agile and walking participants, location of undesired noise sources and other equipment in the room, etc. all affecting where and what type of microphones can be placed in the room.

Once mounting locations have been determined and the system has been installed, the audio system will typically require a manual calibration process run by an audio technician to complete setup up. Examples of items checked during the calibration include: the coverage zone for each microphone type, gain structure and levels of the microphone inputs, feedback calibration and adjustment of speaker levels and echo canceler calibration. It should be noted that in the current art, the microphone systems do not have knowledge of location information relative to other microphones and speakers in the system, so the setup procedure is managing for basic signal levels and audio parameters to account for the unknown placement of equipment. As a result, if any part of the microphone or speaker system is removed, replaced, or new microphone and speakers are added, the system would need to undergo a new calibration and configuration procedure. Even though the audio conference system has been calibrated to work as a system, the microphone elements operate independently of each other requiring complex switching and management logic to ensure the correct microphone system element is active for the appropriate speaking participant in the room.

The optimum solution would be a conference system that is able to adapt in real-time utilizing all available microphone elements in shared space as a single physical array. However, fully automating the audio microphone calibration process and creating a single microphone array out of multiple individual microphones and solving such problems have proven difficult and insufficient within the current art.

An automatic calibration process is preferably required which will detect microphones attached or removed from the system, locate the microphones in 3D space to sufficient position and orientation accuracy to form a single cohesive microphone array element out of all the in-room microphones. With all microphones operating as a single physical microphone element, effectively a microphone array, the system will be able to manage gain, track participants and accommodate a wide range of microphone placement options one of which is being able to plug a new microphone element into the system processor and have the audio conference system integrate the new microphone element into the microphone array in real-time.

Systems in the current art do not determine microphone element positions in 3D space and rely on a manual calibration and setup process to setup the audio conference system requiring complex digital signal processor (DSP) switching and management processors to integrate independent microphones into a coordinated microphone room coverage selection process based on the position and sound levels of the participants in the room. If a new microphone element is required for extra room coverage, the audio conference system will typically need to be taken offline, recalibrated, and configured to account for coverage patterns as microphones are added or removed from the audio conference system.

Therefore, the current art is not able to provide a dynamically formed and continuously calibrated microphone array system in real-time during audio conference system setup taking into account multiple microphone-to-speaker combinations, multiple microphone and microphone array formats, microphone room position, addition and removal of microphones, in-room reverberation, and return echo signals.

SUMMARY OF THE INVENTION

An object of the present embodiments is, in real-time upon connection of one or more microphone elements, to dynamically locate each microphone element in a 3D space to sufficient (x, y, z) relative accuracy to at least one reference speaker at a known location. More specifically, it is an object of the invention to preferably locate each microphone element in a 3D space for the purpose of integration into a common physical microphone array system regardless of the number of microphone elements connected to the system processor, location of the microphone elements, and orientation of the microphone elements in the shared 3D space.

The present invention provides a real-time adaptable solution to undertake creation of an unobtrusive and continuously dynamic single physical array element out of two or more microphone elements for the purpose of building a single physical microphone array aperture within complex systems and multiuse shared spaces.

These advantages and others are achieved, for example, by a system for automatically forming a single physical combined microphone array aperture in real-time across associated and/or disassociated ad-hoc microphone elements in a shared 3D space. The system includes a plurality of microphone/speaker units and a system processor communicating with the microphone/speaker units. Each of microphone/speaker units includes at least one microphone and/or at least one speaker. One of the microphone/speaker units which includes at least one speaker is selected as a reference microphone/speaker unit for auto-calibration, and a location of the reference microphone/speaker unit is determined and selected as a reference location. The system processor is configured to perform operations comprising transmitting a first calibration signal from the at least one speaker of the reference microphone/speaker unit, receiving the first calibration signal via the microphone/speaker units and calculating time difference of arrival (TDOA) with the first calibration signal between the microphone/speaker units, transmitting a second calibration signal from the at least one speaker of another microphone/speaker unit which is not the reference microphone\speaker unit, receiving the second calibration signal via the microphone/speaker units and calculating TDOA with the second calibration signal between the microphone/speaker units, repeating with the rest of the microphone/speaker units transmitting respective calibration signals, receiving the respective calibration signals via the microphone/speaker units, and calculating TDOA with the respective calibration signals between the microphone/speaker units, obtaining a physical combined array structure of the microphone/speaker units based on the TDOA between the microphone/speaker units, and generating based on the physical combined array structure a consolidated target coverage area common to the microphone/speaker units.

The obtaining the physical combined array structure may include obtaining locations of the microphone/speaker units relative to the location of the reference microphone/speaker unit. Configuration constraints may be incorporated to obtain the physical combined array structure of the microphone/speaker units. The configuration constraints may include relative positions of the microphones and speakers within each microphone/speaker unit. A speed of sound may be adjusted based on the temperature in the shared 3D space to obtain the physical combined array structure of the microphone/speaker units. The system processor may be configured to detect in real-time any one of the followings: (i) connected microphone/speaker units at a power startup, (ii) changes in connected microphone/speaker unit while the system is powered on, and (iii) user manual input to then perform the calibration procedure to form the physical combined array structure dynamically. The system processor may be configured to allow data of the physical combined array structure to be used and accessed by applications, and the applications may include one or more of (i) displaying of actual locations of microphones and speakers of the microphone/speaker units relative to each other and boundaries of the shared 3D space, (ii) generating a combined coverage map for the shared 3D space, and (iii) exporting the data to external applications for external usages. The transmitting the first calibration signal and the transmitting the second calibration signal may be performed sequentially or simultaneously.

The preferred embodiments comprise both algorithms and hardware accelerators to implement the structures and functions described herein.

BRIEF DESCRIPTION OF THE DRAWINGS

FIGS. 1a, 1b and 1c are diagrammatic examples of a typical audio conference setups across multiple device types.

FIGS. 2a and 2b are illustrations of Time Difference Of Arrival (TDOA) of a signal in microphone arrays.

FIG. 3 is a prior art diagrammatic illustration example of a manual calibration process for a microphone array system in the current art.

FIGS. 4a, 4b, 4c. 4d, 4e and 4f are prior art diagrammatic examples of microphone array coverage patterns in the current art.

FIGS. 5a, 5b, 5c, 5d, 5e, 5f and 5g are diagrammatic illustrations of the preferred embodiment of the present invention of microphone array devices combined and calibrated into a single room coverage pattern.

FIGS. 6a and 6b are graphical structural examples of microphone array layouts supported in the embodiment of the present invention.

FIGS. 7a, 7b, 7c, 7d, 7e, 7f, 7g and 7h are illustrative examples of the process of auto-calibrating multiple microphone speaker bar systems into a single microphone array in the preferred embodiment of the present invention.

FIGS. 8a, 8b, 8c, 8d, 8e, and 8f are illustrative examples of the process of auto-calibrating multiple ad-hoc microphones and speaker bar systems into a single microphone array in other embodiments of the present invention.

FIGS. 9a, 9b, and 9c are functional and structural diagrams of an exemplary embodiment of automatically building and calibrating microphones and speakers into a single physical array processing.

FIG. 10 is a logic flowchart of the distance measurement process of building a physical array process.

FIGS. 14a, 14b, 14c, 14d, 14e and 14f are logic flowcharts of the location processer functionality.

FIG. 15 is an illustration of the geometric relationships between microphone and speaker locations.

FIG. 16 is a geometric illustration of the relationship of known microphone spacing on a common linear axis.

FIG. 17 is an illustration of solving for the geometric location.

DETAILED DESCRIPTION OF THE PRESENT INVENTION

Figure 6A:
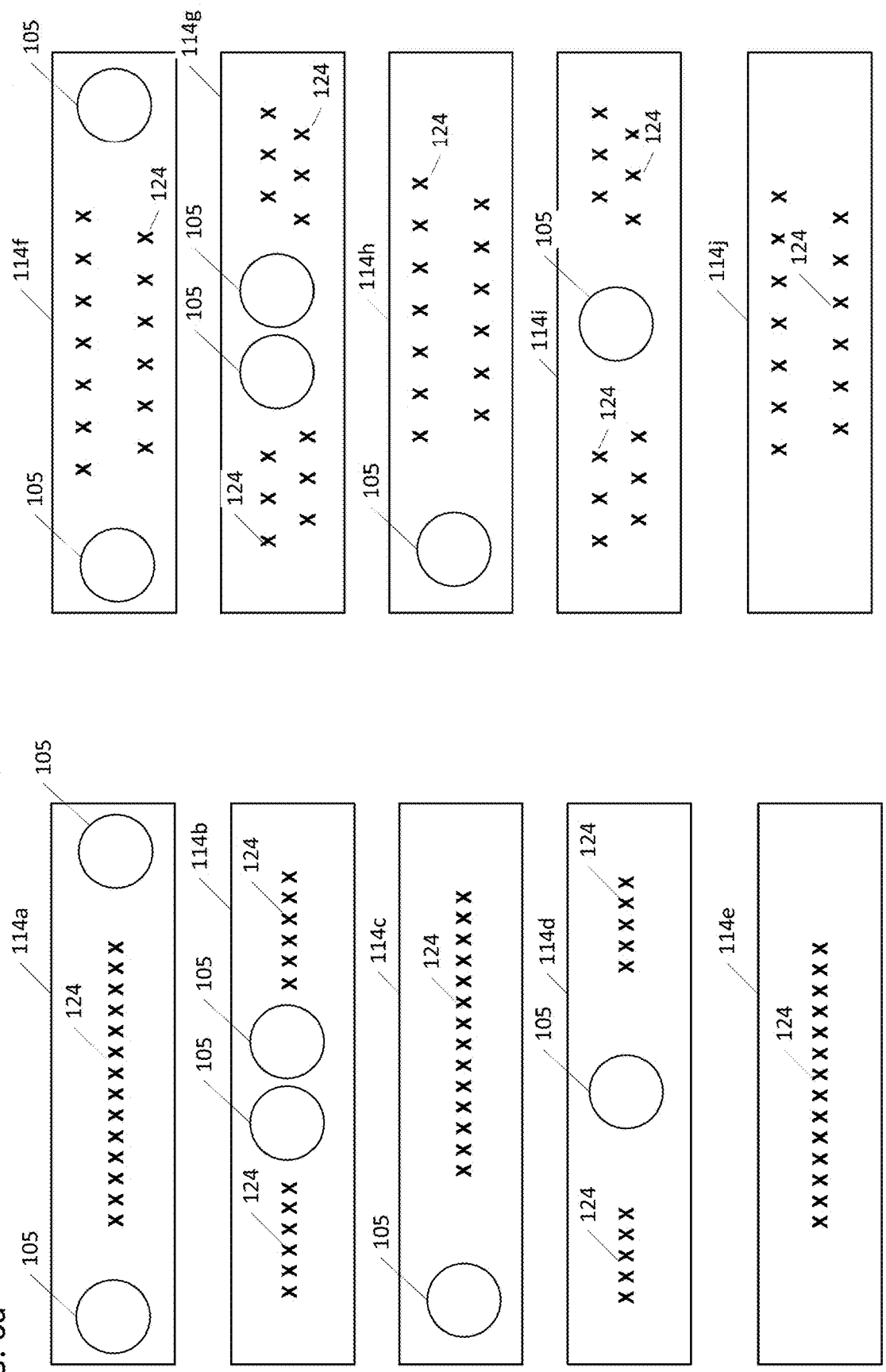

The present invention is directed to apparatus and methods that enable groups of people (and other sound sources, for example, recordings, broadcast music, Internet sound, etc.), known as "participants", to join together over a network, such as the Internet or similar electronic channel(s), in a remotely-distributed real-time fashion employing personal computers, network workstations, and/or other similarly connected appliances, often without face-to-face contact, to engage in effective audio conference meetings that utilize large multi-user rooms (spaces) with distributed participants.

Advantageously, embodiments of the present apparatus and methods afford an ability to provide all participants in the room with an auto-calibrated combined microphone array element system consisting of ad-hoc located microphone elements, providing full room microphone coverage, regardless of the number microphone elements in the room, while maintaining optimum audio quality for all conference participants.

A notable challenge to creating a combined microphone array from ad-hoc located microphone transducers in a 3D space is reliably locating the microphones in 3D space with sufficient accuracy required to form a combined microphone array aperture without requiring a complex manual calibration procedure and using instead an auto-calibration procedure to map out the complex speaker-to-microphone spatial relationships thus locating all microphones in the room to a 3D spatial grid relative to the reference sound source speakers and then being able to form a single combined physical microphone array element out of disparate and unknown located microphone elements before auto-calibration.

A "conference enabled system" in this specification may include, but is not limited to, one or more of, any combination of device(s) such as, UC (unified communications) compliant devices and software, computers, dedicated software, audio devices, cell phones, a laptop, tablets, smart watches, a cloud-access device, and/or any device capable of sending and receiving audio signals to/from a local area network or a wide area network (e.g. the Internet), containing integrated or attached microphones, amplifiers, speakers and network adapters. PSTN, Phone networks etc.

A "microphone" in this specification may include, but is not limited to, one or more of, any combination of transducer device(s) such as, microphone element, condenser mics, dynamic mics, ribbon mics, USB mics, stereo mics, mono mics, shotgun mics, boundary mic, small diaphragm mics, large diaphragm mics, multi-pattern mics, strip microphones, digital microphones, fixed microphone arrays, dynamic microphone arrays, beam forming microphone arrays, and/or any transducer device capable of receiving acoustic signals and converting to electrical signals, and or digital signals.

A "communication connection" in this specification may include, but is not limited to, one or more of or any combination of network interface(s) and devices(s) such as, Wi-Fi modems and cards, internet routers, internet switches, LAN cards, local area network devices, wide area network devices, PSTN, Phone networks, etc.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

A "participant" in this specification may include, but is not limited to, one or more of, any combination of persons such as students, employees, users, attendees, or any other general groups of people that can be interchanged throughout the specification and construed to mean the same thing. Who gathering into a room or space for the purpose of listening to and or being a part of a classroom, conference, presentation, panel discussion or any event that requires a public address system and a UCC connection for remote participants to join and be a part of the session taking place. Throughout this specification a participant is a desired sound source, and the two words can be construed to mean the same thing.

A "desired sound source" in this specification may include, but is not limited to, one or more of a combination of audio source signals of interest such as: sound sources that have frequency and time domain attributes, specific spectral signatures, and/or any audio sounds that have amplitude, power, phase, frequency and time, and/or voice characteristics that can be measured and/or identified such that a microphone can be focused on the desired sound source and said signals processed to optimize audio quality before delivery to an audio conferencing system. Examples include one or more speaking persons, one or more audio speakers providing input from a remote location, combined video/audio sources, multiple persons, or a combination of these. A desired sound source can radiate sound in an omni-polar pattern and/or in any one or combination of directions from the center of origin of the sound source.

An "undesired sound source" in this specification may include, but is not limited to, one or more of a combination of persistent or semi-persistent audio sources such as: sound sources that may be measured to be constant over a configurable specified period of time, have a predetermined amplitude response, have configurable frequency and time domain attributes, specific spectral signatures, and/or any audio sounds that have amplitude, power, phase, frequency and time characteristics that can be measured and/or identified such that a microphone might be erroneously focused on the undesired sound source. These undesired sources encompass, but are not limited to, Heating, Ventilation, Air Conditioning (HVAC) fans and vents; projector and display fans and electronic components; white noise generators; any other types of persistent or semi-persistent electronic or mechanical sound sources; external sound source such as traffic, trains, trucks, etc.; and any combination of these. An undesired sound source can radiate sound in an omni-polar pattern and/or in any one or combination of directions from the center of origin of the sound source.

A "system processor" is preferably a computing platform composed of standard or proprietary hardware and associated software or firmware processing audio and control signals. An example of a standard hardware/software system processor would be a Windows-based computer. An example of a proprietary hardware/software/firmware system processor would be a Digital Signal Processor (DSP).

A "communication connection interface" is preferably a standard networking hardware and software processing stack for providing connectivity between physically separated audio-conferencing systems. A primary example would be a physical Ethernet connection providing TCPIP network protocol connections.

A "UCC or Unified Communication Client" is preferably a program that performs the functions of but not limited to messaging, voice and video calling, team collaboration, video conferencing and file sharing between teams and or individuals using devices deployed at each remote end to support the session. Sessions can be in the same building and/or they can be located anywhere in the world that a connection can be establish through a communications framework such but not limited to Wi-Fi, LAN, Intranet, telephony, wireless or other standard forms of communication protocols. The term "Unified Communications" may refer to systems that allow companies to access the tools they need for communication through a single application or service (e.g., a single user interface). Increasingly, Unified Communications have been offered as a service, which is a category of "as a service" or "cloud" delivery mechanisms for enterprise communications ("UCaaS"). Examples of prominent UCaaS providers include Dialpad, Cisco, Mitel, RingCentral, Twilio, Voxbone, 8×8, and Zoom Video Communications.

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

With reference to FIG. 1a, shown is illustrative of a typical audio conference scenario in the current art, where a remote user 101 is communicating with a shared space conference room 112 via headphone (or speaker and microphone) 102 and computer 104. Room, shared space, conference room and 3D space can be construed to mean the same thing and will be used interchangeably throughout the specification. The purpose of this illustration is to portray a typical audio conference system 110 in the current art in which there is sufficient system complexity due to either room size and/or multiple installed microphones 106 and speakers 105 that the microphone 106 and speaker 105 system may require calibration. Microphone 106 calibration is typically required in all but the simplest audio conference system 110 installations where the relationship between microphones 106 and the speakers 105 are well understood and fixed in design such as a simple table-top units and/or as illustrated in FIG. 1b simple wall mounted microphone and speaker bar arrays 114.

For clarity purposes, a single remote user 101 is illustrated. However, it should be noted that there may be a plurality of remote users 101 connected to the conference system 110 which can be located anywhere a communication connection 123 is available. The number of remote users is not germane to the preferred embodiment of the invention and is included for the purpose of illustrating the context of how the audio conference system 110 is intended to be used once it has been installed and calibrated. The room 112 is configured with examples of, but not limited to, ceiling, wall, and desk mounted microphones 106 and examples of, but not limited to, ceiling and wall mounted speakers 105 which are connected to the audio conference system 110 via audio interface connections 122. In-room participants 107 may be located around a table 108 or moving about the room 112 to interact with various devices such as the touch screen monitor 111. A touch screen/flat screen monitor 111 is located on the long wall. A microphone 106 enabled webcam 109 is located on the wall beside the touch screen 111 aiming towards the in-room participants 107. The microphone 106 enabled web cam 109 is connected to the audio conference system 110 through common industry standard audio/video interfaces 122. The complete audio conference system 110 as shown is sufficiently complex that a manual calibration is most likely required for the purpose of establishing coverage zone handoffs between microphones, gain structure and microphone gating levels of the microphones 106, including feedback and echo calibration of the system 110 before it can be used by the participants 107 in the room. As the participants 107 move around the room 112, the audio conference system 110 will need to determine the microphone 106 with the best audio pickup performance in real-time and adjust or switch to that microphone 106. Problems can occur when microphone coverage zones overlap between the physically spaced microphones 106. This can create microphone 106 selection confusion especially in systems relying on gain detection and level gate thresholding to determine the most appropriate microphone 106 to activate for the talking participant at any one time during the conference call. Some systems in the current art will try to blend individual microphones through post processing means, which is also a compromise trying to balance the signal levels appropriately across separate microphone elements and can create a comb filtering effect if the microphones are not properly aligned and summed in the time domain. Conference systems 110 that do not calibrate all microphones 106 to work as a single microphone array 124 can never really optimize for all dynamic situations in the room 112.

For this type of system, the specific 3D location (x, y, z) of each microphone element in space is not known, nor is it determined through the manual calibration procedure. Signal levels and thresholds are measured and adjusted for based on a manual setup procedure using computer 103 running calibration software by a trained audio technician (not shown). If the microphones 106 or speakers 105 are relocated in the room, removed or more devices are added the audio conference, manual calibration will need to be redone by the audio technician.

The size, shape, construction materials and the usage scenario of the room 112 dictates situations in which equipment can or cannot be installed in the room 112. In many situations the installer is not able to install the microphone system 106 in optimal locations in the room 112 and compromises must be made. To further complicate the system 110 installation as the room 112 increases in size, an increase in the number of speakers 105 and microphones 106 is typically required to ensure adequate audio pickup and sound coverage throughout the room 112 and thus increases the complexity of the installation, setup, and calibration of the audio conference system 110.

The speaker system 105 and the microphone system 106 may be installed in any number of locations and anywhere in the room 112. The number of devices 105, 106 required is typically dictated by the size of the room and the specific layout and intended usages. Trying to optimize all devices 105, 106 and specifically the microphones 106 for all potential room scenarios can be problematic.

It should be noted that microphone 106 and speaker 105 systems can be integrated in the same device such as tabletop devices and/or wall mounted integrated enclosures or any combination thereof and is within the scope of this disclosure as illustrated in FIG. 1B.

FIG. 1*b* illustrates a microphone 106 and speaker 105 bar combination unit 114. It is common for these units 114 to contain multiple microphone elements in what is known as a microphone array 124. A microphone array 124 is a method of organizing more than one microphone 106 into a common array 124 of microphones 106 which consists of two or more and most likely five (5) or more physical microphones 106 ganged together to form a microphone array 114 element in the same enclosure 114. The microphone array 124 acts like a single microphone 106 but typically has more gain, wider coverage, fixed or configurable directional coverage patterns to try and optimize microphone 106 pickup in the room 112. It should be noted that a microphone array 124 is not limited to a single enclosure and can be formed out of separately located microphones 106 if the microphone 106 geometry and locations are known, designed for and configured appropriately during the manual installation and calibration process.

FIG. 1*c* illustrates the use of two microphone 106 and speaker 105 bar units (bar units) 114 mounted on separate walls. The location of the bar units 114 for example may be mounted on the same wall, opposite walls or ninety degrees to each other as illustrated. Both bar units 114 contain microphone arrays 124 with their own unique and independent coverage patterns. If the room 112 requirements are sufficiently large, any number of microphone 106 and speaker 105 bar units 114 can be mounted to meet the room 112 coverage needs and is only limited by the specific audio conference system 110 limitations for scalability. This is a typical deployment strategy in the industry and coordination and hand off between the separate microphone array 124 coverage patterns needs to be managed and calibrated for, and/or dealt with in firmware to allow the bar units 114 to determine which unit 114 is utilized based on the active speaking participant 107 location in the room, and to automatically switch to the correct bar unit 114. Mounting multiple units 114 to increase microphone 106 coverage in larger rooms 112 is common. It should be noted that each microphone array 124 operates independently of each other, as each array 124 is not aware of the other array 124 in any way plus each array 124 has its own specific microphone coverage configuration patterns. The management of multiple arrays 124 is typically performed by a separate system processor 117 and/or DSP module that is connected 118 to router 113.

With reference to FIGS. 2*a* and 2*b*, shown are diagrams illustrating Time Difference Of Arrival (TDOA) between a sound source speaker 105 and individually spaced microphones 106*a* and 106*b* in a space. FIG. 2*a* shows a simplified view with a large distance between microphones 106*a* and 106*b* to better illustrate the difference in time 204 when the speaker wave front from a position 201 is detected (arrives) at position 202 by the nearer microphone 106*a* and when the same wave front is detected (arrives) at position 203 by the farther microphone 106*b*. The system processor 117 causes the speaker 105 to operate resulting in sound pressure waves. The system processor 117 is then able to measure the time of flight of the pressure wave to the two individual microphones 106*a* and 106*b*. The difference in detection times is referred to as Time Difference Of Arrival or TDOA. FIG. 2*b* shows a more detailed view of a typical microphone array 206 composed of n number of microphone elements 106 in the array. T1, T2, T3 through Tn show the time of flight to each microphone element in the array (1, 2, 3, through n). The differences between the arrival times are shown by $\Delta 2$, $\Delta 3$, through $\Delta n$ with table 205 describing how T2 is equivalent to $T1+\Delta 2$; T3 is equivalent to $T2+\Delta 3$, etc. and how T3 through Tn can further be expressed relative to T1 ($T1+\Delta 2+\Delta 3 \ldots +\Delta n$). The diagram further illustrates how time deltas are small (e.g. $\Delta 2$ and $\Delta 3$) when adjacent microphone elements are close to the center axis of the speaker 105 and grow larger (e.g. $\Delta n-1$ and $\Delta n$) as the angle increases from the center axis. Due to the potential of very small-time arrival deltas, it is important to be precise in calculating TDOA. The system can optionally utilize two additional measures to improve precision: increase the sampling rate of the microphone elements 124; and measure the room temperature 207 to compensate for changes in the speed of sound in current room conditions.

With reference to FIG. 3, shown is a basic explanation of how a complex multi-microphone 106 and multi-speaker 105 system may be calibrated in the current art utilizing audio signal level techniques and measurements known in the art. It should be noted that the devices 105, 106 in this audio conference system 110 are independent entities from each other meaning they are not combined to form a single microphone element or array system 124 but instead operate as independent microphones 106. The microphones 106 are enabled or disabled based on criteria such as signal strength, participant's 107 general location in the room relative to any one microphone's 106 quasi-signal strength approximation, and or general coverage area configuration decisions such as microphone zone coverage areas and directionality of the microphone 106 and microphone arrays 124 utilized in the room 112.

The goal is to calibrate each microphone 106 to each speaker 105 location to account for setting echo canceller parameters, microphone feedback, gain structure of the individual microphones 106 and coverage patterns of microphone arrays 124. This is usually performed by a technician (not shown) through a computer program 103 via manual interactive process by sending calibration tones (Cal Tone 1, Cal Tone 2, Cal Tone 3, Cal Tone 4, Cal Tone 5 and Cal Tone 6), individually in order to calibrate each speaker 105 and microphone 106 combination for all audio setup parameters, as previous noted. The manual calibration procedure is not intended to capture the exact microphone 106 and speaker 105 locations (x, y, z) in the room 112, and instead focuses on acoustic parameters for the purpose of calibrating the audio signal chain. Because the calibration procedure is primarily intended to focus on audio signal chain parameters of the system 110 there needs to be added logic and complexity in the audio system to manage each individual microphone element 106, 124 as a separate device, switching them in and out as needed based on the participants 107 speaking volume and location in the room 112. This becomes particularly problematic when individual microphones 106, 124 have overlapping covering patterns which is a common situation in real world installations. This situation will potentially create confusion and rough handoffs between microphones 106, 124 for any shared coverage zone location in the room 112 creating inconsistent audio performance for remote users 101 of the system. For example, this can manifest itself as, but not limited to, inconsistent volume levels, system feedback through the microphone 106, 124 chain and echo canceller return loss issues including variable background noise levels that are never the same across separate microphones, which is undesirable behavior. What is required is a system merging all microphones 106, 124 as a common physical microphone array able to work as one microphone system to manage participant 107 volume levels, location detection and undesired sound source management.

With reference to FIGS. 4a, 4b, 4c, 4d, 4e and 4f, shown are current art illustrations showing common microphone deployment locations and the effects on microphone bar 114a coverage area overlapping 403, resulting in issues that can arise when the microphones are not treated as a single physical microphone array with one coverage area.

FIG. 4a illustrates a top-down view of a single microphone and speaker bar 114a mounted on a short wall of the room 112. The microphone and speaker bar array 114a provides sufficient coverage 401 to most of the room 112, and since a single microphone and speaker bar 114a is present, there are no coverage conflicts with other microphones in the room.

FIG. 4b illustrates the addition of a second microphone and speaker bar 114b in the room 112 on the wall opposite of the microphone and speaker bar 114a unit. Since the two units 114a, 114b are operating independently of each other, their coverage patterns 401, 402 are significantly overlapped 403. This can create issues as both devices could be tracking different sound sources and/or the same sound source making it difficult for the system processor 117 to combine the signals into a single, high-quality audio stream. The depicted configuration is not optimal but none-the-less is often used to get full room coverage and participants 101, 107 will most likely deal with inconsistent audio quality. The coverage problem still exists if the second unit 114b is moved to a perpendicular side wall as shown in FIG. 4c. The overlap of the coverage patterns changes but system performance has not improved. FIG. 4d shows the two devices 114a and 114b on opposite long walls. Again, the overlap of the coverage patterns has changed but the core problem of the units 114a, 114b tracking of individual and/or more than one sounds sources remains. FIG. 4e depicts both units 114a, 114b on the same long wall with essentially the same coverage zone 401, 402 overlap with no improvement in overall system performance. Rearranging the units 114a, 114b does not address the core issues of having independent microphones covering a common space 112.

FIG. 4f further illustrates the problem in the current art if we use discrete individual microphones 106a, 106b installed in the ceiling to fill gaps in coverage. Microphone 106a has coverage pattern 404 and microphone 106b has coverage pattern 405. Microphone array 114a is still using coverage pattern 401. All three (3) microphones 114a, 106a, 106b overlap to varying degrees 407 causing coverage conflicts with certain participants at one section of the table. All microphones are effectively independent devices that are switched in and out of the audio conference system 110, either through complex logic or even manual switching resulting in a suboptimal audio conference experience for the participants 101, 107.

With reference to FIGS. 5a, 5b, 5c, 5d, 5e, 5f, and 5g, illustrated are preferred embodiments of the invention to overcoming limitations of independent units 114a, 114b, 106a, 106b with disparate coverage patterns from individual microphone elements or arrays 114a, 114b, 106a, 106b, regardless of mounting location, which can be calibrated and configured to perform as a single cohesive physical array system with a consolidated coverage area 501 thus eliminating the complex issues of switching, managing and optimizing individual microphone elements 114a, 114b, 106a, 106b in a room 112. FIG. 5a illustrates a room 112 with two microphone and speaker bar units 114a and 114b installed on the same wall. Before auto-calibration, the two units 114a, 114b are operating as independent microphone arrays in the room with disparate 401, 402 and overlapping 403 coverage patterns leading to inconsistent audio microphone pickup throughout the room 112. The same challenges are present when participants 107 are moving about the room 112 and crossing through the independent coverage areas 401, 402 and the overlapped coverage area 403. After auto-calibration is performed, the two units 114a and 114b will be integrated and operate as a single physical microphone array system 124 with one overall coverage pattern 501 as shown in FIG. 5b that the audio conference system 110 can now transparently utilize as a single microphone array 124 installation in the room 112. Because all microphones 114a, 114b are utilized in the combined array 124, optimization decisions and selection of gain structures, microphone on/off, echo cancellation and audio processing can be maximized as if the audio conference system 110 was using a single microphone array system 124. The auto-calibration procedure run by the system processor 117 allows for the system to know the location (x, y, z) of each speaker 105 and microphone 106 element in the room 112. This gives the system processor 117 the ability to perform system optimization, setup and configuration that would not be practical in an independent device system. As previously described, current art systems primarily tune speaker and microphone levels to reduce feedback and speaker echo signals with tradeoffs being made to reduce either the speaker level or microphone gain. These tradeoffs will impact either the local conference participants with a lower speaker signal or remote participants with a lower microphone gain level. Through the auto-calibration procedure in the described invention knowing the relative location of every speaker and microphone element, the system processor can better synchronize and optimize audio processing algorithms to improve echo cancelation performance while boosting both speakers and microphones to more desirable levels for all parties.

FIGS. 5c and 5d further illustrate how any number of microphone and speaker bars 114a, 114b, 114c, 114d (four units are shown but any number is within scope of the invention) with independent coverage areas 401, 402, 404, 405 can be calibrated to form a single microphone array 124 and coverage zone 501. FIG. 5e shows four examples of preferred configurations for mounting units 114a, 114b, 114c in the same room space 112 in various fully supported mounting orientations. Although the bars 114a, 114b, 114c are shown mounted in a horizontal orientation, the mounting orientation Is not critical to the calibration process meaning that the microphones 106 can be located (x, y, z) in any orientation and on any surface plane and be within scope of the preferred embodiment of the invention. The system processor 117 is not limited to these configurations as any microphone arrangement can be calibrated to define a single microphone array 124 and operate with all the benefits of location detection, coverage zone configurations and gain structure control.

FIGS. 5f and 5g extend the examples to show how a discrete microphone 106, if desired, can be placed on the table. Without auto-calibration microphone 106 has its own unique and separate coverage zone 404. After auto-calibration of the microphone systems 114a, 114b, 106, all microphone elements, are configured to operate as a single physical microphone array 124 with a consolidated coverage area 501.

FIG. 6a contains representative examples, but not an exhaustive list, of microphone array and microphone speaker bar layouts 114a, 114b, 114c, 114d, 114e, 114f, 114g, 114h, 114i, 114j to demonstrate the types of microphone 124 and speaker 105 arrangements that are supported within the context of the invention. Combinations of and/or individual microphones, microphone arrays, individual speakers and speaker array arrangements are supported and within the context of the invention. The microphone array 124 and speaker 105 layout configurations are not critical and can be laid out in a linear, offset or any geometric pattern that can be described to a reference set of coordinates within the microphone and speaker bar layouts 114a, 114b, 114c, 114d, 114e, 114f, 114g, 114h, 114i, 114j. It should be noted that certain configurations where microphone elements are closely spaced relative to each other (for example, 114a, 114c, 114e) may require higher sampling rates to provide required accuracy.

FIG. 6b extends the support for speaker 105a, 105b and microphone array grid 124 to individual wall mounting scenarios. The speakers 105 and/or microphones 106 can share the same mounting plane and/or be distributed across multiple planes. The speakers 105a, 105b and microphone array grid 124 can be dispersed on any wall (plane) A, B, C, D or E and be within scope of the invention. Series in FIG. 7 will further elaborate this functionality.

With reference to FIGS. 7a, 7b, 7c, 7d, 7e, 7f, 7g and 7h, shown are overall auto-calibration process flows to allow any number of individually located microphone speaker bar combination collocated in a space (room) 112 to be combined into a single microphone array 124.

FIG. 7a is showing a layout of three separate microphone and speaker bar 114a, 114b, 114c units distributed throughout a room 112 3D space. As noted previously, the orientation, position and wall location of the microphone speaker bar units 114a, 114b, 114c are not critical and can be auto-calibrated for, as long as any two microphone and speaker bars are within the coverage pattern of each other such that they are able to send and receive calibration signals 701 to perform the auto-calibration. Upon connecting the microphone and speaker bars 114a, 114b, 114c to the system processor 117, the system will automatically start the auto-calibration procedure. The goal of the invention is to dynamically determine the position of all speakers 105 and microphone array elements 124 in the system relative to a reference device 114a. The reference location can be, but is not limited to, the position of a speaker 105a, 105b in the reference device; a microphone element in the array 124; a known position (i.e. the center of the microphone speaker bar or microphone array) of the device 114a itself. For purposes of the invention, only relative positions of all system elements are required but the measured and known physical location of a reference point in 3D space may be entered as a configuration constraint if desired to provide absolute (x, y, z) coordinates in 3D space for all elements of the re-calibrated array system via a translation mechanism. Any speaker 105a, 105b, 105c, 105d, 105e, 105f can be used as the reference location and need not be located in a specific bar 114a, 114b, 114c. Likewise, any microphone element 106 of any microphone array element 124a, 124b, 124c can be used as the reference location. It should also be noted that the order of the calibration sequence is not critical, and the order shown is for illustrative purposes as one possible example. The auto-calibration procedure need not be run in a sequential manner, with a further potential optimization using uniquely encoded calibration signals for each speaker which are output simultaneously.

Microphone and speaker bar 114a has been arbitrarily chosen as the reference location 703 for the example auto-calibration function. Bar 114a contains two speakers 105a, 105b of a known distance apart and are on a common axial plane 721. A microphone array 124a is also located in the same bar 114a chassis. For simplicity in describing the concepts involved, all three bars 114a, 114b, 114c are of the same design and layout, but as mentioned previously this need not be the case. The location 704, 705 for bars 114b and 114c have not been determined in the room 112 and will be found via auto-calibration for locations 704, 705 (x, y, z) and orientation within the room 112 relative to bar 114a. All microphone and speaker bars 114a, 114b, 114c are connected to a system processor 117 with bidirectional communication interfaces 122 to each bar 114a, 114b, 114c. Example of connectivity, not limited to this embodiment, are daisy chain and Ethernet-switch network connectivity. The system processor 117 may be connected to a computer 103 via line 119 and to a network Ethernet connection via a router 113 or similar device. The computer 103 is not required to run the auto-calibration process which automatically runs when a new microphone element 106 is added or removed from the system processor 117.

As stated, the auto-calibration procedure will automatically run based on turning on the system and/or plugging in or unplugging an addition microphone 106, 124 and speaker bar 114b, 114c. The "auto-calibration signal set 1" 701 is transmitted out reference speaker 105a into the room 112. Both microphone arrays 124b located in bar 114b and microphone array 124c located in bar 114c will receive the "auto-calibration signal set 1" signal and transmit the calibration signals to the system processor 117 at which point the TDOA values are calculated and stored for processing in real-time if system resources allow or after all the automatic calibration tones are sent. In the preferred embodiment, only one speaker 105 transmits at a given time throughout the auto-calibration process but, as mentioned, all speakers may optionally send uniquely encoded signals simultaneously with no or minor loss of accuracy.

FIG. 7b is a continuation of the auto-calibration process by the system processor 117 instructing speaker 105b to send "auto-calibration signal set 2" 702 into the room 112. Again, both microphone arrays 124b and 124c receive the calibration signal 702 which are sent to the system processor 117 for auto-calibration processing. All speakers 105c, then 105d, then 105e then 105e, repeat this process. The order of the auto-calibration signal sequence is not particularly important as long as all speaker elements 105a, 105b, 105c, 105d, 105e, 105f are utilized to transmit the sequence of auto-calibration signals. In FIG. 7c, speaker 105c is transmitting the "auto-calibration signal set 3" 706 to microphone arrays 124a and 124c. In FIG. 7d, speaker 105d transmits the "auto-calibration signal set 4" 707 to microphone arrays 124a, 124c. FIG. 7e and FIG. 7f both continue and finish the auto-calibration sequence by the system processor 117 instructing speaker 105e to transmit the "auto-calibration signal set 5" 708 to microphone arrays 124a and 124b then instructing speaker 105f to send "auto-calibration signal set 6" 709 to microphone array 124a and 124b. Once the measurements are completed the next level of auto-calibration processing can be undertaken to solve the geometric relationships between all the bars 114a, 114b, 114c and establishing their locations relative to the reference bar 114a at which point the physical array can be combined and optimized. The logic and functional system structure will be further outlined in later FIG. 9, FIG. 10, and FIG. 14 series drawings.

FIG. 7g illustrates the conclusion of the auto-calibration sequence with the individual microphone arrays 124a, 124b, 124c now operating with a) a common shared microphone coverage pattern 501 and b) with the locations (x, y, z) 703, 704, 705 of all the microphone speaker bars calculated and known relative to each other in 3D space 112.

FIG. 7h illustrates that the microphone array elements 124a, 124b, 124c can be distributed in any axis such as but not limited to, the curved axis layout 720 as shown in 124b or as per the diagrams in FIGS. 6a, 6b in any distributed microphone aperture arrangement. The microphone and speaker bar 114c has also been set at a non-90-degree angle to bars 114a and 114b thus further illustrating that the specific placement of the bars 114a, 114b, 114c in the room are not constrained in location, orientation, mounting plane, height and/or axial or rotational relationships to each other. A necessary constraint is if any two bars of the set 114a, 114b, 114c are too far apart from each other that their coverage patterns do not overlap or the speaker 105 and microphone 106 are too far apart to be calibrated that the system processor 117 must make the required adjustments to map out and calibrate the array structure accordingly. This is shown as a distance constraint 718 between bars 114a and bar 114c and 719 between bars 114b and 114c where the bars need to be within a maximum distance defined by system processor 117 memory and processor resource limits to auto calibrate. If necessary, such maximums may be specified as Configuration Constraints 920 (see FIG. 9a) to allow processing limits to be reconfigured to accommodate the required distances.

With reference to FIGS. 8a, 8b, 8c, 8d, 8e and 8f, illustrated are more generic situations where a combination of speaker bars 801, discrete microphones 106a, 106b, 106d, microphone and speaker bar 114b and a microphone only array 124c has been installed in the room 112. Microphone 106b is integrated into a webcam device 109. All devices are connected to the system processor 117 via standard communication connection interfaces 122.

FIG. 8a illustrates the functionality of using location 807 as the system reference location for speaker 105a and another speaker 105b or 105c located in either illustrated, but not limited to, location 806a, 806b in the room 112 at any known distance forming a common linear axis 721 between the two reference speakers 105a, and 105b or 105c locations 806a, 806b. The speaker 105b can be moved 809 and located to a new location 806b illustrated by the speaker 105c in the room. As long as the distance separation 808 is known between the two speakers 105a and 105b or 105c in any combination, then any two speakers 105a, 105b and 105c can be used to determine the unknown location (x, y, z) 805 of microphone array 124c relative to the reference location in the room 112 using the principals outlined in FIGS. 2a, 2b. It should be noted that each microphone element 106 in the microphone array 124 is determined in relation to the reference speaker's geometry 801 relative to their individual locations 807, 806a, 806b.

In FIG. 8b the first reference speaker 105a is at a reference location 807 as illustrated and the second reference speaker 105b is located 806a at known distance separated from speaker 105a. For clarity through the following FIGS. 8b-8f illustrations only two reference speakers 105a, 105b are shown. Installed in the room 112 are numerous microphone elements 124b, 124c, 106a, 106b, 106c and speakers 105c, 105d distributed throughout the space 112 at unknown locations 808, 809, 810, 805, 811 and orientations relative to the axial plane 721 of the reference speakers 105a, 105b. The system processor 117 is connected to all microphone and speaker elements through standard audio interfaces 122. Microphone elements 106a, 106b, 106c are single microphones at a unknown locations (x, y, z) 811, 810, 809 respectively, in the room 112. Microphone 106b is integral to a web camera 109. It is within the scope of the invention to be able to locate and integrate any number of microphones elements that are connected to the system processor 117. In addition to the single dispersed microphone elements 106a, 106b, 106c, two microphone array elements 124b, 124c are installed in the room 112 to further provide sufficient room coverage. As the room 112 becomes larger, it becomes even more important to support many microphone element form factors and locations to address specific use cases that may be present at any one area and/or location of the room 112. It may not be possible to locate all the microphones in optimal locations throughout the room 112 and as a result optimal microphone system performance can be significantly degraded by incomplete handoffs between microphones having zone coverage overlap, or there may be gaps in microphone coverage areas, or the microphones are just too far away from participants 107 in the room 112 as they transverse the room 112.

To overcome the deficiencies, it is desirable to be able to locate all the microphone elements in the room 112 and form a single cohesive microphone array aperture utilizing all microphone elements available and connected to the system processor 117. To accomplish this level of configuration and processing the relative (x, y, z) location in 3D space of each microphone element needs to be known to a high degree of accuracy to form a single physical microphone array. Required accuracy of the system is dependent on, but not limited to, size of room, coverage area, ambient room temperature, audio sampling rate, system processor memory and processing resource limitations.

As per the previously described calibration process, a series of calibration signals is sent from each individual speaker 105a, 105b, 105c, 105d in the room 112 which is used to form a geometric solution to solve for each microphone element location 124b, 124c, 809, 810, 811. It is within scope of the preferred embodiment to send calibration signals simultaneously to all speaker elements using uniquely encoded speaker signals or to send the individual calibration signals from each speaker 105a, 105b, 105c, 105d sequentially. Since the system processor 117 architecture is scalable across various platforms, the available processor resources will end up dedicating the appropriate calibration process that can be supported whether it is a form of parallel and/or sequential process combinations. It is within scope of the invention to support individual speaker calibration sequences, pairs of simultaneous speaker calibration signals to multiples of speakers broadcasting simultaneously, to all speakers broadcasting unique calibration signals for the purpose of measuring each unique speaker 105 to microphone 106 combination. For clarity, the calibration process will be illustrated in a sequential manner outlining the relationship of each speaker 105 to microphone 106 signal calibration.

FIG. 8b illustrates the first calibration tone "Auto calibration signal"" which is broadcast out of the first reference location (x, y, z) 807 reference speaker 105a. All microphone elements 124b, 124c, 106a, 106b, 106c receive the calibration signal simultaneously which allows the system processor to measure the distance from speaker 105a to each microphone element 124b, 124c, 106a, 106b, 106c. This measurement is recorded in the system processor 117 for further solving the physical array geometric solution defining the microphone element locations.

FIG. 8c illustrates the continuation of the calibration process. Speaker 105b transmits "auto calibration signal 2" simultaneously to all microphone elements 124b, 124c, 106a, 106b, 106c at which point the calibration data for this signal series is captured in the system processor 117. FIG. 8d and FIG. 8e illustrate each speaker 105c and 105d transmitting in sequence "auto calibration signal 3" and "auto calibration signal 4" respectively and correspondingly further building the acoustic distance measurement model for each speaker to microphone element time/distance relationship. Once all calibration signals have been sent and measured by the system processor 117 the time/distance measurements can be used to solve for the relative geometric locations of all microphones relative to the reference speakers 105a, 105b.

FIG. 8f illustrates the outcome of the geometric solver 915 (see FIG. 9c) which forms a physical array with a common coverage area 501 utilizing all microphones 124b, 124c, 106a, 106b, 106c in the room 112 connected to the system processor 117. Since all microphones are treated as a single physical array with a common aperture, the system can configure, map and utilize the microphone array as one would any common microphone array architecture with the added benefit of not having to preconfigure and install a hard wired and located microphone array thus eliminating all the complexities and problems with previous microphone array installations in the current art. At any time, a new microphone can be added to the system processor 117 and re-run the calibration sequence to be incorporated in the array thus allowing for the building, calibration, and management of a dynamic microphone array in real-time.

With reference to FIGS. 9a, 9b and 9c, shown are block diagrams showing a subset of high-level system components contained in the system processor 117 related to the invention. FIG. 9a shows the relationship of three major processing blocks: Array Configuration and Calibration 901, Targeting Processor 902, and Audio Processor 903. The invention described herein is the Array Configuration and Calibration 901 component which outputs a calibration signal 919 to a speaker 105 and then measures the time it takes for the signal to arrive at each of the microphone elements 106 in the system. This information is used in conjunction with the Configuration Constraints 920 input and optionally the Temperature Sensor 207 input to generate: a consolidated target coverage area 501 which is transferred for use by the Targeting Processor 902 (via 922); and a Gain Value Map 916 transferred to the Audio Processor 903 for use when combining signals from microphone elements 106. This configuration and calibration phase can be executed for, but not limited to, the following reasons: automatically at initial startup; automatically when speaker 105 or microphone 106 elements are detected to have been added or removed from the physical system; overnight (or at other desired times) from a centralized administration and control infrastructure; automatically (either internally or remotely) based on targeting or audio performance criteria; automatically based on detected changes in ambient room temperature 207; automatically based on other Configuration Constraints 920; and manually if it is known that speaker 105 or microphone element 106 locations have changed but not the number of devices. The Targeting Processor 902 utilizes the generated target coverage area 501 (via 922) to track potential sound sources in the room and, based on the location of the selected target, sends additional information 911 to the Audio Processor 903 specifying how the microphone elements 106 are to be combined and how to apply the appropriate gain 916 for the selected location. In the preferred embodiment of the implementation, the Audio Processor 903 performs a set of standard audio processing functions including but not limited to echo cancellation, de-reverberation, echo reduction, and noise reduction prior to combining the microphone 106 signals and applying gain; however, certain operations may be undertaken in a different sequence as necessary. For example, in a device with a less powerful System Processor 117, it may be desirable to combine the microphone signals and apply gain prior to echo and noise reduction or the gain may be applied after the noise reduction step. This invention regards the creation of the combined physical microphone array system and not the consolidated coverage area 501, the associated gain map 916 or how the information is further used in the system.

FIG. 9b details the major components of the Array Configuration and Calibration process 901: Build the Array 907, Generate Consolidated View of Coverage Area 908, and Generate Array Gain Values 909. Briefly, Build the Array 907 generates a calibration signal which is sent to each detected speaker 105 in the system while measuring the time it takes for the signal to arrive at each microphone element 106 in the system. The data is processed, and the sequence is repeated for the next speaker 105 in the system until the time of arrival has been measured between all speakers 105 and microphone elements 106. Once all data has been acquired, it is evaluated with techniques applied to minimize error (for example, temperature corrections for the speed of sound, and other methods) to improve accuracy of the system. The algorithm then calculates the physical array structure 917 which is used by the Generate Consolidated View of Coverage Area 908 process. This process creates a coverage area 501 common to all elements of the physical array 105 and 106 with target locations distributed within the coverage area according to a known algorithm. The array structure configuration data 917 which includes individual device locations within the newly formed combined array and the coverage area parameters are sent to the Targeting Processor 902 (via 922). It should be noted that the array structure configuration data 917 is made available through standard software and hardware interfaces (not shown) known in the art to be used and accessed by numerous other processes for example such as but not limited to displaying of the individual speaker/microphone components actual location relative to each other and the room 112 boundaries, for generation of a combined coverage map for the room 112, and exported to third party applications for external usage scenarios such but not limited to analytics and analysis. The Generate Array Gain Values process 909 which utilizes the information to generate a gain value for every microphone element 106 for each target location in the coverage area 501. The scope of this invention contained in 907 is using the time of arrival information to generate a description of the physical array 917 not the subsequent use of the data by the Generate Consolidated View of Coverage Area process 908, the Generate Gain Values process 909, the Targeting Processor 902, or the Audio Processor 903.

Building the array system FIG. 9c consists of $N_b$ connected bars 114 each encapsulating one or more audio transducers, i.e. speakers 105 and microphones 106. Initially, all connected bar 114 locations are unknown and after the building the array system operation completes the location (x, y, z) estimates of each connected bar 114 are found. The acoustic distance measurement block 914 sends bursts of acoustic excitation signal previously referred to as the calibration signal, to one of the connected speakers 105 while simultaneously recording the signals at all connected microphones 106. Time synchronization between the bars 114 is required. After removing the processing delay due to software and hardware components, block 914 observes the time delay between speaker signal and microphone recordings and computes distance estimates 914. This playback and record procedure repeats for each of the connected speakers 105 in the system.

In FIG. 9c, the first connected bar 114 (index 0) is assigned a fixed location for example at the origin of the coordinate system and its location becomes known. The remaining bars 114 (b=1 ... $N_b$) with unknown locations get their locations 913 calculated relative to the bar 114 (0). The geometry solver 915 calculates these locations using distance estimates D(s, m) between speaker (s) 105 and microphone (m) 106 as the inputs 914. The location calculations 915 incorporate configuration constraints 920 of the system such as relative positions of microphones 106 and speakers 105 within each bar in order to improve the statistical accuracy of the results. Depending on the geometry of the bars 114 additional configuration constraints 920 are used in 915 to resolve ambiguity of the location solution. Examples of such constraints are "bar 114 is installed horizontally", "height difference between installed arrays is h", etc. With all bar 114 locations in the system FIG. 9c being registered via the array building procedure the system can be configured to operate as a single integrated microphone array.

Figure 12:
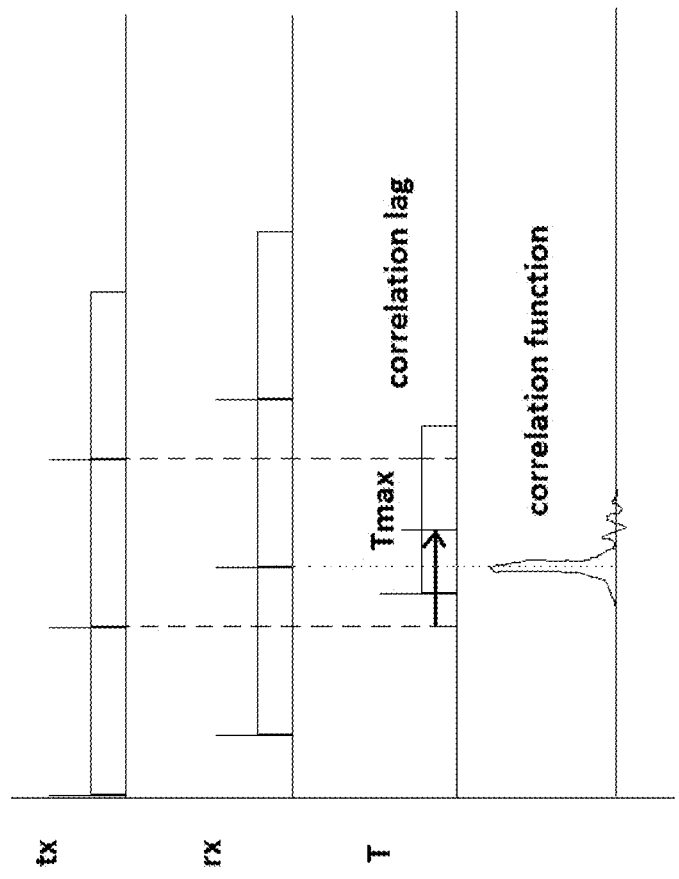
FIG. 12 is graphical illustration of maximum length sequence pulses.

With reference to FIG. 10, shown is the processing steps within the acoustic distance measurement procedure 914. The acoustic excitation signal, previously referred to as the calibration signal, to the speaker is generated using prior art maximum length sequence (MLS) method. This is an established and preferred choice for measuring room impulse response (RIR) accurately due to the useful property of having all autocorrelation values zero except at lag 0. This property, also known as Dirac autocorrelation, allows for the use of the correlation method for computing the RIR function directly. However, since this is true only in circular correlation sense, we string three (3) MLS pulses as the excitation signal and perform correlation step with the middle MLS pulse to ensure circular overlap with the MLS pulses in adjacent areas (FIG. 12).

Figure 11:
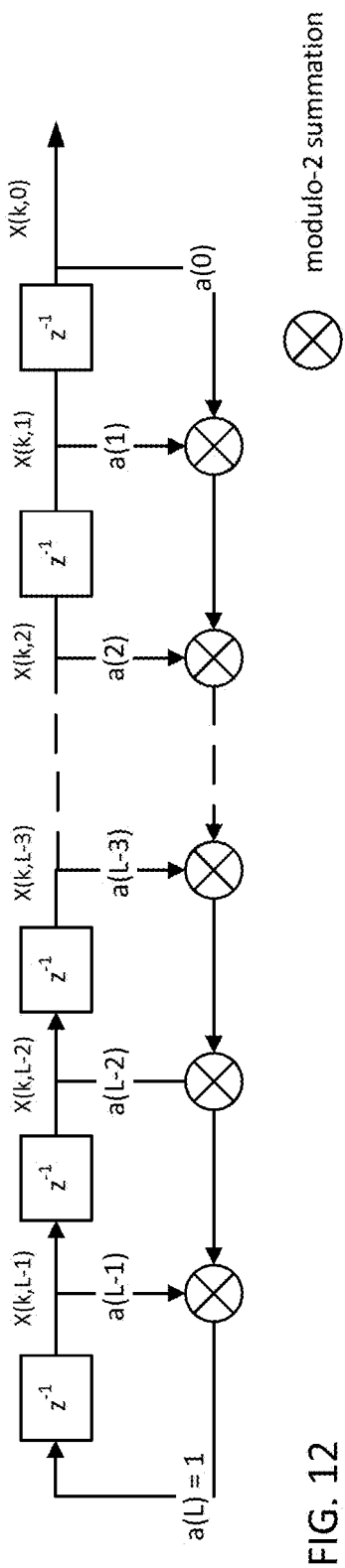
FIG. 11 is an illustrative diagram of a Linear Feedback Shift Register structure.

MLS sequences are generated by a structure called linear feedback shift register (LFSR) where L cells store 0,1 values and are combined with modulo-2 summation to produce the new value to shift into the register (FIG. 11). The sequence thus produced is seemingly random and provides excitation at all frequencies of the system. Block S1010 equations implement the LFSR structure to generate the MLS speaker signal by initializing the register cells with 0 then generating each sample by reading the final register cell followed up by updating of the register cells according to the feedback values a(j).

$X(0,j)=1 \{j=0 \ldots (L-1)\}$ $S(k)=X(k,0)$ $X(k+1,L-1)=\text{MOD}_2 \Sigma_{j=0}^{L-1} a(j)*X(k,j)$ Coefficients a(j) are chosen as a primary polynomial and the MLS sequence repeats every $(2^L-1)$ samples. The length of the register L is chosen to achieve the desired speaker 105 excitation duration which is a compromise between a greater noise robustness and lower speaker 105 levels for the longer sequences and the overall duration of the calibration procedure favoring shorter signals. A typical setup for LFSR in ADM application uses L=14 to generate MLS that repeats every $2^L-1$=16383 samples. At 24 kHz sampling rate this translates to about 2 seconds of the excitation over the three (3) MLS pulse repetitions. This choice works well for measuring distances up to 15 meters in average office ambient noise levels. Increased L values can be used when SNR conditions are low due to increased distances between bars or high ambient noise conditions. As an example, for L=14 the prime polynomial is achieved with the following weights, $a_0, a_9, a_{11}, a_{13}, a_{14}$=1:other weights=0. (L=14 prime polynomial)

Next in S1010 the speaker 105 MLS sequence S(k) is converted to a signal suitable for acoustic reproduction by replacing each value 0 with −1.

The level setting for the excitation signal in S1010 is chosen such that the speaker 105 signal is at a comfortable level for the people 107 present in the room during the calibration process while keeping the level as high as possible to maintain good SNR and leading to quality estimates of the RIR.

In the processing step S1020 the speaker signal S(k) is sent to one speaker 105 denoted with index s in the list of connected array devices 114. Simultaneously during the playback S1020 records signals at all connected microphones 106. The resulting microphone 106 signal captures are denoted M(k, m) for each receiving microphone (m) 106 and time sample (k). When integer rate up sampling is required such as from 24 kHz to 48 kHz in order to best preserve the properties of the MLS signal a zero-order-hold interpolation is used, essentially duplicating each sample.

As shown in S1030 the application of cross-correlation operation between speaker 106 signal S(k) and microphone recordings M(k,m) yields the room transfer function or RIR(T,m) between these transducers 105, 106. The cross-correlation operation is performed for lags T corresponding to the middle MLS pulse as illustrated in FIG. 12 in order to exploit the circular overlap of MLS sequence over the adjacent pulses. Furthermore, the correlation lag T is offset by the system delay SD samples introduced by software and hardware components of 914 such that it covers the range T=SD . . . SD+$T_{max}$. The value $T_{max}$ is chosen to correspond to the maximum expected range $D_{max}$ of the distance measurement procedure so that $T_{max}$=fs*$D_{max}$/c; where constant c represents the speed of sound and fs is the sampling rate of the digital signals. The cross-correlation operation on speaker signal S(k) and captured microphone signals M(k, m) is implemented in equation for each microphone m across array devices, $$RIR(T,m)=\Sigma_{j=SD}^{SD+Tmax}S(j)*M(j+T,m)$$

Figure 13A:
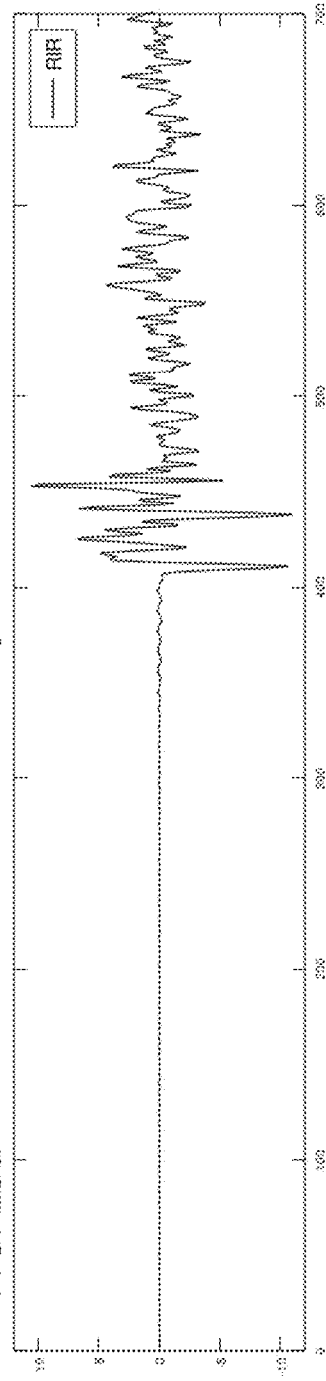
FIGS. 13a and 13b are graphical illustrations of wave front time delay estimations.

The resulting signal RIR(k) for some microphone m is illustrated in the correlation function section of the FIG. 12 and actual measurement data is shown in the FIG. 13a. Information of interest in RIR(k) is the period of inactivity from T=0 which corresponds to the time instance the acoustic wave leaves the speaker 105 to a later time where the RIR values increase abruptly corresponding to the time (and distance) when the direct wave arrives at the respective microphone (m) 106. The said time delay is denoted as ko and measured in unit of samples as described in the following sections.

Figure 13B:
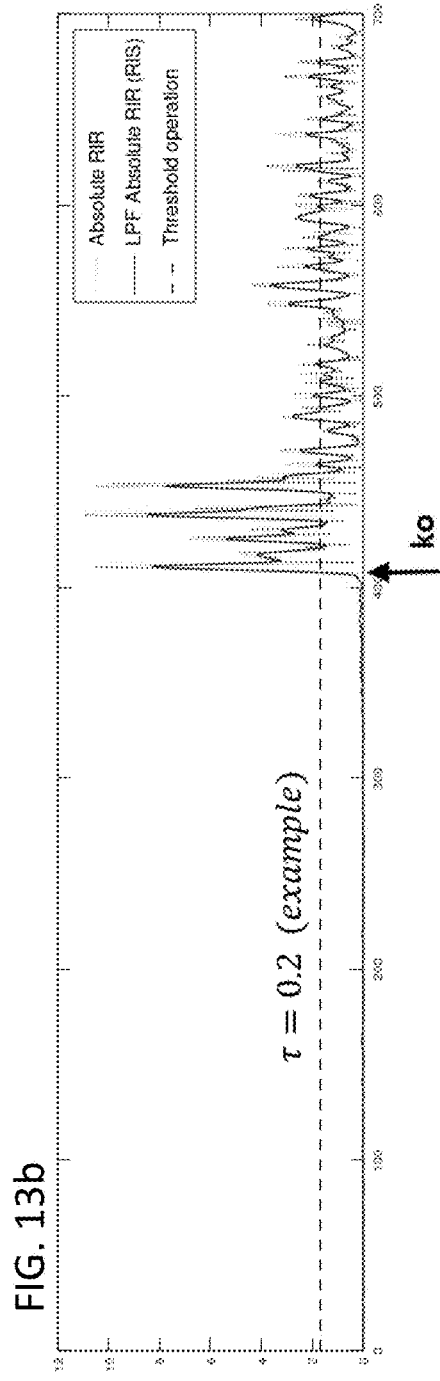

Wavefront onset time is estimated from RIR(k) by detecting the onset of the acoustic signal energy per S1040. The impulse response is first rectified using the absolute value operator or similar rectification operator followed by a smoothing operation using a low-pass filter h(k) to obtain localized averaging. Note that h(k) filter is applied as a linear phase non-causal FIR filter in order to avoid adding signal delay to the impulse response. The coefficients of the filter h(k) are defined in the range −M . . . +M. The rectification and smoothing steps are captured in the equation, $$RIS(k)=\Sigma_{j=k-M}^{j=k+M}\|RIR(j)\|*h(k-j)$$

where RIS(k) represents the rectified and smoothed impulse response. A real-world example of RIS(k) is shown at the bottom of the FIG. 13b.

The onset delay ko in units of samples is defined as the earliest argument k where RIS(k) is greater or equal to the threshold of $\tau$*Max(RIS(k)) or some fraction $\tau$ of the peak value of the response RIS(k). The thresholding factor $\tau$ must be in the range 0 . . . 1 and an example of an effective value is 0.2. This onset detection procedure including the absolute value and filtering operations are shown with real-world signal example in FIG. 13b. The thresholding operation on the argument of the RIS(k) is formalized in the equation, $$ko:=\arg\cdot\text{first}_k\{RIS(k)\geq\tau*\text{Max}(RIS)\}$$

where value ko is found for each speaker (s) 105 and microphone (m) 106 combination and is labeled as ko(s, m)

In processing step S1050 the time delay ko is converted to distance between speaker (s) 105 and microphone (m) 106 and denoted as D(s, m) (FIG. 15). The distance calculation is based on the sampling rate of the audio, RIR and the speed of sound c. When temperature sensor is present in the system speed of sound is adjusted based on the current temperature. The governing equation is:

$$D(s, m) = \frac{ko(s, m)}{fs} * c + B$$

A bias term B is used as a tuning parameter to offset the result in a positive or negative direction. When actual speaker-microphone distances $D_a$(s, m) are known, based on taking physical measurements between bar 114 transducers 105, 106, the process of tuning of parameter B can take place. Tuning consists of adjusting the parameter B until the difference between actual and estimated distances is minimized.

$$\min(B)\Sigma_s\Sigma_m\|D(s,m)-D(s,m)\|$$

S1060 loop condition ensures that each speaker 105 in the collection of bars 114 is processed according to steps S1010, S1020, S1030, S1040 and S1050. Therefore, the procedure is repeated until all speakers 105 s=1 . . . $N_s$ are processed where $N_s$ is the total number of speakers 105. In an alternative embodiment all speakers 105 may playback the MLS signal simultaneously where different prime polynomials a(j) are used to generate the MLS in S1010 for each of the speakers 105 so that the signals from different speakers 105 are mutually uncorrelated.

The resulting distance estimates $D_b$(s, m) represent the outputs of the system in FIG. 9c block 914 for each unknown bar b. The output sets labeled "Distance Est (b)" or $D_b$(s, m) are subsets of estimates D(s, m) where transducers s, m 105, 106 are members of bar b 114 (unknown location) and bar 0 144 (known location). In other words, these are the subset of distances that connect bar 0 114 and bar b 114. Note that each bar b 114 and transducers s, m 105, 106 are addressable uniquely within the system of bars 114 connected to the signal bus from 914. An illustration of how distance measurements connect a single speaker 105 to multiple microphones 106 between two bars 114 is shown in FIG. 16.

Distance estimates D(s, m) generated by 914 (FIG. 9c) and grouped by each bar b 114 of unknown location represents the inputs to the geometric location solver 915 in FIG. 9c. The geometric location solver 915 processes each set of distance estimates $D_b$(s, m) and computes the corresponding locations of the microphones 106 and speakers 105 within bar b 114. This process is repeated for each bar b=1 . . . $N_b$ 114.

Figure 14B:
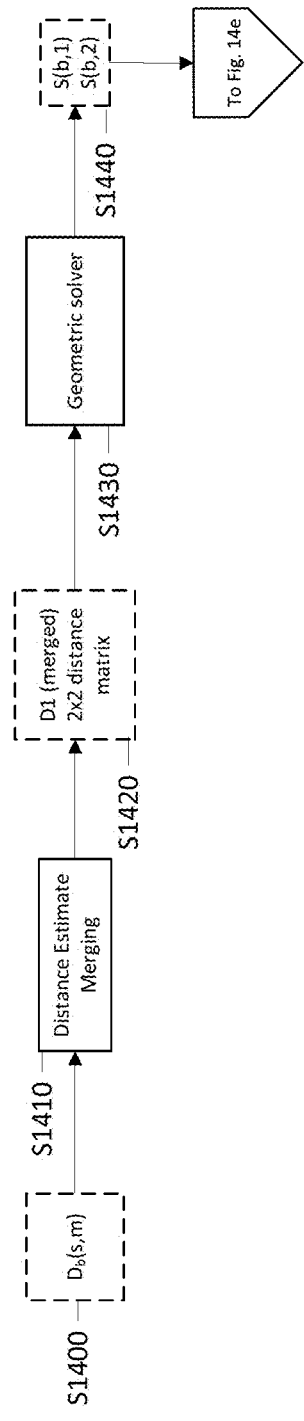

FIG. 14a describes the details of procedure of location solver 915 using processing step S1410 (distance estimate merging) and S1430 (Geometric solver). In FIG. 14a example the inputs consist of distance estimates between microphones of the device 0 (known location) and speakers of the bar b (unknown location) and the final result shows the speaker locations of the bar b. However, these same procedures S1410, S1430 abstracted in FIG. 14b. FIG. 14b can be applied in alternate configurations of FIG. 14c and FIG. 14d to cover the cases of locating microphones 106 (FIG. 14c) and joint localization for microphones 106 and speakers 105 (FIG. 14d) on bar b 114.

Since microphone arrays typically contain a multitude of microphone 106 units the block S1410 works to use all these measurements to improve the statistical accuracy of estimates. Block S1410 merges the individual measurements using an averaging operation and assigning a weight according to the distance between the pairs of microphones 106. Microphone 106 pairs receive a weighting proportional to the distance between the inner microphone 106 pairs since the lower incidence angle to the transmitter point results in a higher estimation error. Before averaging can take place each pair of microphone 106 distances D(s, m) and D(s, N−m+1) needs to be first converted to the projected distance from the end microphones 106 d1(s, m) and dN(s, m) respectively to the same speaker (s) 105. This conversion from inner microphones 106 to the end microphones 106 is achieved using triangle rules as shown in FIG. 16 that takes into account a known spatial arrangement between microphones 106 in the bar 114 (for example known microphone 106 spacing). We observe that the triangle B based on end microphones 106 1, N is uniquely known from the triangle A based on inner microphone pair m, N−m+1.

The end microphone 106 referenced values are then averaged to a new merged estimate as follows, $$D(s, 1) = \frac{1}{W_0} \sum_m MD(m)^2 * d1(s, m) \text{ first microphone 106 merged value.}$$

$$D(s, N) = \frac{1}{W_0} \sum_m MD(m)^2 * dN(s, m) \text{ last microphone 106 merged value.}$$

Step S1410 then consolidates N microphones 106 distances of a microphone 106 bar 114 to two (end microphones 106 referenced) distances. Applying the procedure S1410 for both speakers 105 results in a 2×2 matrix containing statistically enhanced end-microphone 106 referenced distances as shown in S1420. The matrix D1 relates microphones 106 of the bar 0 114 (known location) and speakers 105 of bar b 114 (unknown location) in the example application 915.

Geometric solver block S1430 is based on geometric arrangement in FIG. 17 that shows how the unknown location of the speaker 105 (x,y,z) can be calculated from the two distance estimates from the two microphones 106 separated by the distance Dm. The unconstrained transmitter location can be anywhere on the equidistant circle (x1, r1) defined by these two distances. Finally, the location is uniquely defined with the height difference constraint h. These geometry calculations are captured in the equations, $$\cos \alpha = \frac{(d1^2 + Dm^2 - d2^2)}{2*d1*Dm} \text{ angle between lines } d1 \text{ and } d2$$

$$x1 = -d1 * \cos \alpha \text{ offset of equidistant circle}$$

$$r1 = d1 * \sin \alpha \text{ radius of the equidistant circle}$$

$$x = x1 \quad y =$$

$$\sqrt{r1^2 - h^2} \quad z = h \text{ location solution using the height difference constraint.}$$

In FIG. 14a the output data structure S1440 shows the final estimates for both speakers S(b, 1) and S(b, 2) locations for the bar b. These location estimates can be further processed with the device structure constraint in FIG. 14e or the same wall correction logic in FIG. 14f which will be described in detail in later sections.

Figure 14C:
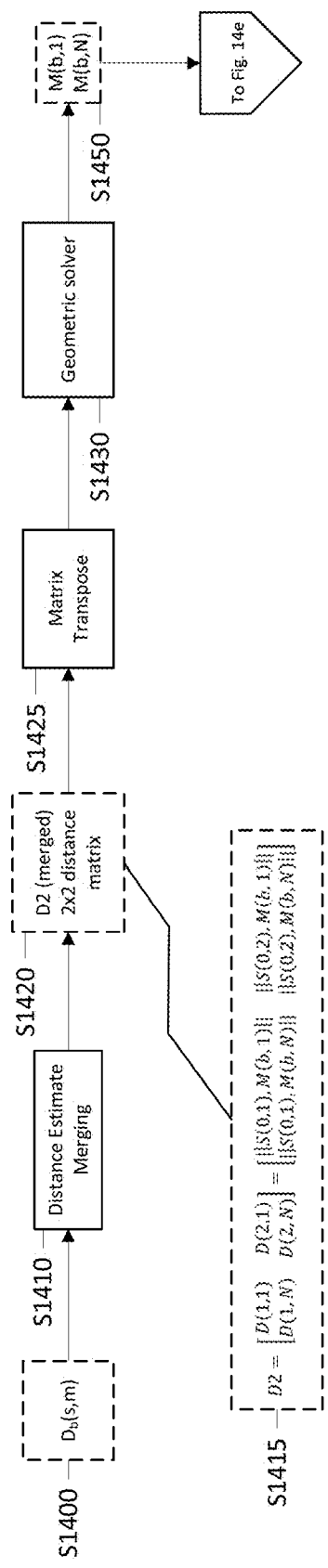
Figure 14D:
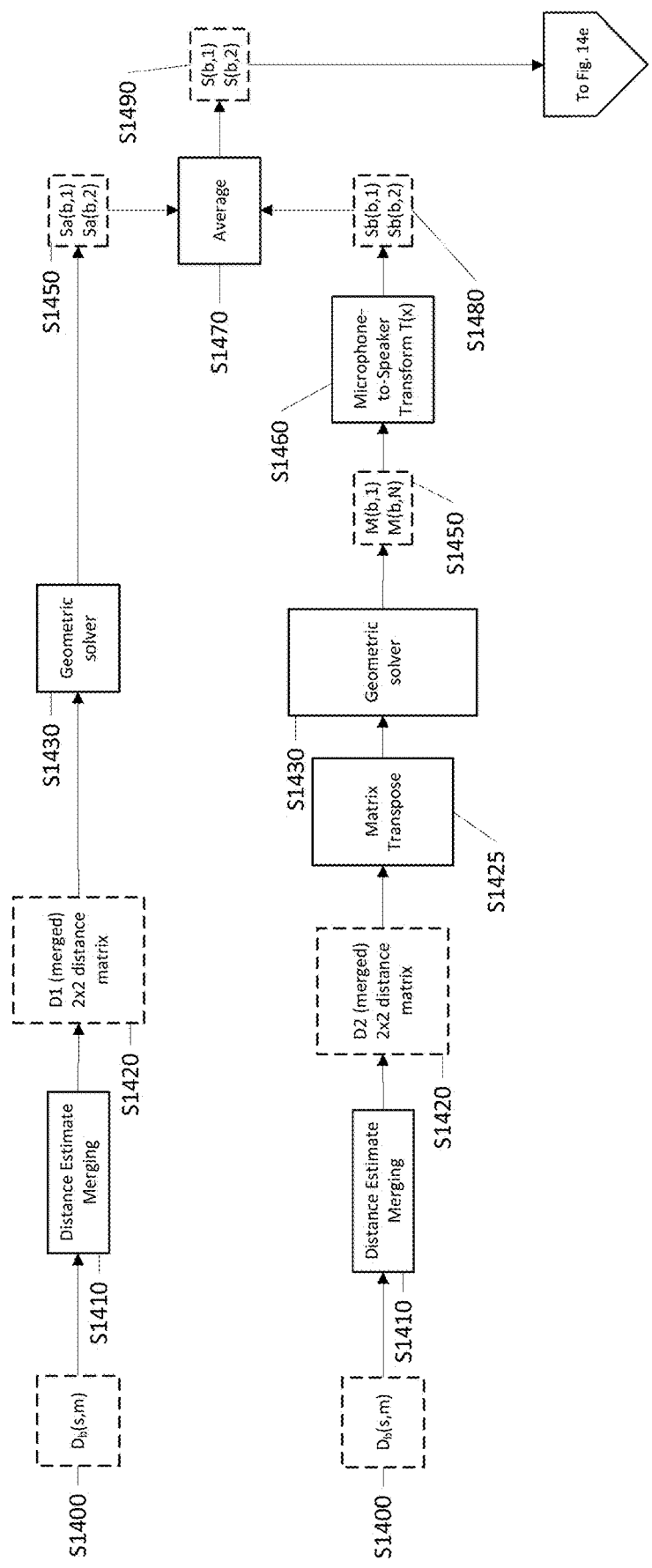

In FIG. 14b the system 915 is shown again in a compact form without the details in order to show the reusable components to be used in alternative configurations FIG. 14c and FIG. 14d. When the reference location bar contains speakers 105 the microphones 106 of the unknown location bar 114 can be found using the system diagram in FIG. 14c. The same processing step S1420 is first applied to perform statistical merging to end microphones 106 resulting in the S1420 2×2 matrix of distance estimates. Note however in block S1415 that the distance estimates are from speakers 105 in the known location bar which is indicated by bar index 0. At this point S1425 step applies a matrix transpose which is the only modification relative to the system 915 in FIG. 14b. The action of the geometric solver S1430 (using the speaker distance constant $D_s$ instead of $D_m$) then results in end microphone location estimates M(b, 1) and M(b, N) for the unknown location bar.

When both the reference location bar and the unknown location bar contain speakers and microphones the result S1440 can be further enhanced using the forward-backward averaging method as shown in FIG. 14d. To implement this system an additional processing step S1460 called microphone 106 to speaker 105 transform T is required. This transform calculates the positions of the speakers 105 within the same bar 114 when positions of microphones 106 are known.

Internal geometric arrangement of each speaker 105 and microphone 106 within a bar 114 is known from the industrial design or physical measurements and therefore all relative positions are known. The structure of the bar 114 represents a constraint that allows for predicting for example of speaker 105 positions when microphone 106 positions are known or vice versa. This bar 114 internal geometry information is retrieved by the array building system 907 based on the device ID of the bars 114 connected to the bus. The transform T consists of standard 3D rotation and translation operations that relates points from one coordinate system to another.

$$S(b)=T\{M(b)\}$$

speaker 105 locations (x, y, z) are calculated from the microphone 106 locations within the same bar b.

Conversely the opposite can be achieved using the inverse of the transform in S1460:

$$M(b)=T^{-1}\{S(b)\}$$

the inverse of transform T computes microphone 106 locations from known speaker 105 locations.

With the utility of S1460 implementing the conversion from M positions to S positions in FIG. 14d we convert the intermediate microphone 106 location result S1450 into speaker 105 locations in S1480. Note that the upper branch of the FIG. 14d diagram is identical to the procedure of FIG. 14b and the lower branch of FIG. 14d up to the transform S1460 is identical to the procedure in FIG. 14c. With microphone 106 location estimates converted to speaker 105 locations in S1480 the values are compatible with S1450 values and can be averaged to obtain the improved averaged estimate in S1490. This procedure can therefore be viewed as bi-directional estimation that makes use of the availability of distance estimates D(m, s) based on excitation from speakers of the unknown location bar b as well as from the speakers of the known location bar 0.

The resulting location estimates such as S1440 in FIG. 14b, S1450 in FIG. 14c, and S1490 in FIG. 14d can have a mutual distance that deviates from the true distance predicted from known internal geometric structure of the bar 114, i.e. constraints. Then the location estimates can be further improved by imposing this known distance between the location estimate results. FIG. 14e shows the procedure of refining the location estimate S1490 to conform to the known spacing Ds or Dm according to the device structure constraint S1405. In processing step S1510 First the centroid P of the two outer speaker 105 locations is calculated as, $$P=0.5*S(b,1)+0.5*S(b,2)$$

From which we define the unit vectors aligned with the segment, $$u1 = \frac{S(b, 1) - P}{\|S(b, 1) - P\|}$$

-continued $$u2 = \frac{S(b,2) - P}{\|S(b,2) - P\|}$$

Which allow us to compute the refined location estimates that comply with the true distance constraint Ds, $S(b,1)'=P+0.5*Ds*u1$      refined estimate of S(b,1)

$S(b,2)'=P+0.5*Ds*u2$      refined estimate of S(b,2)

Note that when the final location estimate result contains speaker 105 locations such as in FIG. 14b and FIG. 14d all the associated barb microphone 106 locations M(b, m) can simply be calculated using the transform $T^{-1}$. This step is illustrated in FIG. 14e, blocks S1520, S1465 and S1530.

When bar 114 0 and bar 114 b are both located on the same wall, the estimation accuracy is particularly challenging due to near zero incidence angles (see FIG. 17) and associated sensitivity to small distance estimation errors. An additional processing logic is executed as diagramed in FIG. 14f which first detects that both bars 114 are located on the same wall and then removes any discrepancies by setting the y coordinates (i.e. offset from the wall) of the bar b 114 to be equal to the known y coordinate of bar 0 114 as shown in S1580. In order to perform the detection the offset and radius of the equidistant circle equation x1,r1 are first calculated in S1430 following the same equation as shown in diagram in FIG. 14a. The detection logic is implemented in condition checks S1560 and S1570. The first condition S1560 checks how close the installation walls are between bar 0 114 and bar b 114 and the second condition S1570 checks if the bar 0 114 and bar b 114 transducer 105, 106 segments are close to being parallel. When both conditions are true the location y-axis correction S1580 is applied to input location estimates S1520, S1540. Note that decision thresholds Th1 and Th2 are tuned for optimal system performance and depend on the minimum expected room 112 size, the bar 114 length among other parameters. Example values for Th1=1.5 and Th2=0.5. Note that when the same wall detection logic reports false then the input location estimates remain unchanged.

The embodiments described in this application have been presented with respect to use in one or more conference rooms preferably with local and remote multi users. However, the present invention may also find applicability in other environments such as:

Commercial transit passenger and crew cabins such as, but not limited to, aircraft, busses, trains and boats. All of these commercial applications can be outfitted with microphones and speakers which can benefit from consistent microphone audio signal quality maximizing microphone pickup and management which can vary from moderate to considerable;

Private transportation such as cars, truck, and mini vans, where command and control applications and voice communication applications are becoming more prominent;

Industrial applications such as manufacturing floors, warehouses, hospitals, and retail outlets to allow for audio monitoring and to facilitate employee communications without having to use specific portable devices; and Drive through windows and similar applications, where ambient sounds levels can be quite high and variable, can be controlled to consistent levels within the scope of the invention. Also, the processing described above may be carried out in one or more devices, one or more servers, cloud servers, etc.

The individual components shown in outline or designated by blocks in the attached Drawings are all well-known in the electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for automatically forming a single physical combined microphone array aperture in real-time across associated and/or disassociated ad-hoc microphone elements in a shared 3D space, comprising:

a plurality of microphone/speaker units, each including at least one microphone and/or at least one speaker, wherein one of the microphone/speaker units which includes at least one speaker is selected as a reference microphone/speaker unit for auto-calibration, and wherein a location of the reference microphone/speaker unit is determined and selected as a reference location; and a system processor communicating with the microphone/speaker units, wherein the system processor is configured to perform operations comprising:

transmitting a first calibration signal from the at least one speaker of the reference microphone/speaker unit;

receiving the first calibration signal via the microphone/speaker units and calculating time difference of arrival (TDOA) with the first calibration signal between the microphone/speaker units;

transmitting a second calibration signal from the at least one speaker of another microphone/speaker unit which is not the reference microphone\speaker unit;

receiving the second calibration signal via the microphone/speaker units and calculating TDOA with the second calibration signal between the microphone/speaker units;

repeating with the rest of the microphone/speaker units transmitting respective calibration signals, receiving the respective calibration signals via the microphone/speaker units, and calculating TDOA with the respective calibration signals between the microphone/speaker units;

obtaining a physical combined array structure of the microphone/speaker units based on the TDOA between the microphone/speaker units; and generating based on the physical combined array structure a consolidated target coverage area common to the microphone/speaker units.

2. The system of claim 1 wherein the obtaining the physical combined array structure comprises obtaining locations of the microphone/speaker units relative to the location of the reference microphone/speaker unit.

3. The system of claim 1 wherein configuration constraints are incorporated to obtain the physical combined array structure of the microphone/speaker units.

4. The system of claim 3 wherein the configuration constraints include relative positions of the microphones and speakers within each microphone/speaker unit.

5. The system of claim 1 wherein a speed of sound is adjusted based on the temperature in the shared 3D space to obtain the physical combined array structure of the microphone/speaker units.

6. The system of claim 1 wherein the system processor is configured to detect in real-time any one of the followings: (i) connected microphone/speaker units at power startup, (ii) changes in connected microphone/speaker unit while the system is powered on, and (iii) user manual input to then perform the calibration procedure to form the physical combined array structure dynamically.

7. The system of claim 1 wherein the system processor is configured to allow data of the physical combined array structure to be used and accessed by applications, wherein the applications include one or more of (i) displaying of actual locations of microphones and speakers of the microphone/speaker units relative to each other and boundaries of the shared 3D space, (ii) generating a combined coverage map for the shared 3D space, and (iii) exporting the data to external applications for external usages.

8. The system of claim 1 wherein the transmitting the first calibration signal and the transmitting the second calibration signal are performed sequentially or simultaneously.

9. A method for automatically forming a single physical combined microphone array aperture in real-time across associated and/or disassociated ad-hoc microphone elements in a shared 3D space, comprising:
  transmitting a first calibration signal from at least one speaker of a reference microphone/speaker unit among a plurality of microphone/speaker units each including at least one microphone and/or at least one speaker, wherein a location of the reference microphone/speaker unit is determined and selected as a reference location;
  receiving the first calibration signal via the microphone/speaker units and calculating time difference of arrival (TDOA) with the first calibration signal between the microphone/speaker units;
  transmitting a second calibration signal from the at least one speaker of another microphone/speaker unit which is not the reference microphone\speaker unit;
  receiving the second calibration signal via the microphone/speaker units and calculating TDOA with the second calibration signal between the microphone/speaker units;
  repeating with the rest of the microphone/speaker units transmitting respective calibration signals, receiving the respective calibration signals via the microphone/speaker units, and calculating TDOA with the respective calibration signals between the microphone/speaker units;
  obtaining a physical combined array structure of the microphone/speaker units based on the TDOA between the microphone/speaker units; and
  generating based on the physical combined array structure a consolidated target coverage area common to the microphone/speaker units.

10. The method of claim 9 wherein the obtaining the physical combined array structure comprises obtaining locations of the microphone/speaker units relative to the location of the reference microphone/speaker unit.

11. The method of claim 9 further comprising incorporating configuration constraints to obtain the physical combined array structure of the microphone/speaker units.

12. The method of claim 11 wherein the configuration constraints include relative positions of the microphones and speakers within each microphone/speaker unit.

13. The method of claim 9 further comprising adjusting a speed of sound based on the temperature in the shared 3D space to obtain the physical combined array structure of the microphone/speaker units.

14. The method of claim 9 further comprising detecting in real-time any one of the followings: (i) connected microphone/speaker units at power startup, (ii) changes in connected microphone/speaker unit while the system is powered on, and (iii) user manual input to then perform the calibration procedure to form the physical combined array structure dynamically.

15. The method of claim 9 further comprising allowing data of the physical combined array structure to be used and accessed by applications, wherein the applications include one or more of (i) displaying of actual locations of microphones and speakers of the microphone/speaker units relative to each other and boundaries of the shared 3D space, (ii) generating a combined coverage map for the shared 3D space, and (iii) exporting the data to external applications for external usages.

16. The method of claim 9 wherein the transmitting the first calibration signal and the transmitting the second calibration signal are performed sequentially or simultaneously.

17. One or more non-transitory computer-readable media for automatically forming a single physical combined microphone array aperture in real-time across associated and/or disassociated ad-hoc microphone elements in a shared 3D space, the computer-readable media comprising instructions configured to cause a system processor to perform operations comprising:
  transmitting a first calibration signal from at least one speaker of a reference microphone/speaker unit among a plurality of microphone/speaker units each including at least one microphone and/or at least one speaker, wherein a location of the reference microphone/speaker unit is determined and selected as a reference location;
  receiving the first calibration signal via the microphone/speaker units and calculating time difference of arrival (TDOA) with the first calibration signal between the microphone/speaker units;
  transmitting a second calibration signal from the at least one speaker of another microphone/speaker unit which is not the reference microphone\speaker unit;
  receiving the second calibration signal via the microphone/speaker units and calculating TDOA with the second calibration signal between the microphone/speaker units;
  repeating with the rest of the microphone/speaker units transmitting respective calibration signals, receiving the respective calibration signals via the microphone/speaker units, and calculating TDOA with the respective calibration signals between the microphone/speaker units;
  obtaining a physical combined array structure of the microphone/speaker units based on the TDOA between the microphone/speaker units; and
  generating based on the physical combined array structure a consolidated target coverage area common to the microphone/speaker units.

18. The one or more non-transitory computer-readable media of claim 17 wherein the obtaining the physical combined array structure comprises obtaining locations of the microphone/speaker units relative to the location of the reference microphone/speaker unit.

19. The one or more non-transitory computer-readable media of claim 17 wherein the operations further comprise incorporating configuration constraints to obtain the physical combined array structure of the microphone/speaker units, and wherein the configuration constraints include relative positions of the microphones and speakers within each microphone/speaker unit.

20. The one or more non-transitory computer-readable media of claim 17 wherein the operation further comprises detecting in real-time any one of the followings: (i) connected microphone/speaker units at power startup, (ii) changes in connected microphone/speaker unit while the system is powered on, and (iii) user manual input to then perform the calibration procedure to form the physical combined array structure dynamically.

21. The one or more non-transitory computer-readable media of claim 17 wherein the operation further comprises allowing data of the physical combined array structure to be used and accessed by applications, wherein the applications include one or more of (i) displaying of actual locations of microphones and speakers of the microphone/speaker units relative to each other and boundaries of the shared 3D space, (ii) generating a combined coverage map for the shared 3D space, and (iii) exporting the data to external applications for external usages.

22. The one or more non-transitory computer-readable media of claim 17 wherein the transmitting the first calibration signal and the transmitting the second calibration signal are performed sequentially or simultaneously.

\* \* \* \* \*